(12) United States Patent
Shin et al.

(10) Patent No.: US 11,579,298 B2
(45) Date of Patent: Feb. 14, 2023

(54) HYBRID SENSOR AND COMPACT LIDAR SENSOR

(71) Applicant: YUJIN ROBOT CO., LTD., Incheon (KR)

(72) Inventors: Kyung Chul Shin, Seoul (KR); Seong Ju Park, Gunpo-si (KR); Jae Young Lee, Gunpo-si (KR); Moo Woong Cheon, Anyang-si (KR); Man Yeol Kim, Incheon (KR)

(73) Assignee: YUJIN ROBOT CO., LTD., Incheon (KR)

( * ) Notice: Subject to any disclaimer, the term of this patent is extended or adjusted under 35 U.S.C. 154(b) by 1156 days.

(21) Appl. No.: 16/136,222

(22) Filed: Sep. 19, 2018

(65) Prior Publication Data
US 2019/0086539 A1 Mar. 21, 2019

(30) Foreign Application Priority Data

Sep. 20, 2017 (KR) .................. 10-2017-0121401
Sep. 21, 2017 (KR) .................. 10-2017-0121828
(Continued)

(51) Int. Cl.
*G01S 17/89* (2020.01)
*G06T 1/00* (2006.01)
(Continued)

(52) U.S. Cl.
CPC ............ *G01S 17/89* (2013.01); *G01S 7/4813* (2013.01); *G01S 7/4817* (2013.01); *G01S 17/86* (2020.01);
(Continued)

(58) Field of Classification Search
CPC ...... G01S 17/89; G01S 7/4813; G01S 7/4817; G01S 17/86; G06T 1/0014; G06V 10/147; G06V 20/56; G06K 9/6288
See application file for complete search history.

(56) References Cited

U.S. PATENT DOCUMENTS

| 4,297,030 A | 10/1981 | Chaborski et al. |
| 6,925,679 B2 | 8/2005 | Wallach et al. |

(Continued)

FOREIGN PATENT DOCUMENTS

| CN | 101856208 A1 | 10/2010 |
| CN | 206400103 A1 | 8/2017 |

(Continued)

OTHER PUBLICATIONS

Jinwook Huh et al., International Conference on intelligent robots and systems, 2006, pp. 5265-5272.
(Continued)

*Primary Examiner* — Jared Walker
(74) *Attorney, Agent, or Firm* — Broadview IP Law, PC

(57) ABSTRACT

The present exemplary embodiments provide a hybrid sensor, a Lidar sensor, and a moving object which generate composite data by mapping distance information on an obstacle obtained through the Lidar sensor to image information on an obstacle obtained through an image sensor and predict distance information of composite data based on intensity information of a pixel, to generate precise composite data.

18 Claims, 43 Drawing Sheets

(30) Foreign Application Priority Data

| Sep. 29, 2017 | (KR) | 10-2017-0126788 |
|---|---|---|
| Oct. 23, 2017 | (KR) | 10-2017-0137723 |
| Oct. 23, 2017 | (KR) | 10-2017-0137745 |
| Nov. 2, 2017 | (KR) | 10-2017-0145577 |
| May 16, 2018 | (KR) | 10-2018-0055952 |
| May 16, 2018 | (KR) | 10-2018-0055953 |
| Jun. 26, 2018 | (KR) | 10-2018-0073235 |
| Jul. 11, 2018 | (KR) | 10-2018-0080377 |

(51) Int. Cl.
    G01S 7/481    (2006.01)
    G01S 17/86   (2020.01)
    G06K 9/62    (2022.01)
    G06V 10/147  (2022.01)
    G06V 20/56   (2022.01)

(52) U.S. Cl.
    CPC .......... *G06T 1/0014* (2013.01); *G06V 10/147*
    (2022.01); *G06V 20/56* (2022.01); *G06K*
    *9/6288* (2013.01)

(56) References Cited

U.S. PATENT DOCUMENTS

| 7,695,646 | B2 | 4/2010 | Wang et al. |
| 8,060,254 | B2 | 11/2011 | Myeong et al. |
| 9,020,637 | B2 | 4/2015 | Schnittman et al. |
| 9,047,896 | B1 | 6/2015 | Kudo et al. |
| 9,411,338 | B2 | 8/2016 | Hanaoka et al. |
| 9,527,212 | B2 | 12/2016 | Artes et al. |
| 9,741,140 | B2 | 8/2017 | Birchfield |
| 10,822,415 | B2 | 11/2020 | Levade et al. |
| 11,090,491 | B2 | 8/2021 | Mishra et al. |
| 2011/0285910 | A1 | 11/2011 | Bamji et al. |
| 2012/0182392 | A1* | 7/2012 | Kearns .......... B25J 19/023 348/46 |
| 2014/0111812 | A1* | 4/2014 | Baeg .......... G01S 17/87 356/610 |
| 2014/0125966 | A1* | 5/2014 | Phillips .......... G02B 26/12 356/4.01 |
| 2014/0198308 | A1 | 7/2014 | Kim |
| 2014/0300732 | A1 | 10/2014 | Friend et al. |
| 2015/0253777 | A1* | 9/2015 | Binney .......... G06Q 10/08 701/28 |
| 2015/0268058 | A1* | 9/2015 | Samarasekera .......... G01C 11/02 701/409 |
| 2016/0073080 | A1* | 3/2016 | Wagner .......... G06T 5/006 348/47 |
| 2016/0104829 | A1 | 4/2016 | Chang et al. |
| 2017/0046548 | A1 | 2/2017 | Kamijo et al. |
| 2017/0053538 | A1* | 2/2017 | Samarasekera .......... G06K 9/6267 |
| 2018/0149753 | A1 | 5/2018 | Shin et al. |

FOREIGN PATENT DOCUMENTS

| DE | 202014100712 A1 | 5/2015 |
| EP | 1503221 A1 | 2/2005 |
| EP | 1619469 A1 | 1/2006 |
| EP | 1906141 A1 | 2/2008 |
| EP | 2790079 A1 | 10/2014 |
| EP | 2890125 A1 | 7/2015 |
| EP | 1619469 A1 | 1/2016 |
| EP | 3165942 A1 | 5/2017 |
| EP | 3179272 A1 | 6/2017 |
| EP | 3309584 A1 | 4/2018 |
| JP | H06331744 A1 | 12/1994 |
| JP | 2011-145156 A1 | 7/2011 |
| JP | 2012127747 A1 | 7/2012 |
| JP | 2013224915 A1 | 10/2013 |
| JP | 2017062398 A1 | 3/2017 |
| KR | 10-0698534 A1 | 3/2007 |
| KR | 10-0757937 A1 | 9/2007 |
| KR | 10-0773344 A1 | 11/2007 |
| KR | 10-0785784 A1 | 12/2007 |
| KR | 10-2008-0048260 A1 | 6/2008 |
| KR | 10-0843085 A1 | 7/2008 |
| KR | 2008-0102842 A1 | 11/2008 |
| KR | 10-0919944 A1 | 10/2009 |
| KR | 2009-0109830 A1 | 10/2009 |
| KR | 20100015211 A1 | 2/2010 |
| KR | 10-2010-0031277 A1 | 3/2010 |
| KR | 20100098997 A1 | 9/2010 |
| KR | 10-2011-0010380 A1 | 2/2011 |
| KR | 10-1058571 A1 | 8/2011 |
| KR | 10-2011-0122022 A1 | 11/2011 |
| KR | 10-1083394 A1 | 11/2011 |
| KR | 10-1105737 A1 | 1/2012 |
| KR | 10-1202108 A1 | 11/2012 |
| KR | 10-2013-0020062 A1 | 2/2013 |
| KR | 10-2013-0034573 A1 | 4/2013 |
| KR | 2013-0137536 A1 | 12/2013 |
| KR | 10-2014-0009737 A1 | 1/2014 |
| KR | 2014-0073177 A1 | 6/2014 |
| KR | 2014-0109175 A1 | 9/2014 |
| KR | 10-1483041 A1 | 1/2015 |
| KR | 10-2015-0014237 A1 | 2/2015 |
| KR | 10-2015-0050159 A1 | 5/2015 |
| KR | 10-1552687 A1 | 9/2015 |
| KR | 10-2016-0088147 A1 | 7/2016 |
| KR | 2016-0111571 A1 | 9/2016 |
| KR | 2016-0113794 A1 | 10/2016 |
| KR | 10-2017-0008614 A1 | 1/2017 |
| KR | 10-1708659 A1 | 2/2017 |
| KR | 10-1725060 A1 | 4/2017 |
| KR | 20170037197 A1 | 4/2017 |
| KR | 10-2017-0073515 A1 | 6/2017 |
| KR | 2017-0088228 A1 | 8/2017 |
| KR | 10-1775114 A1 | 9/2017 |
| KR | 10-1776620 A1 | 9/2017 |
| KR | 10-1776621 A1 | 9/2017 |
| KR | 10-1776622 A1 | 9/2017 |
| KR | 10-1784183 A1 | 10/2017 |
| WO | 2007025240 A1 | 3/2007 |
| WO | 10-1331790 A1 | 11/2013 |
| WO | 2015155812 A1 | 10/2015 |
| WO | 2016/098912 A1 | 6/2016 |
| WO | 2017122529 A1 | 7/2017 |
| WO | 2018130885 A1 | 7/2018 |

OTHER PUBLICATIONS

Feng Li et al., IEEE computer society conference on computer vision and pattern recognition, Jun. 2008, pp. 1-8.
Wikipedia: "Barcode", Aug. 17, 2017, XP055833706, Retrieved from the Internet URL: https://en.wikipedia.org/w/index.php?title=Barcode&oldid=795974695 [retrieved on Aug. 20, 2021].
Hoonje Woo, Jaehwan Kim, Sanghoon Lee, Byungwoo Kim, Obstacle Avoidance for Unmanned Ground Vehicle using Multiple Laser Scanners, Apr. 2009, pp. 960-965, The Korean Society of Automotive Engineers, Korea.
Feng Li, Jingyi Yu and Jinxiang Chai, A Hybrid Camera for Motion Deblurring and Depth Map Super-Resolution, IEEE computer society conference on computer vision and pattern recognition, Jun. 2008, pp. 1-8.
Jinwook Huh, Woong Sik Chung, Sang Yep Nam and Wan Kyun Chung, International Conference on Intelligent Robots and Systems, ETRI Journal, vol. 29, No. 2, Apr. 2007.
Jun Hwan Jang etc., "Development of a Pulsed Time-of-Flight Based LIDAR for Distance, Shape Measurement and Applications", Spring and Autumn Conference, The Korean Society of Mechanical Engineers, May 2015, pp. 144-145.

* cited by examiner

[FIG. 1]
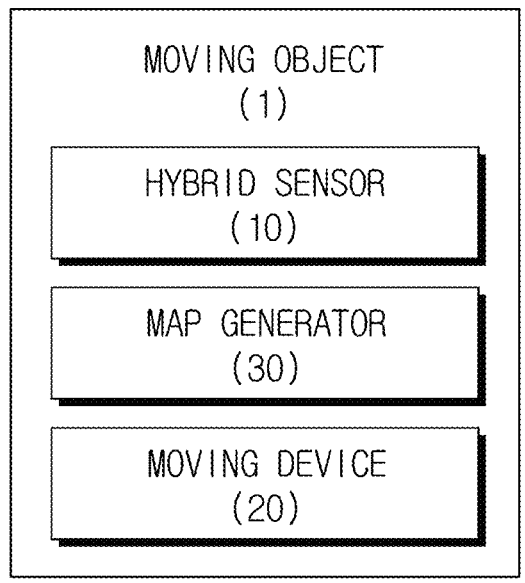
[FIG. 2]
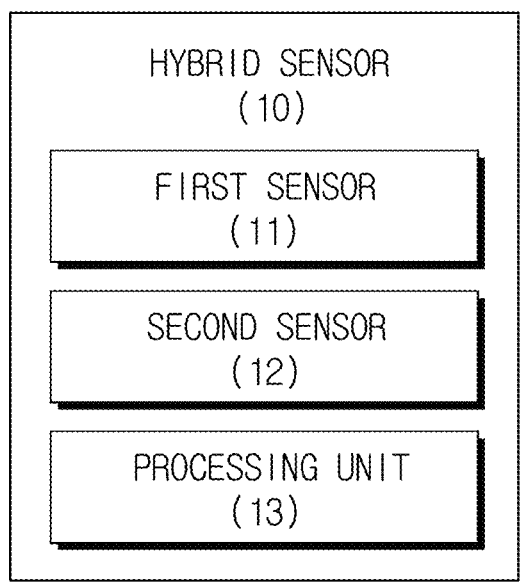

[FIG. 3]
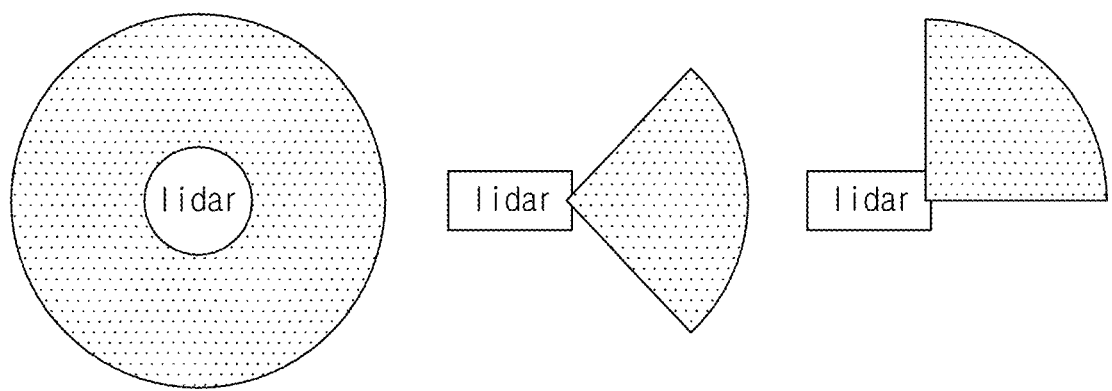
[FIG. 4]
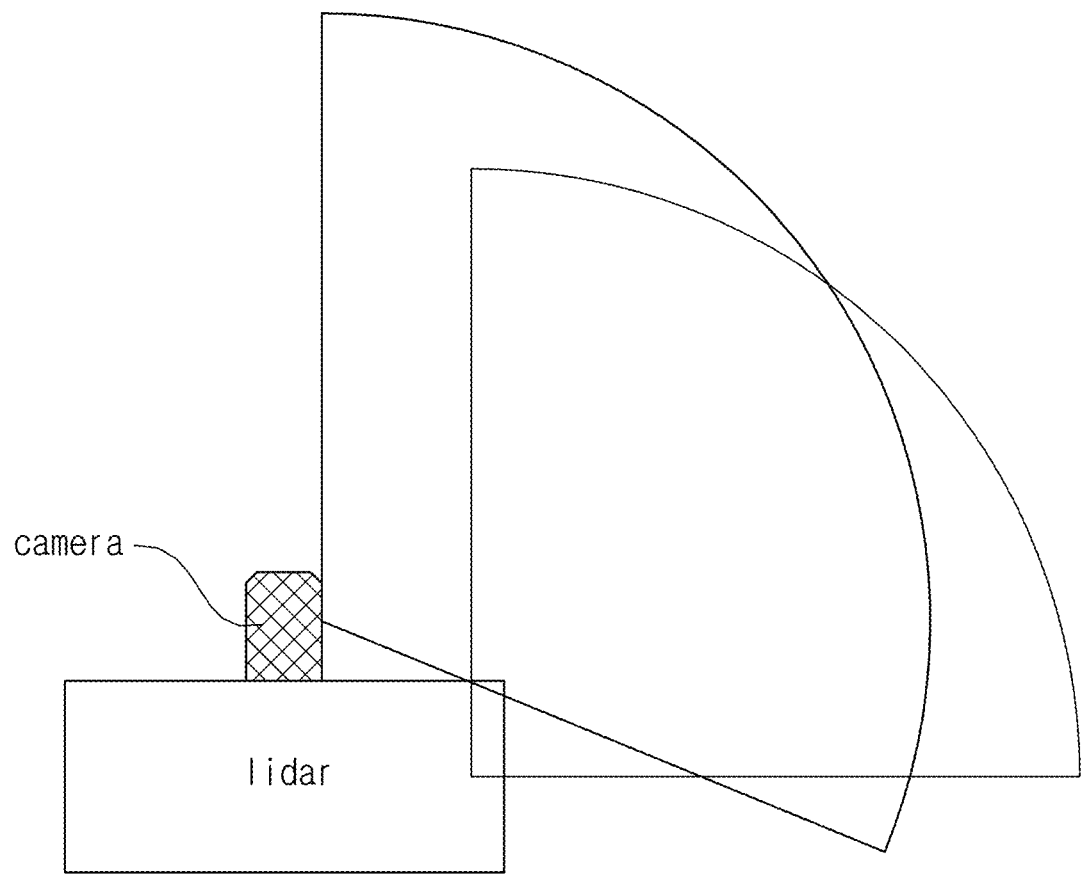

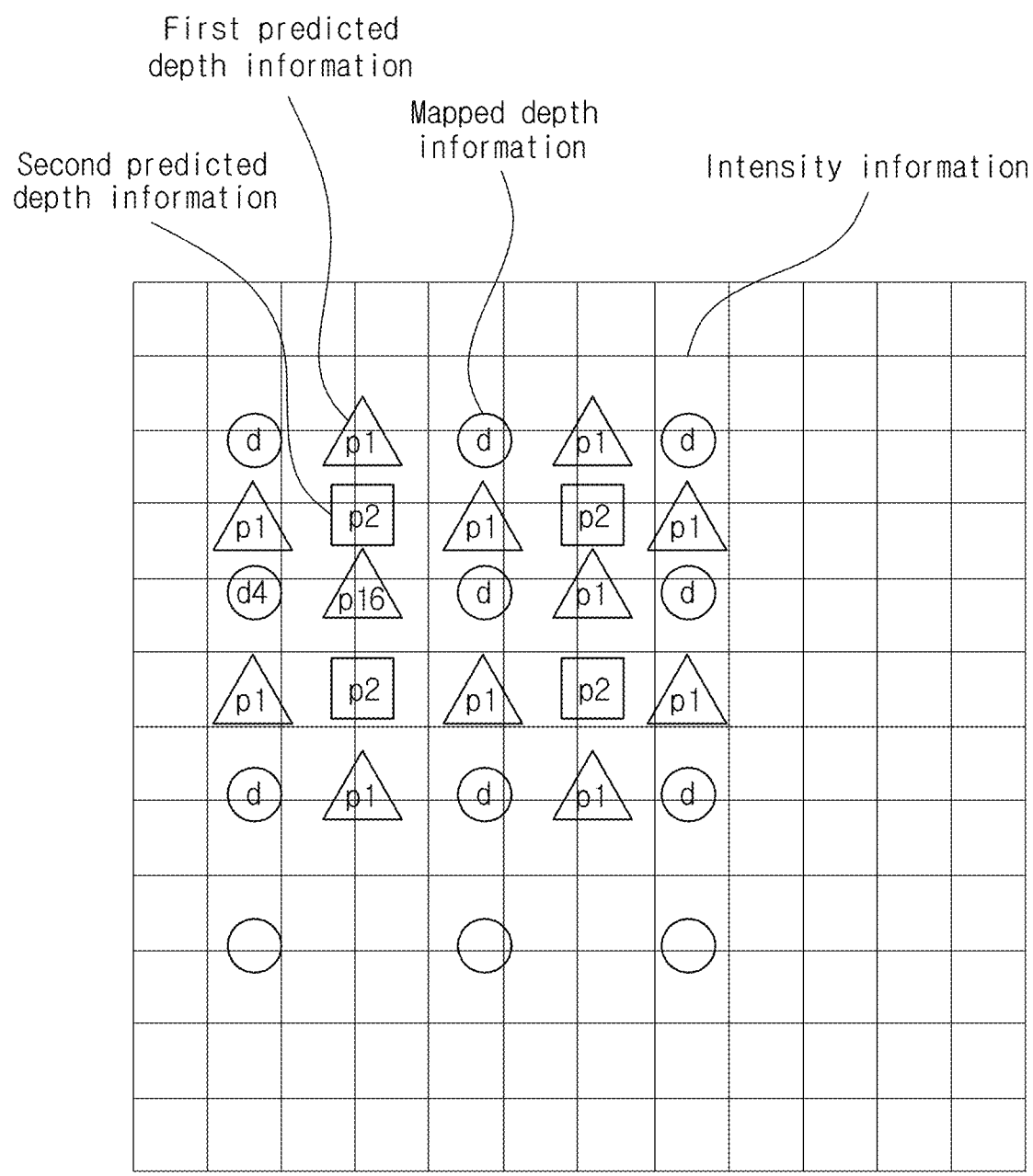

[FIG. 6A]
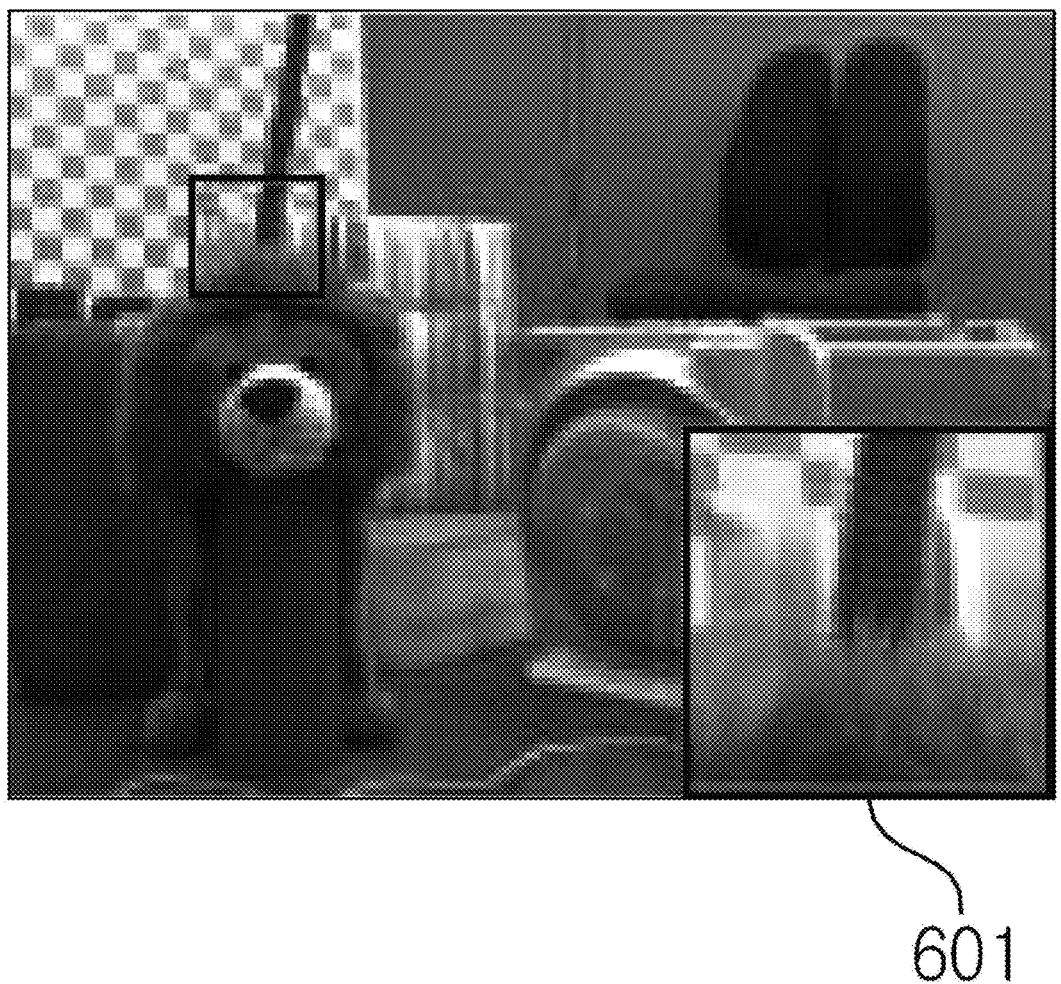

[FIG. 6B]
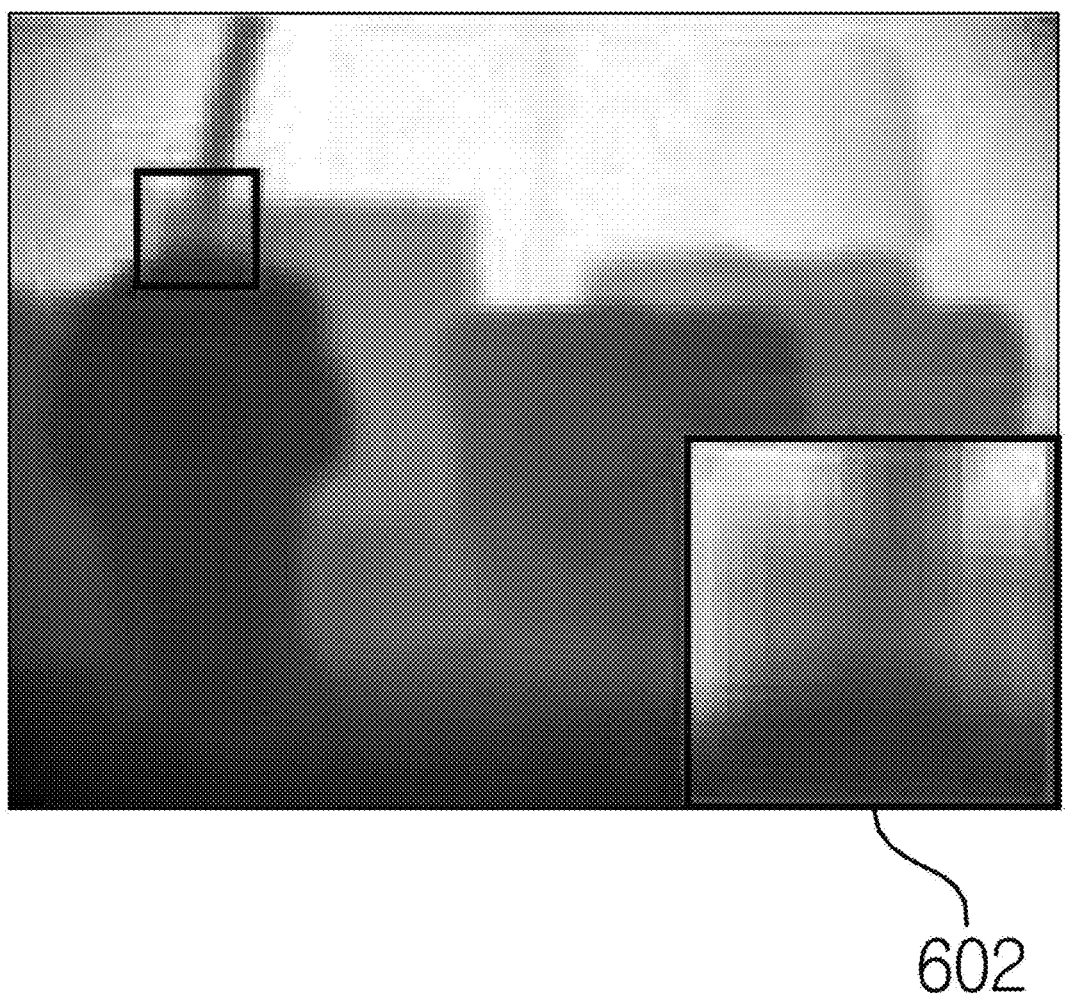

[FIG. 6C]
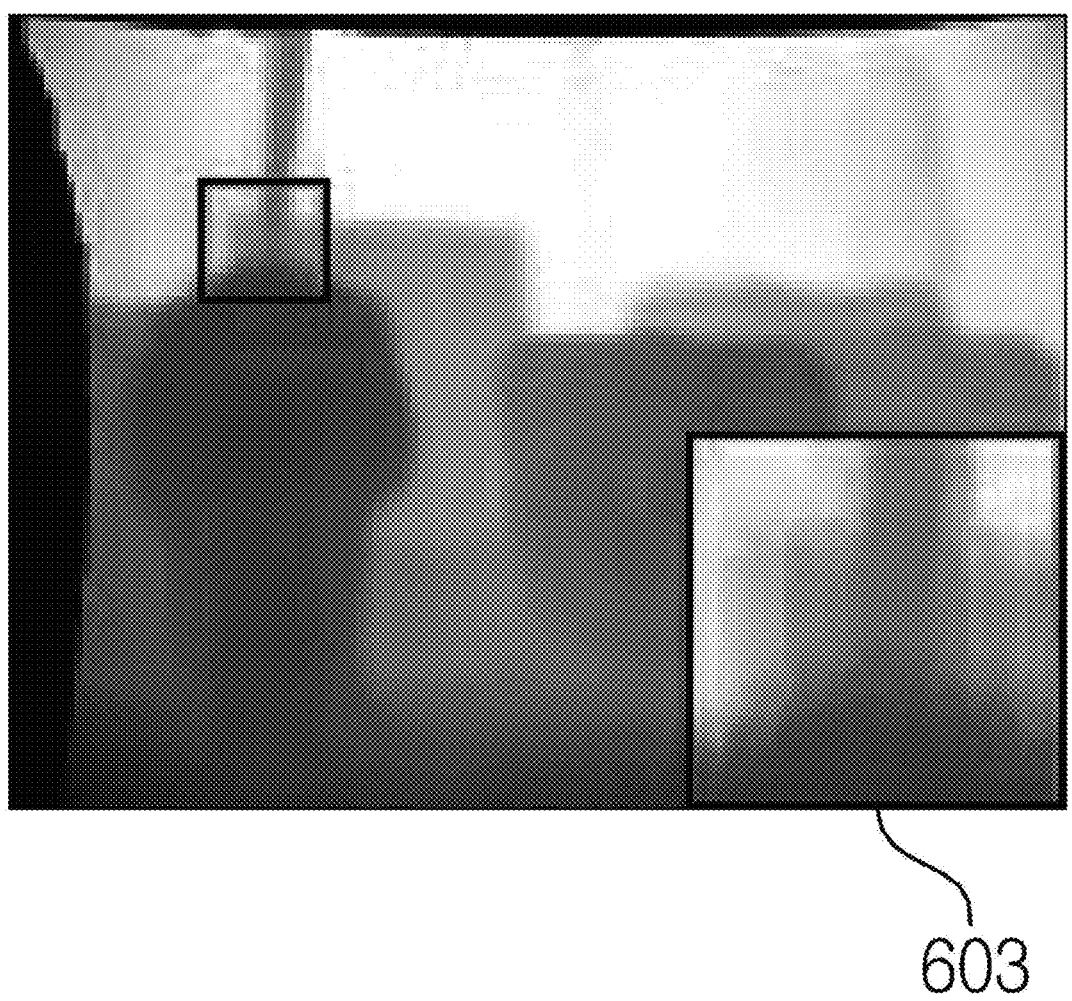

[FIG. 6D]
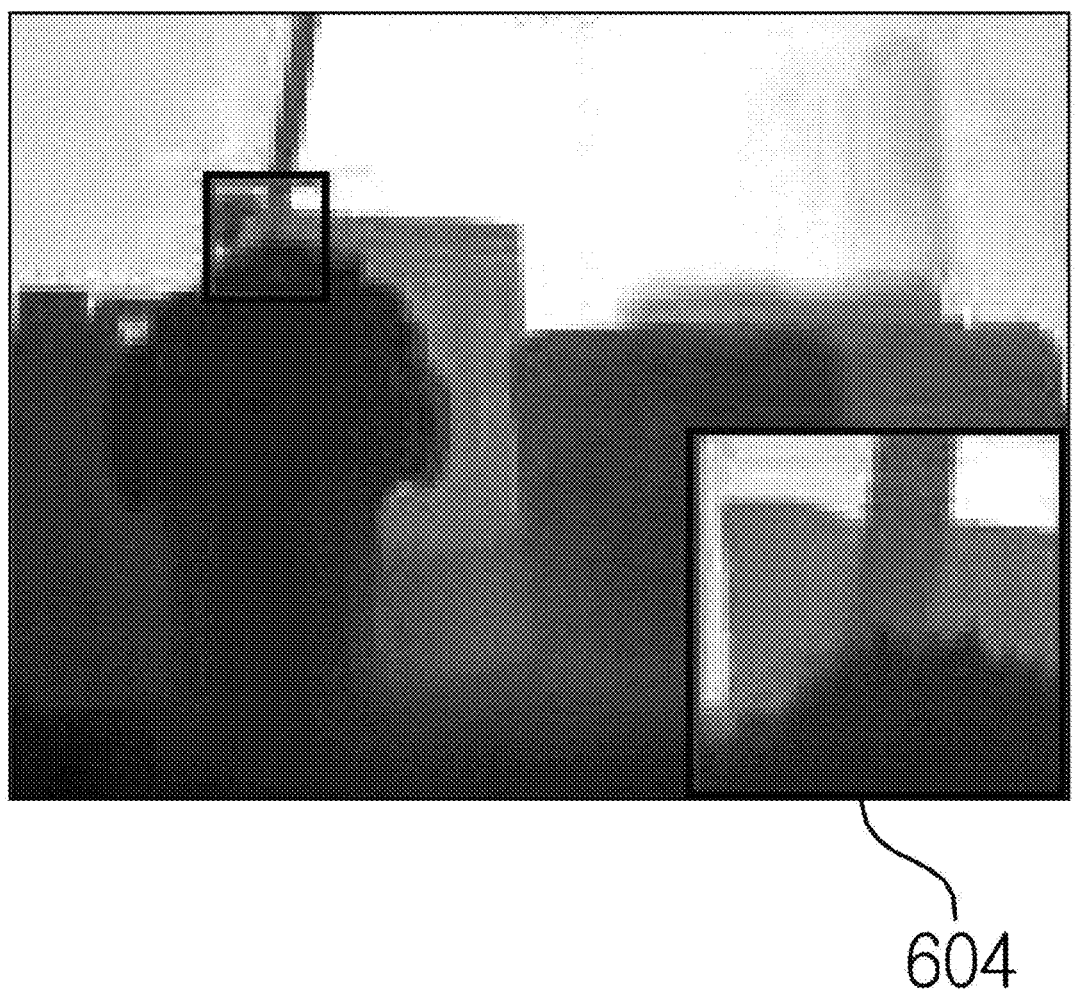

[FIG. 7]
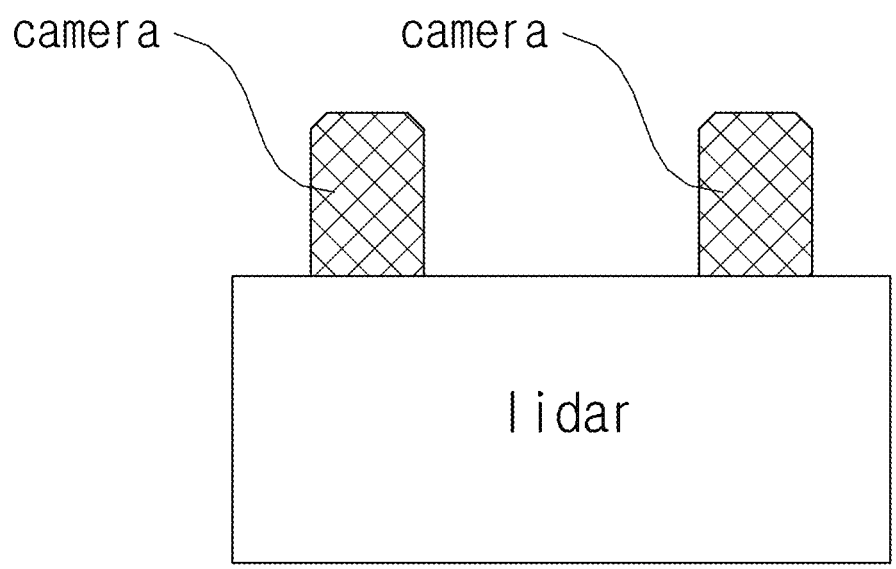
[FIG. 8]
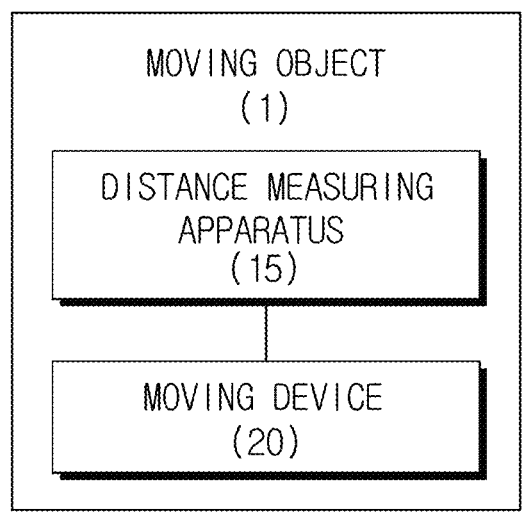

[FIG. 9]
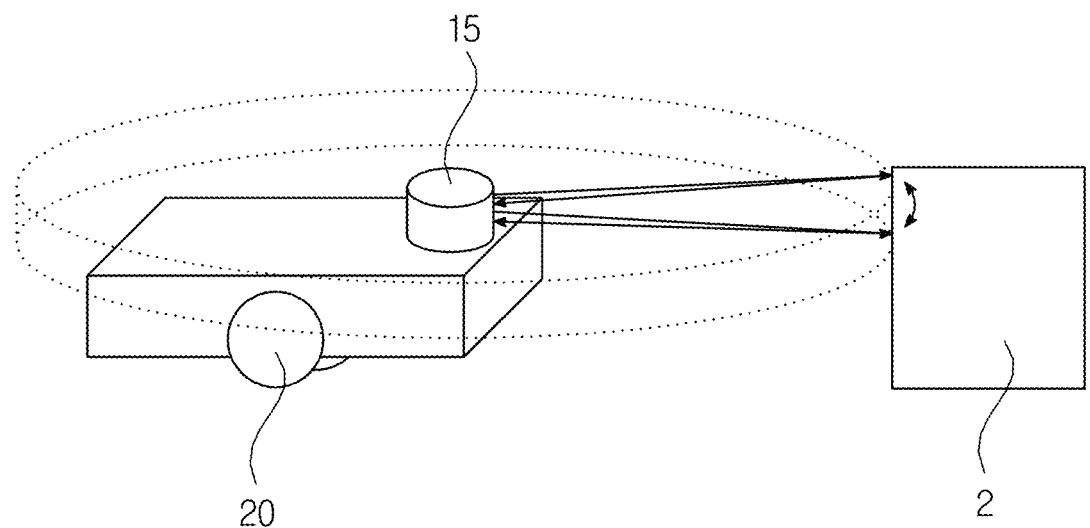
[FIG. 10]
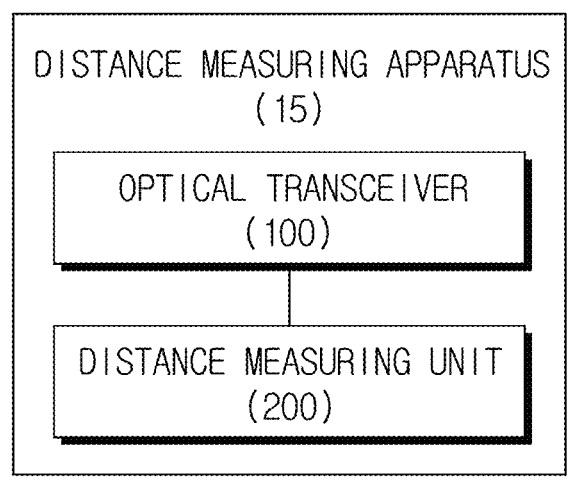

[FIG. 11]
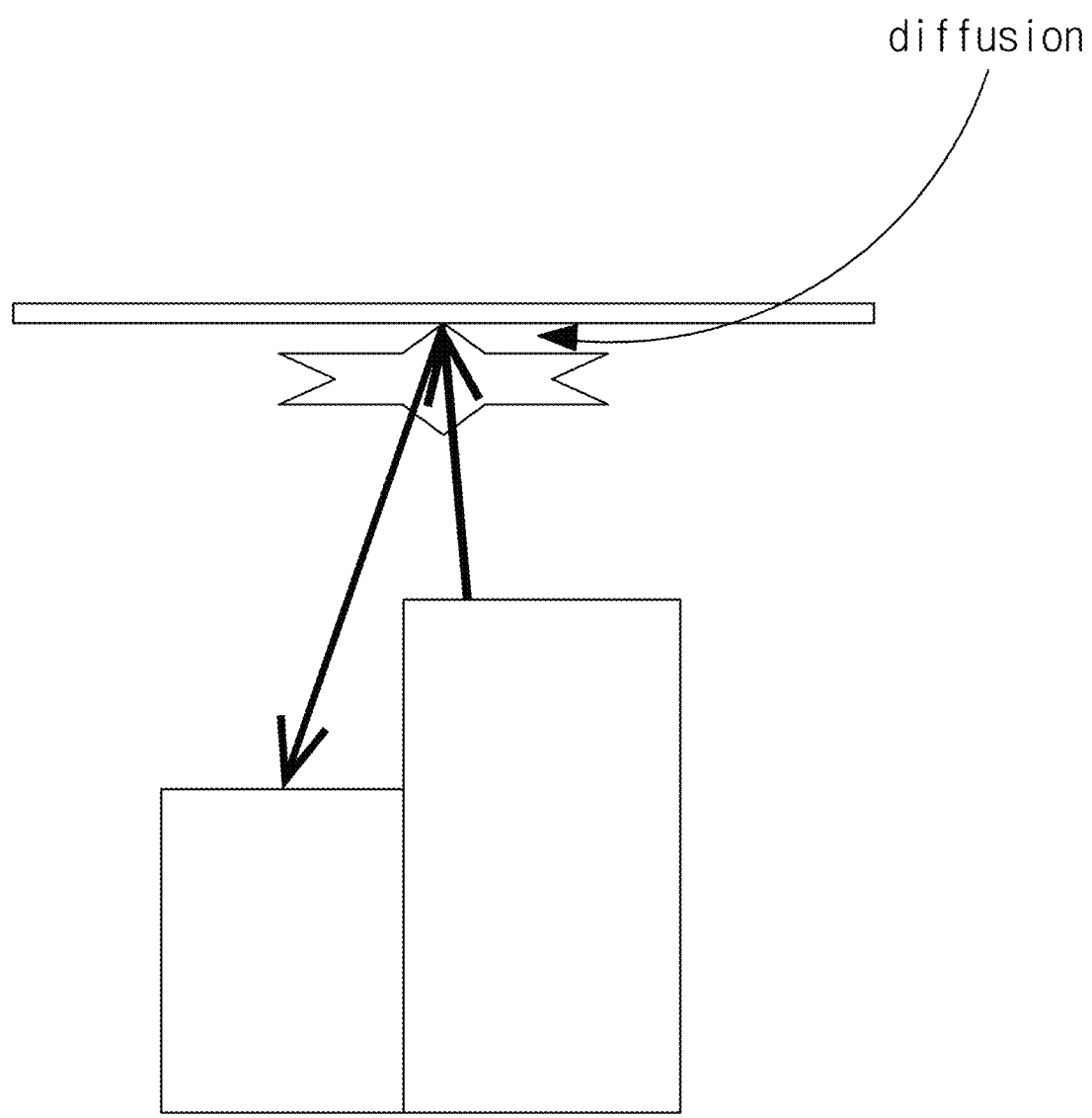

[FIG. 12]
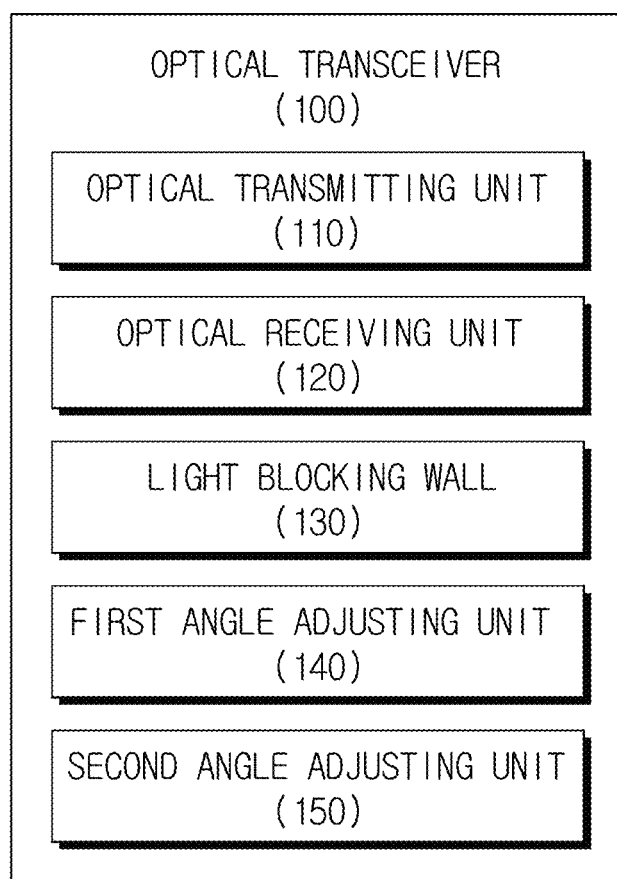

[FIG. 13]
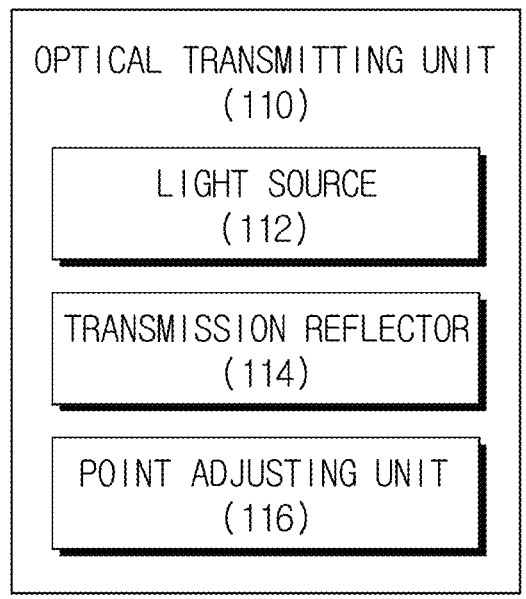
[FIG. 14]
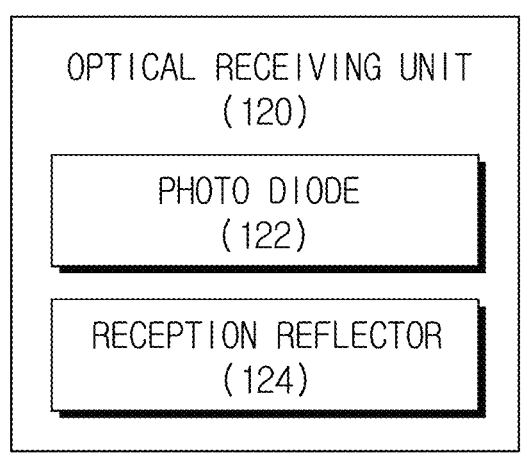

[FIG. 15]
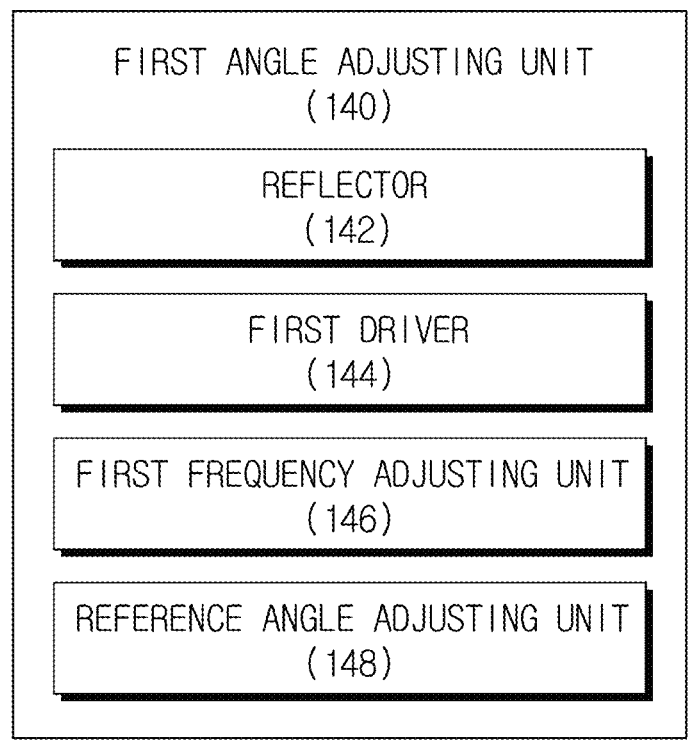

[FIG. 16A]
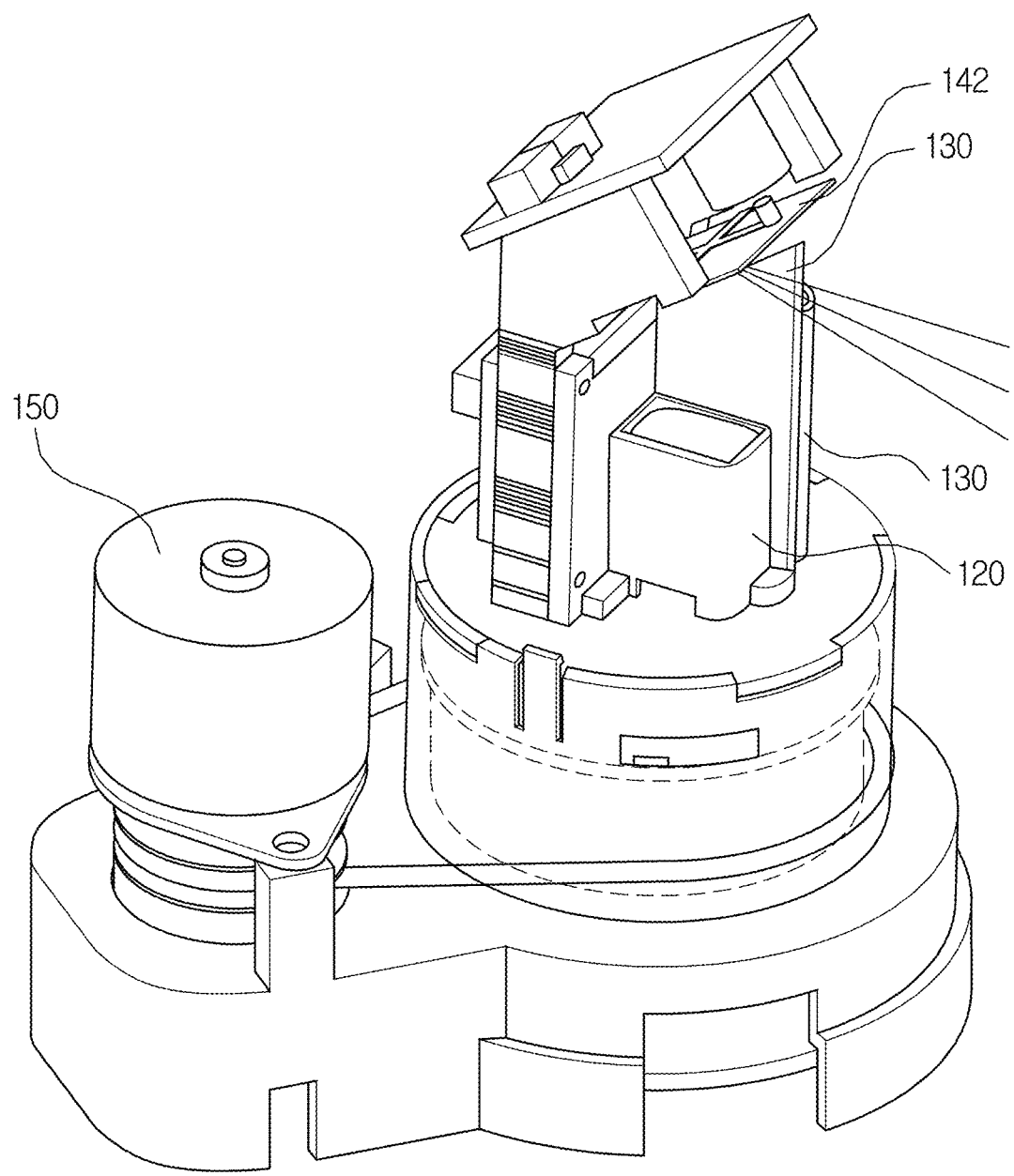

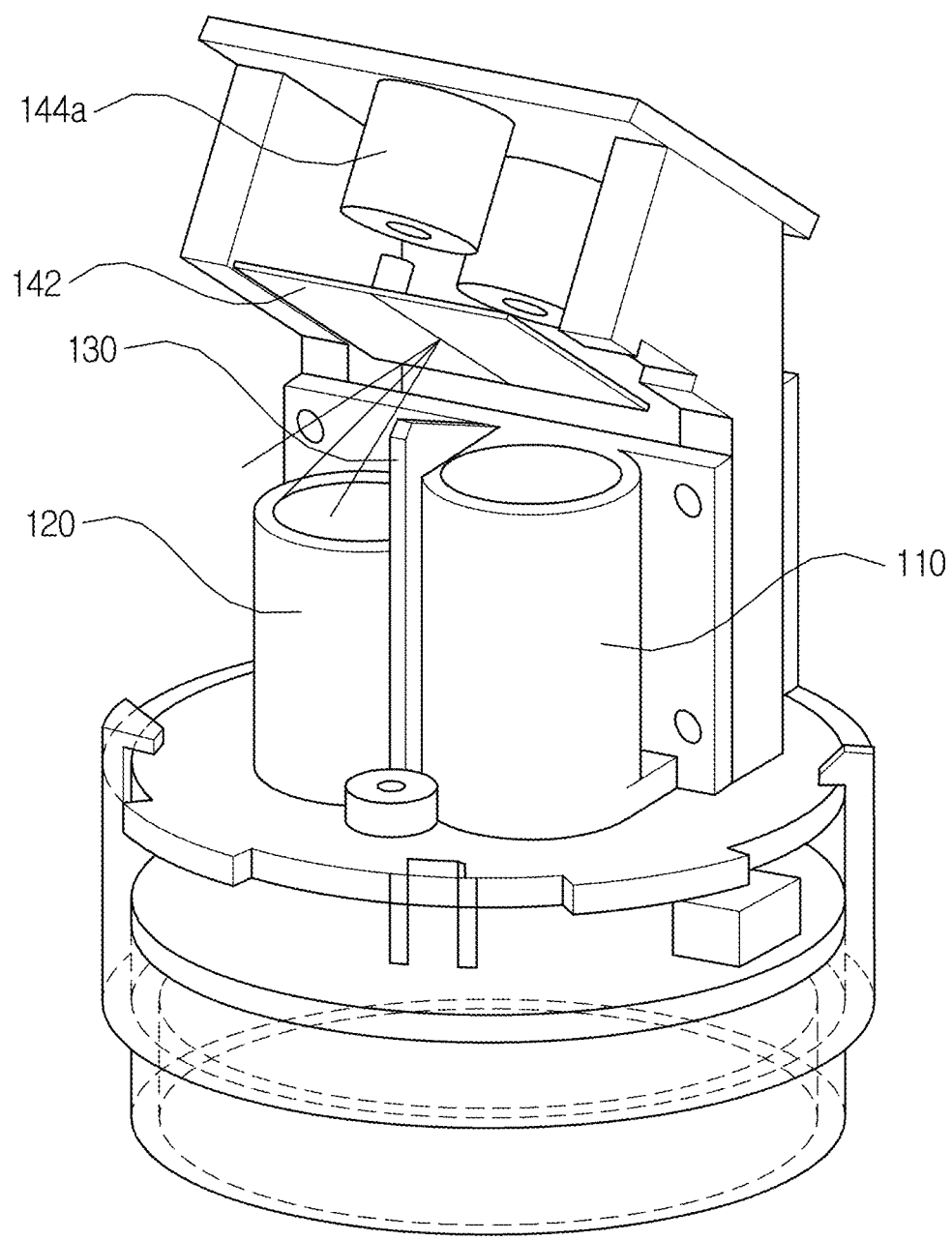
[FIG. 16B]

[FIG. 16C]
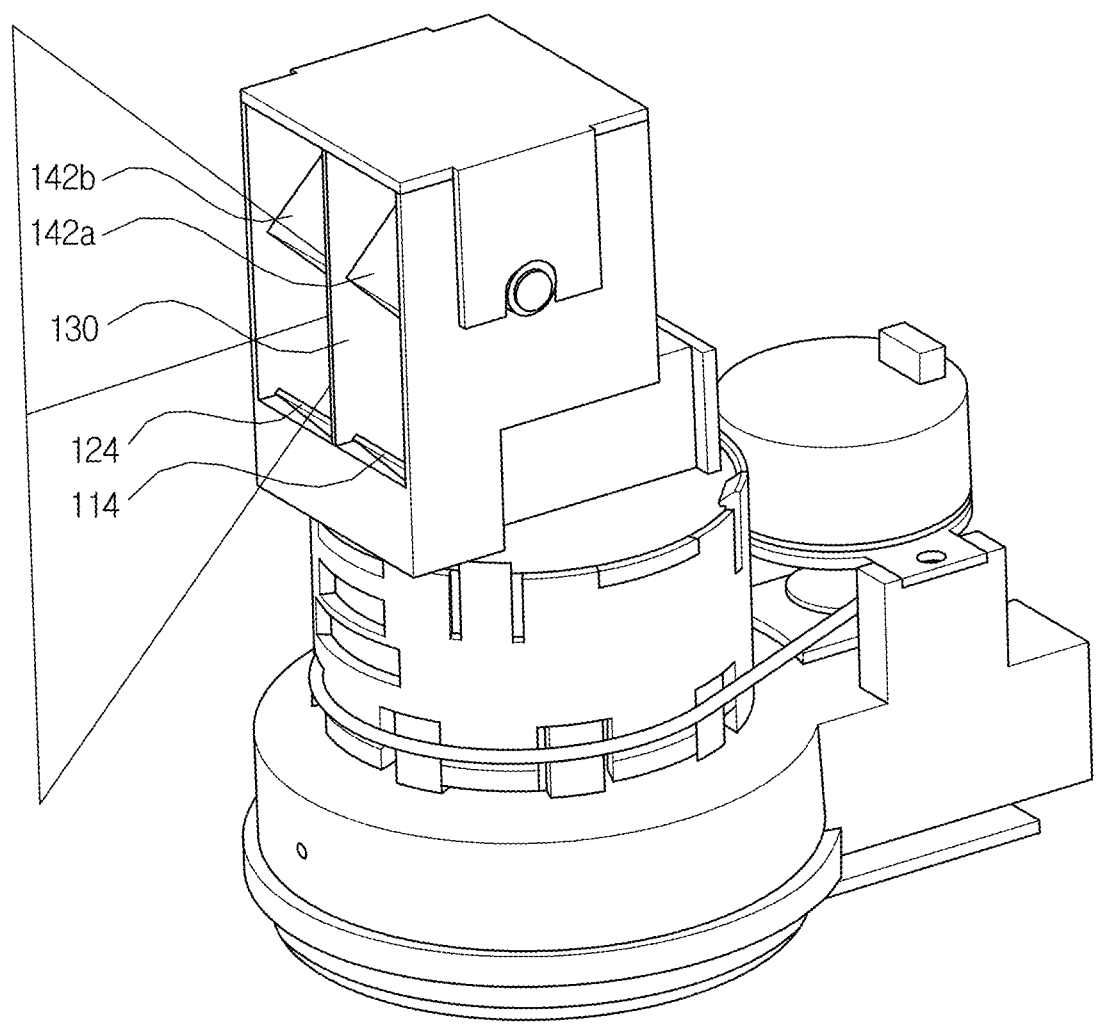

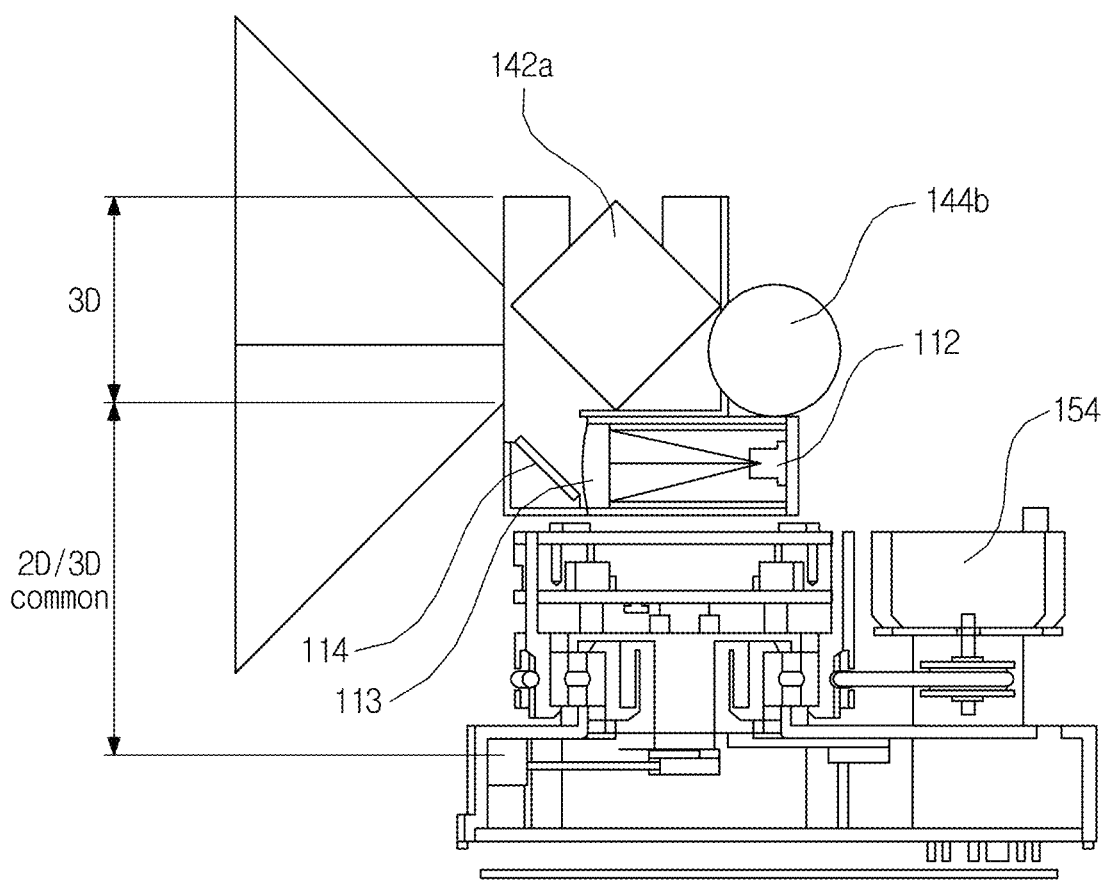
[FIG. 16D]

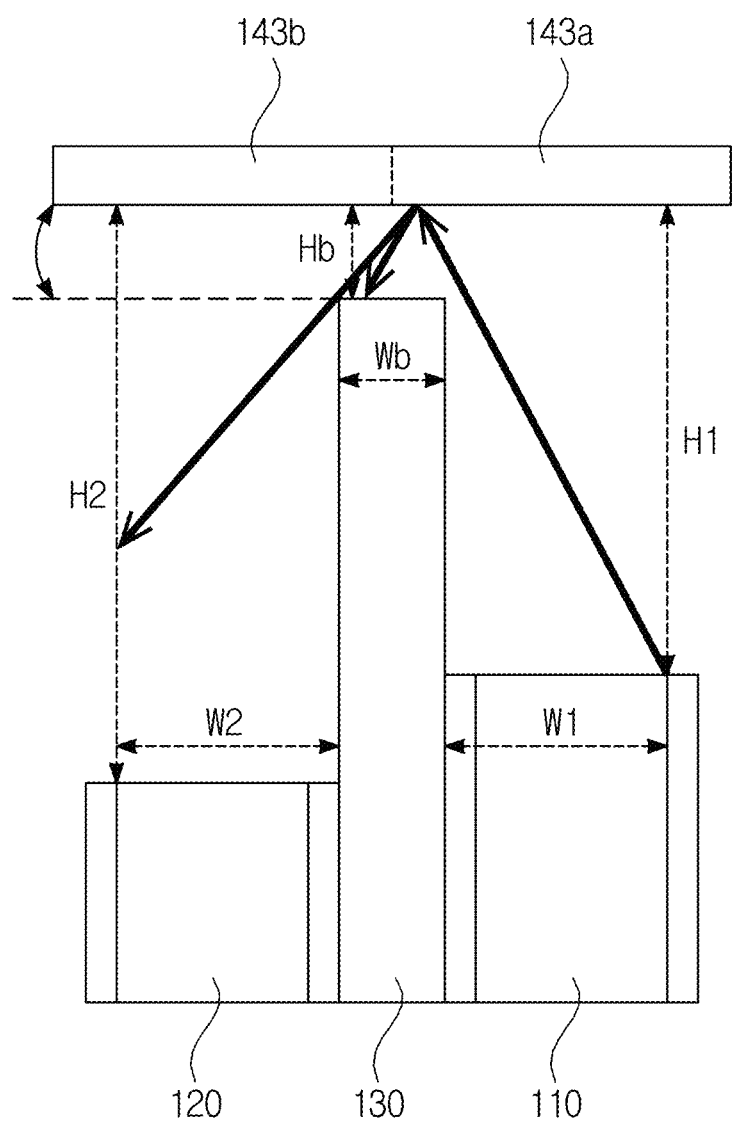

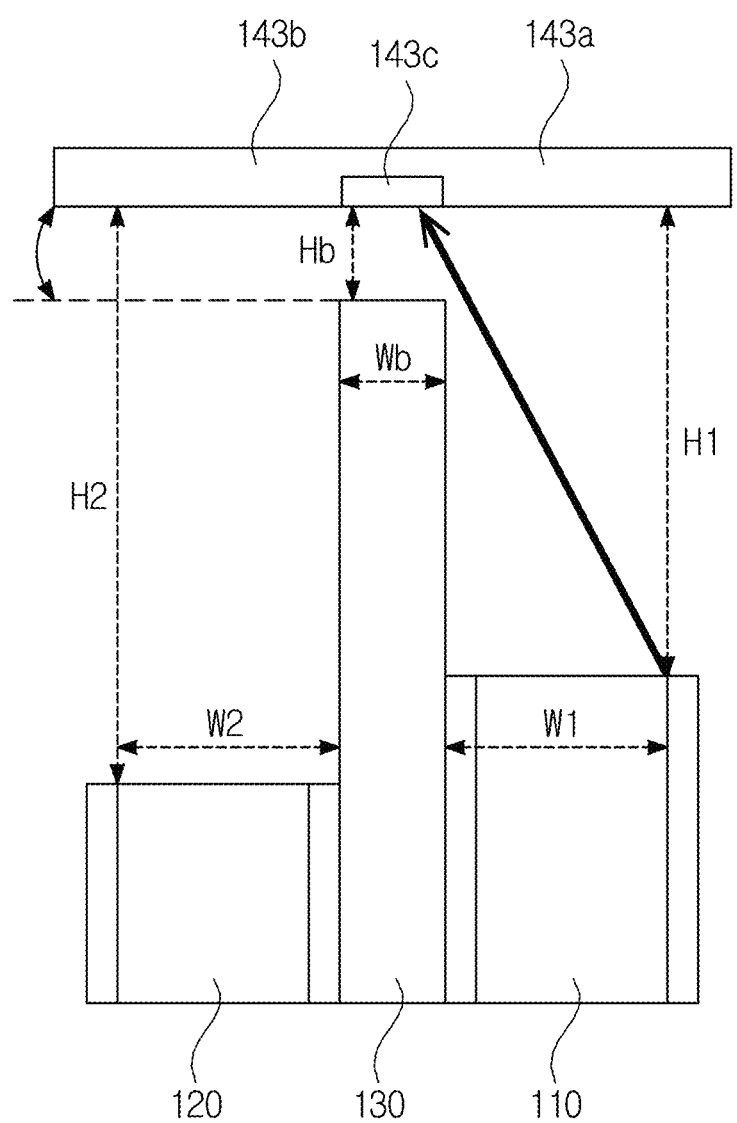
[FIG. 17B]

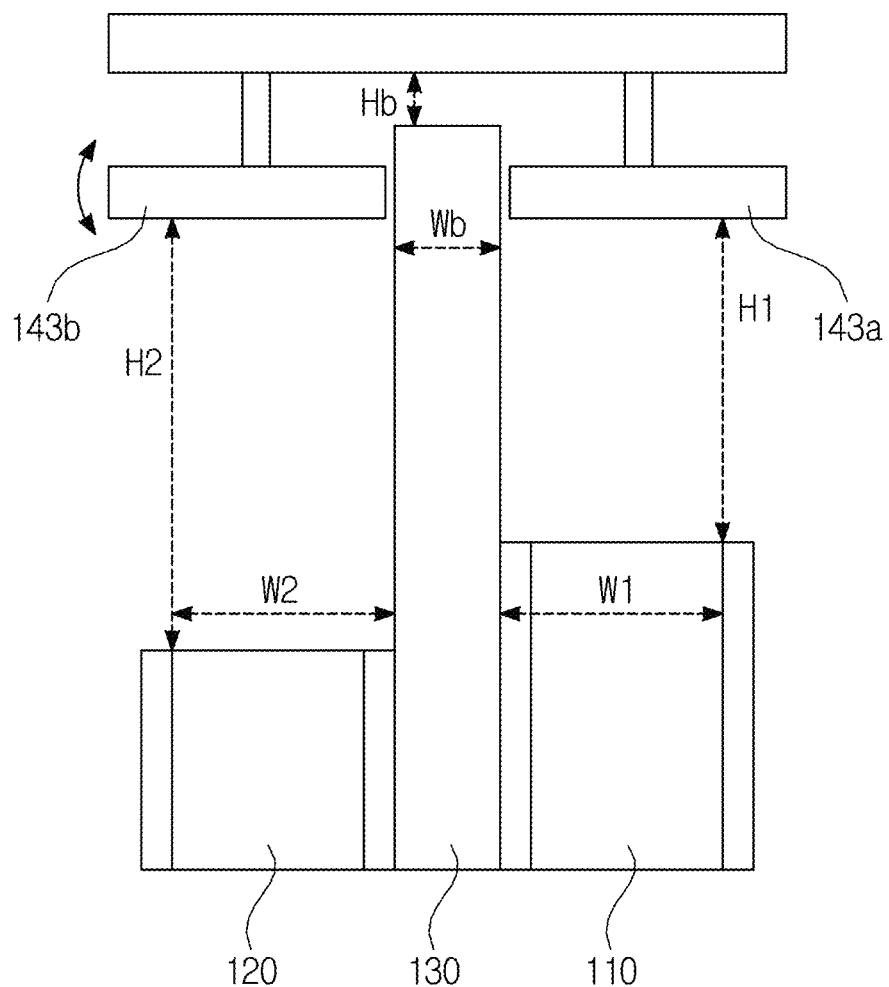
[FIG. 17C]

[FIG. 17D]
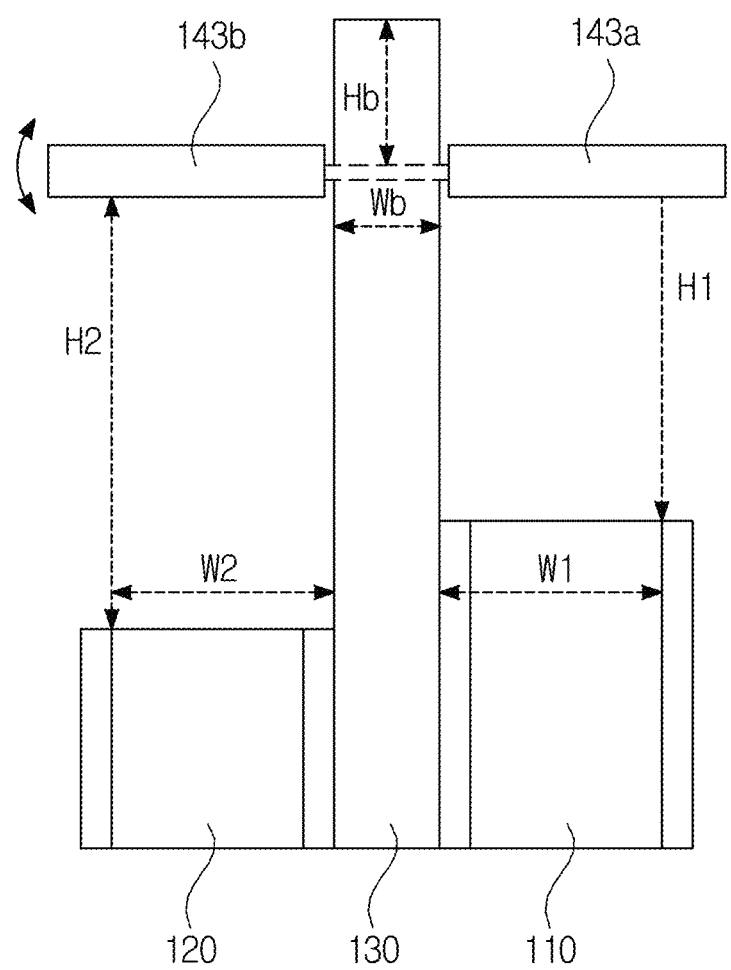

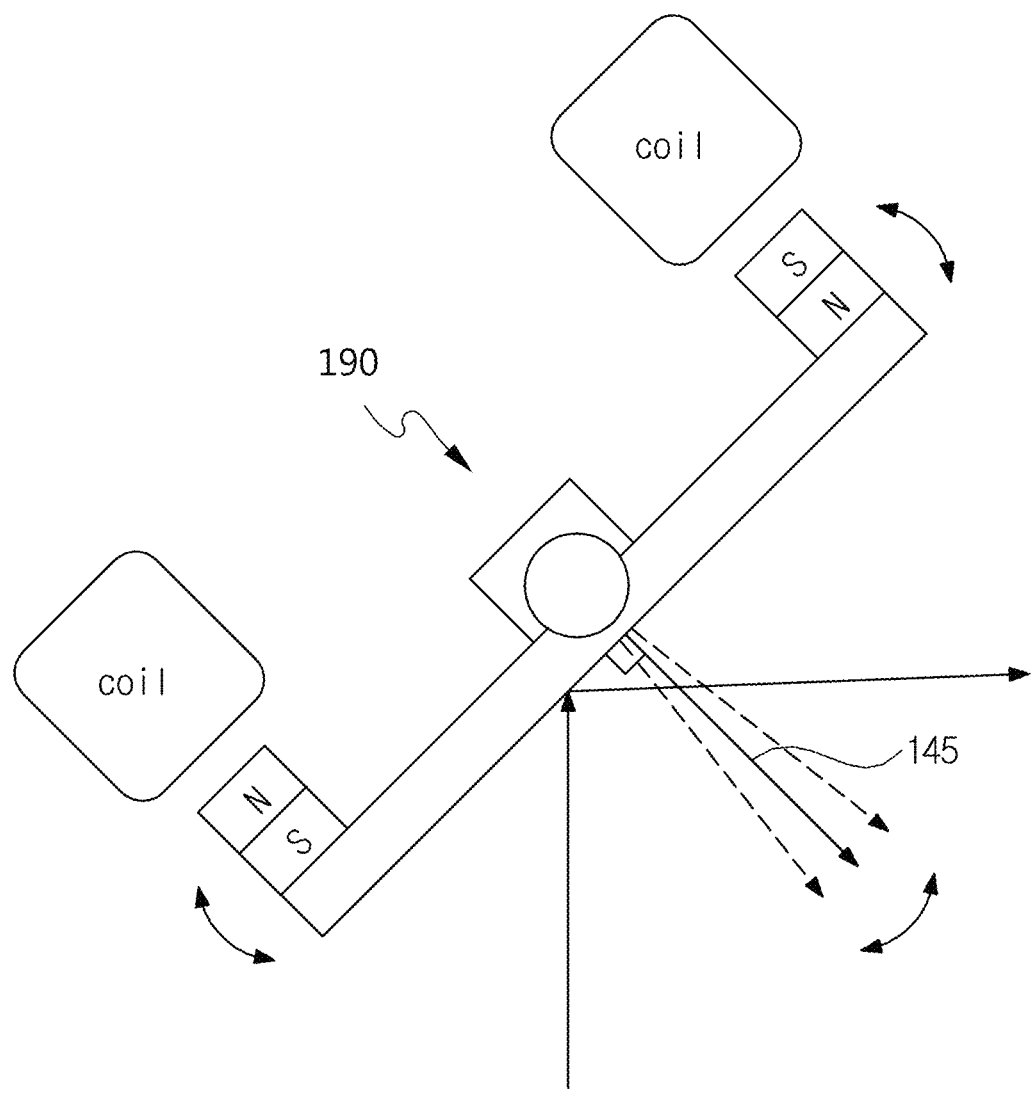
[FIG. 18A]

[FIG. 18B]
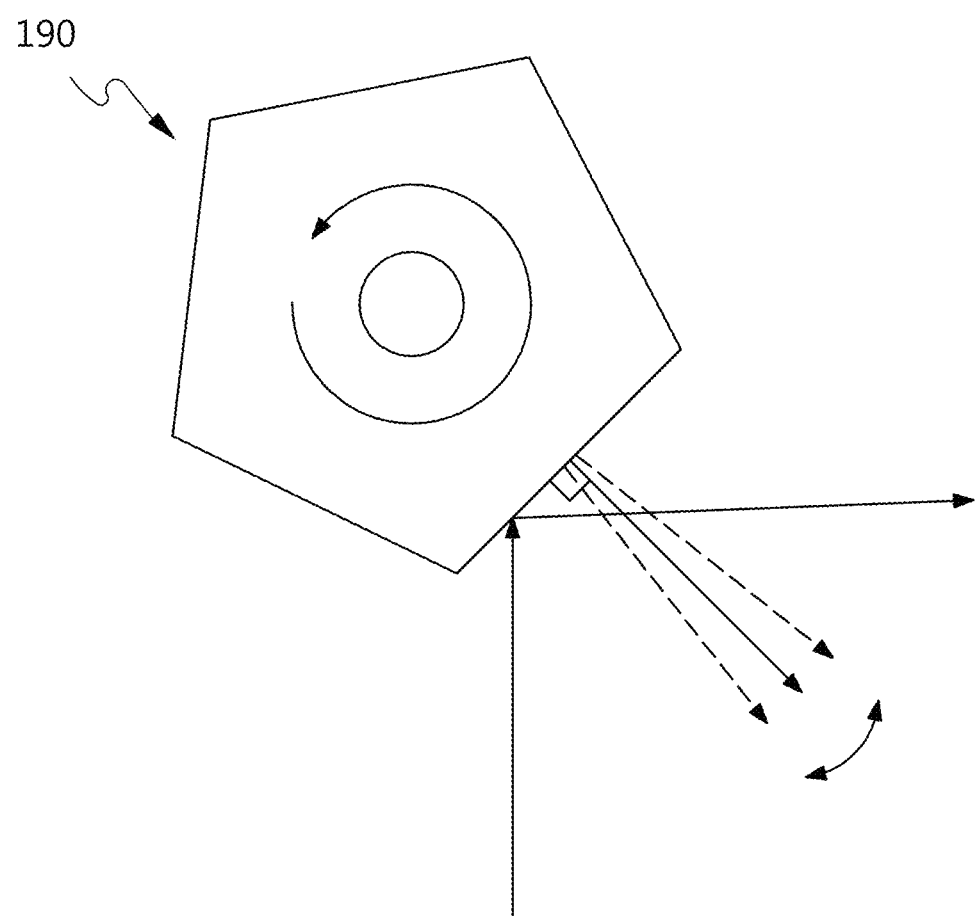

[FIG. 18C]
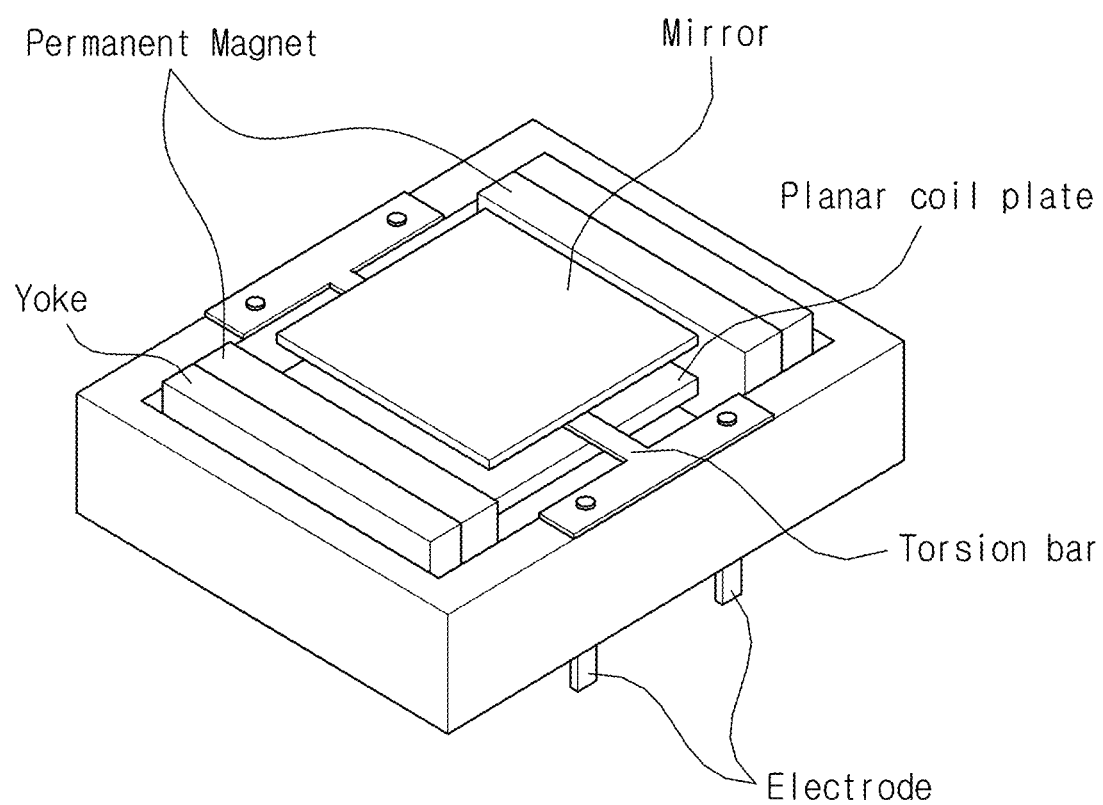

[FIG. 18D]
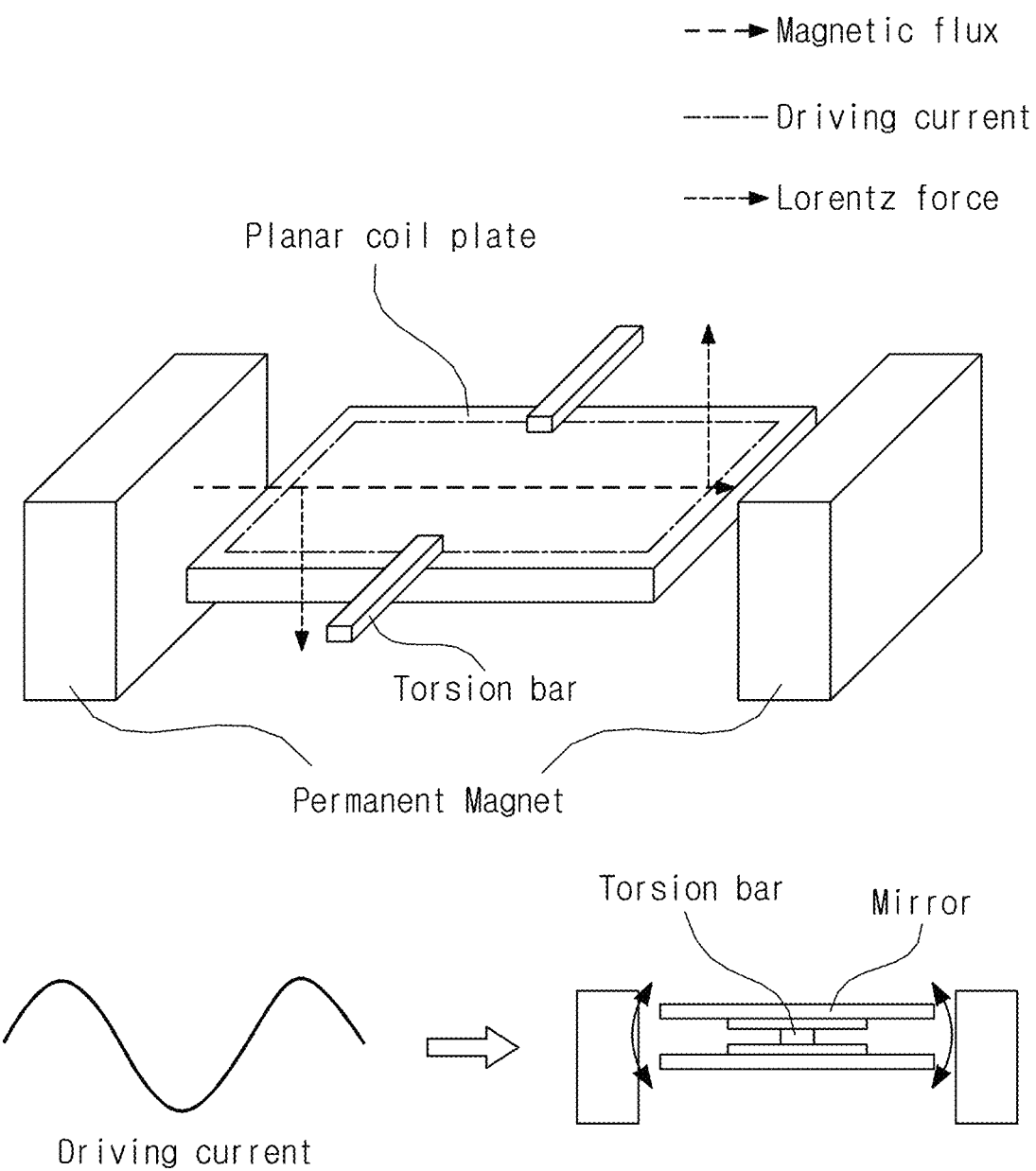

[FIG. 19A]
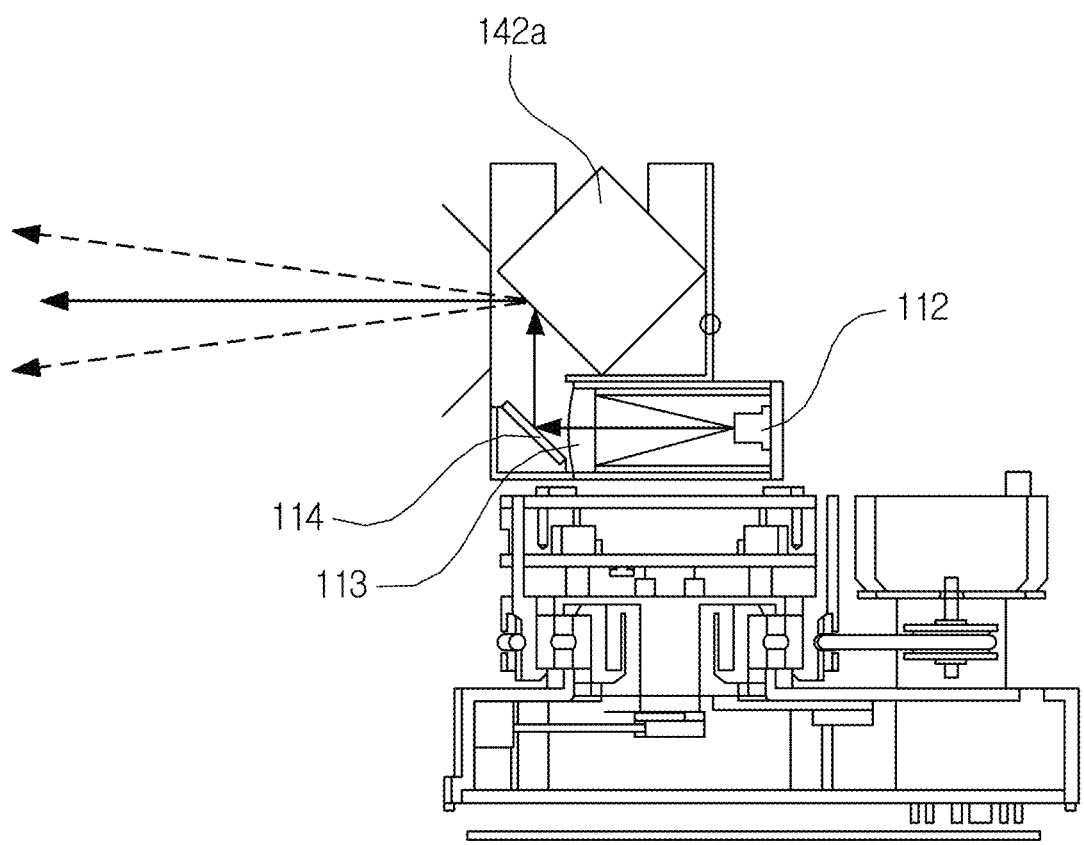

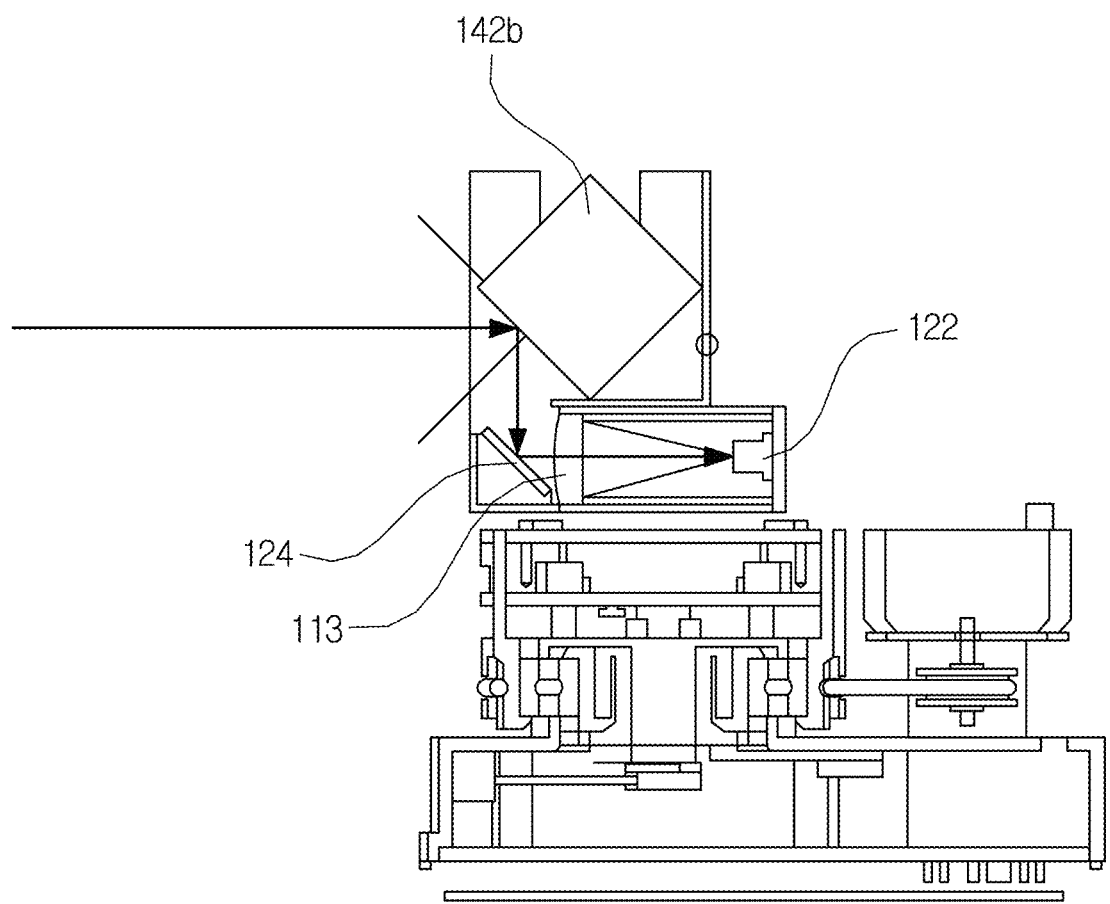
[FIG. 19B]

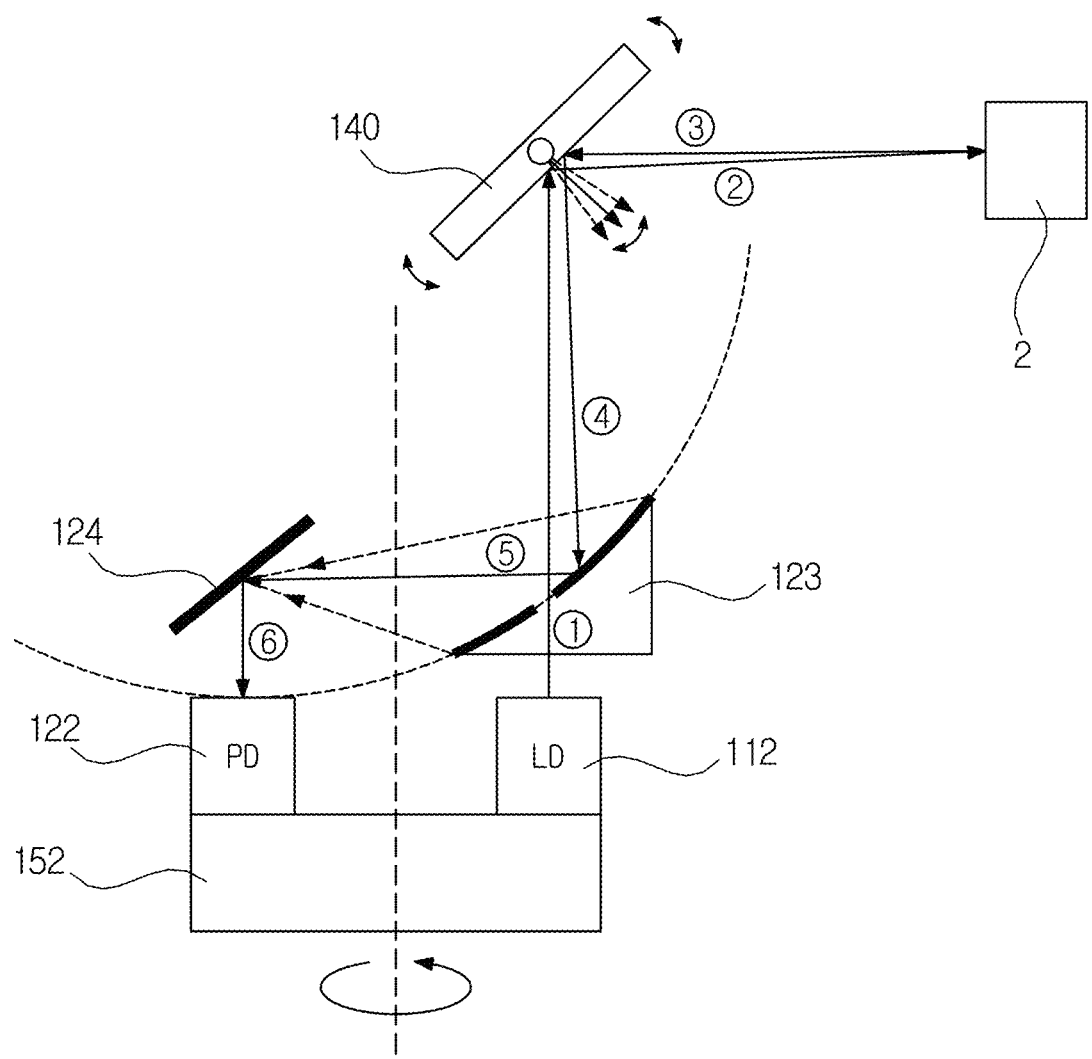
[FIG. 20]

[FIG. 21]
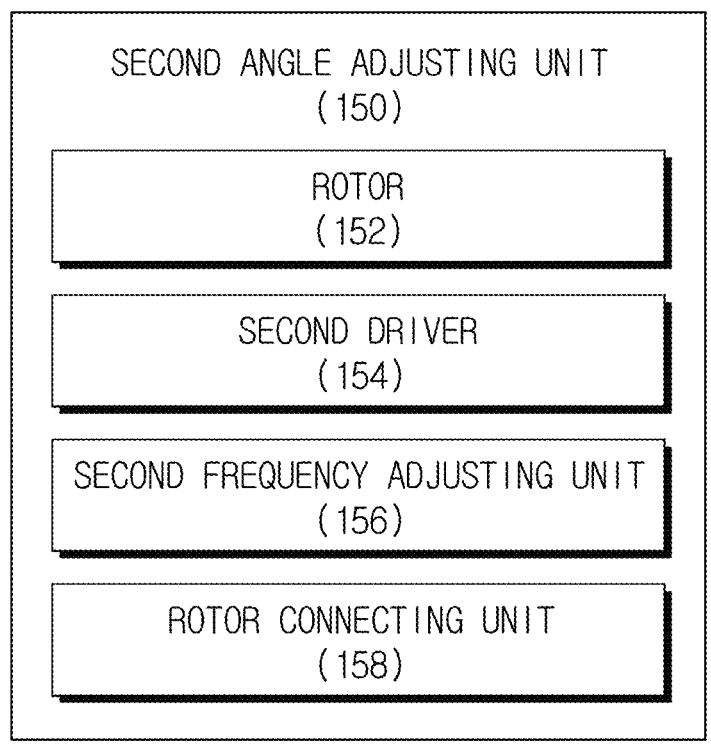

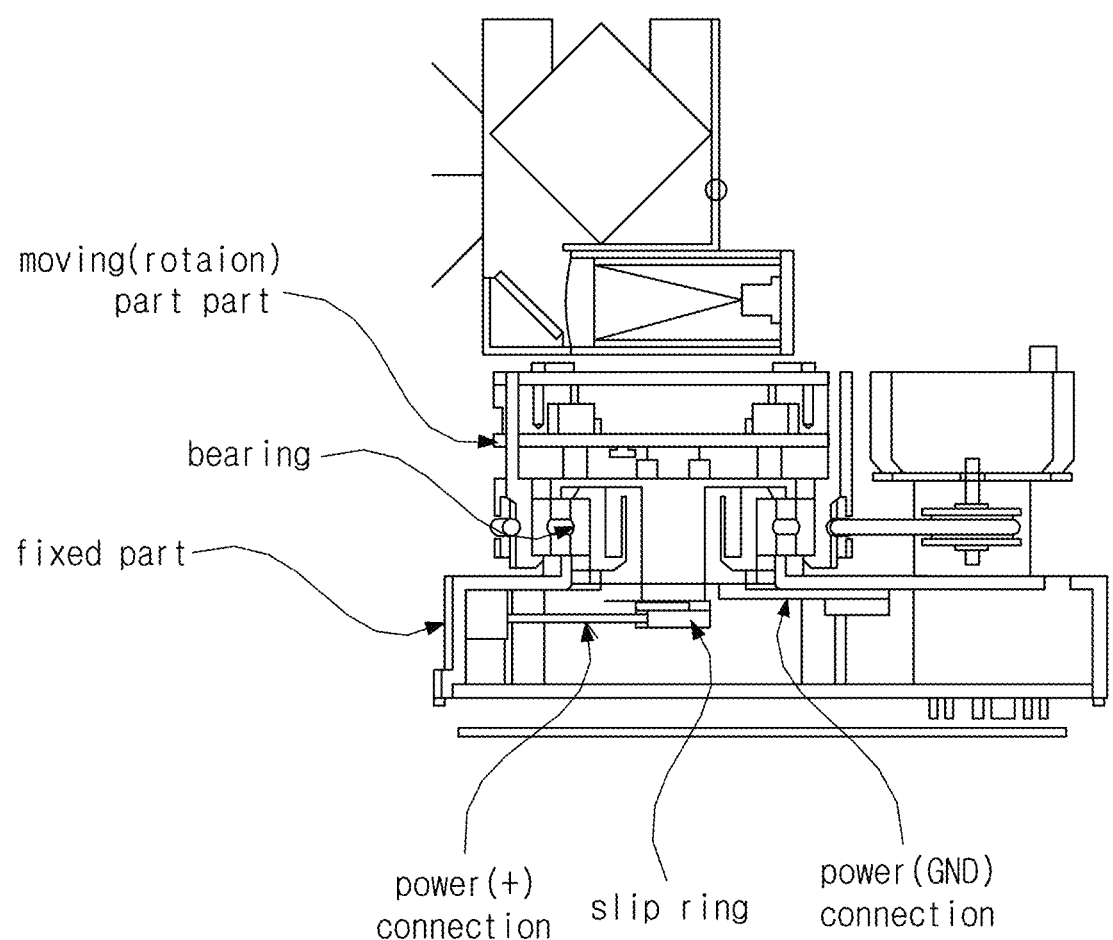
[FIG. 22]

[FIG. 23]
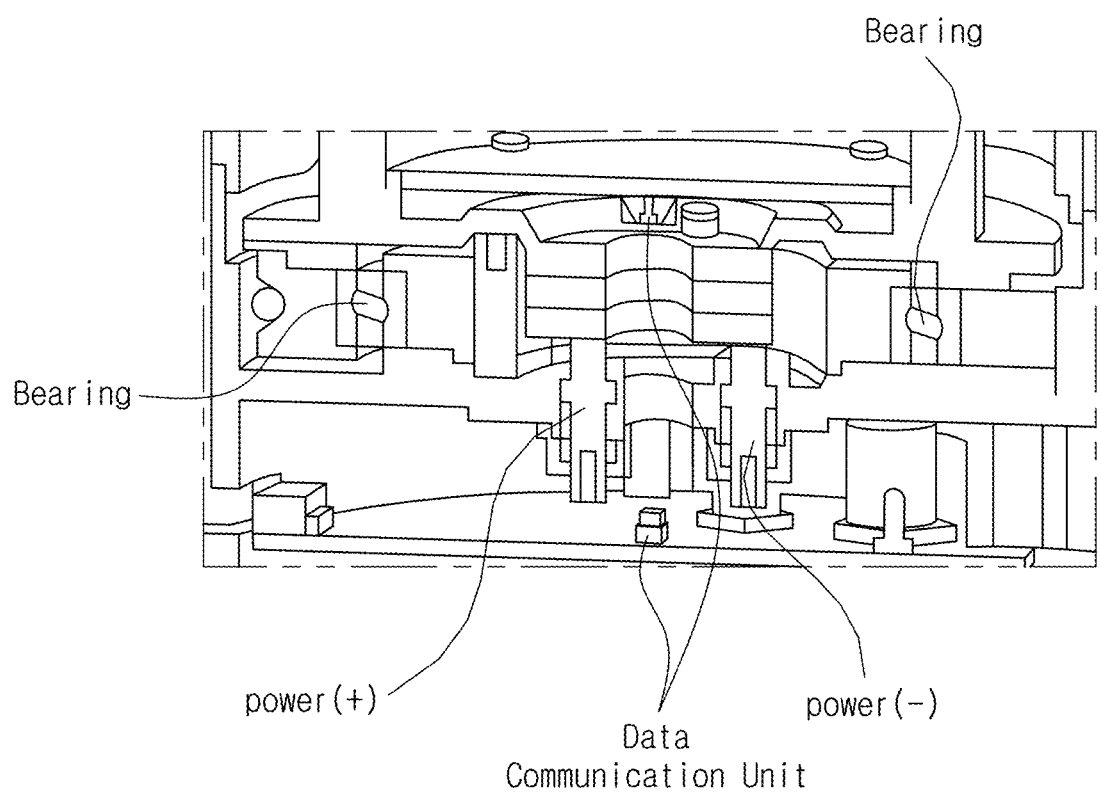

[FIG. 24]
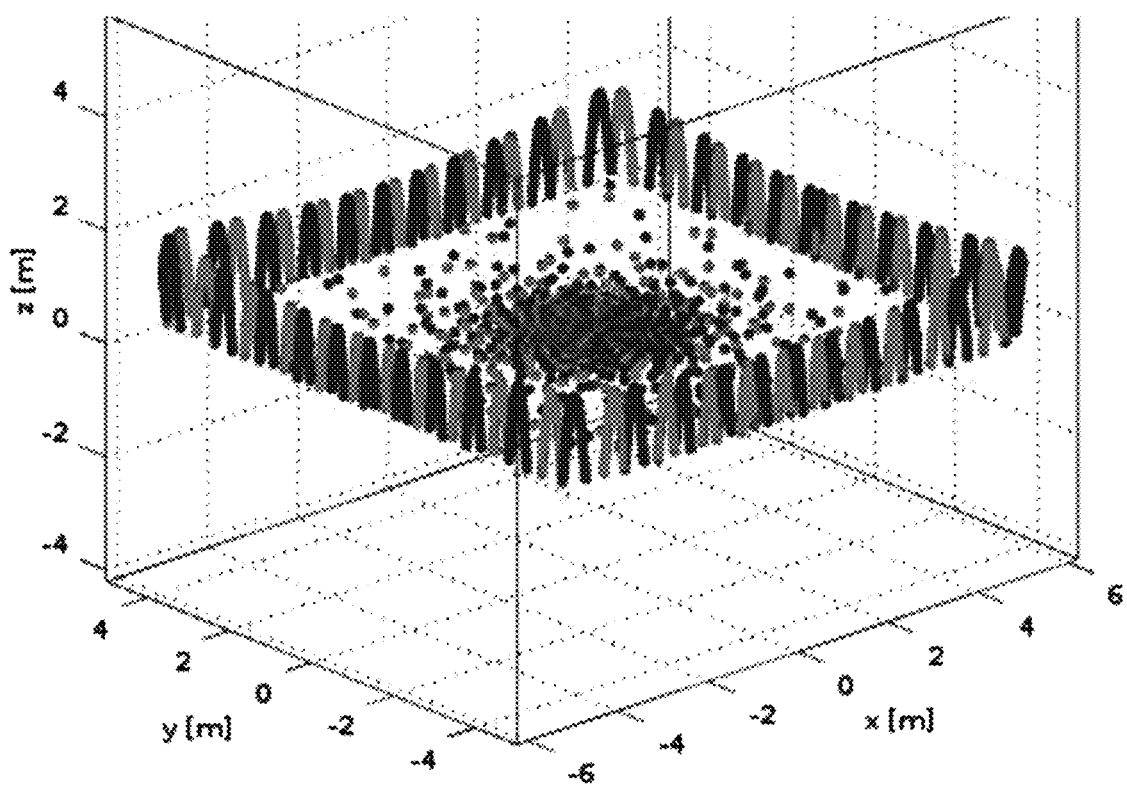

[FIG. 25]
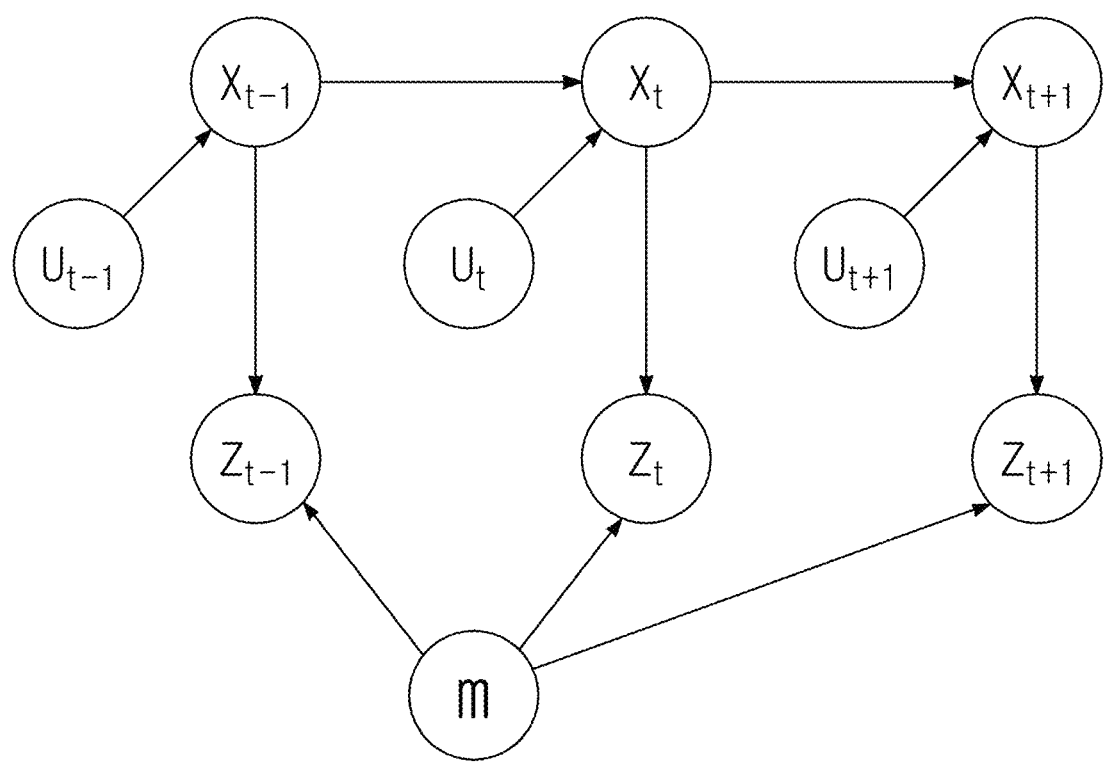

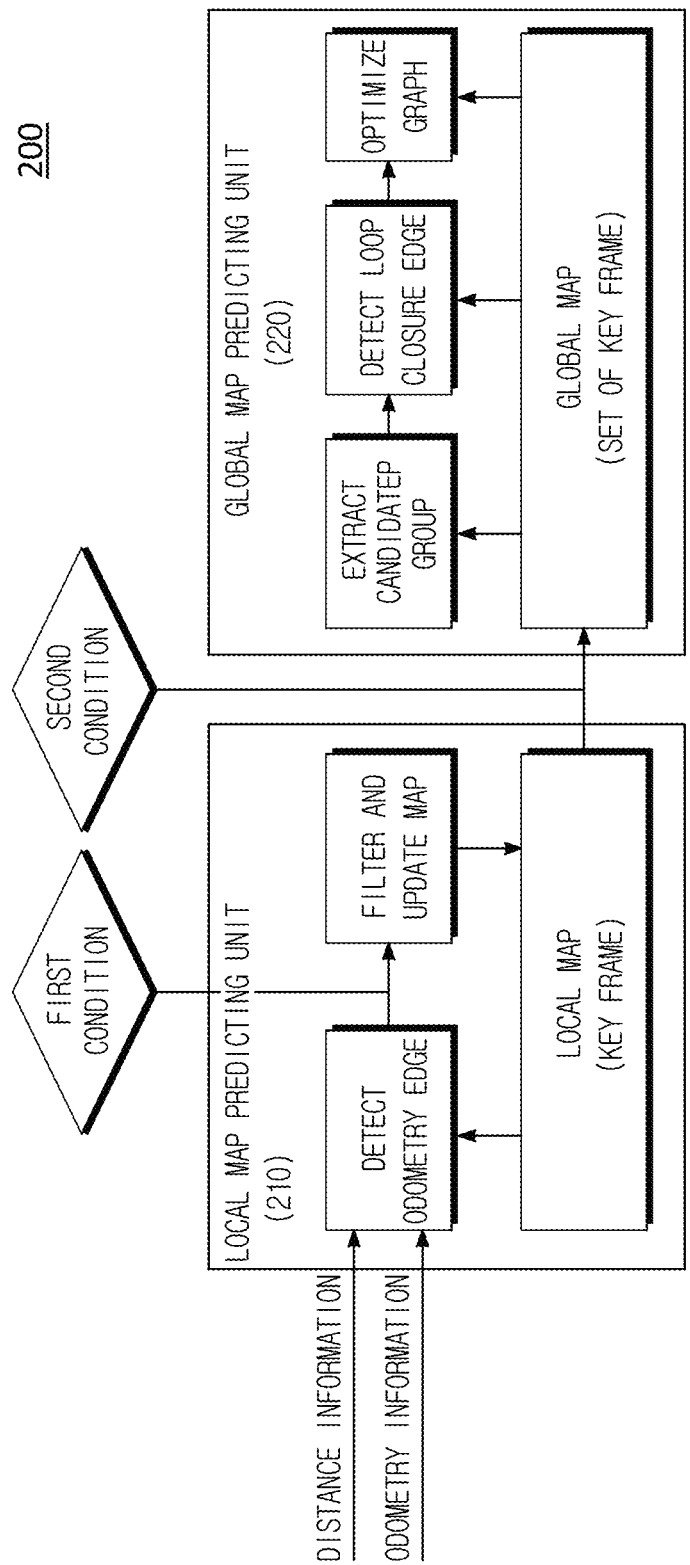
[FIG. 26]

[FIG. 27]
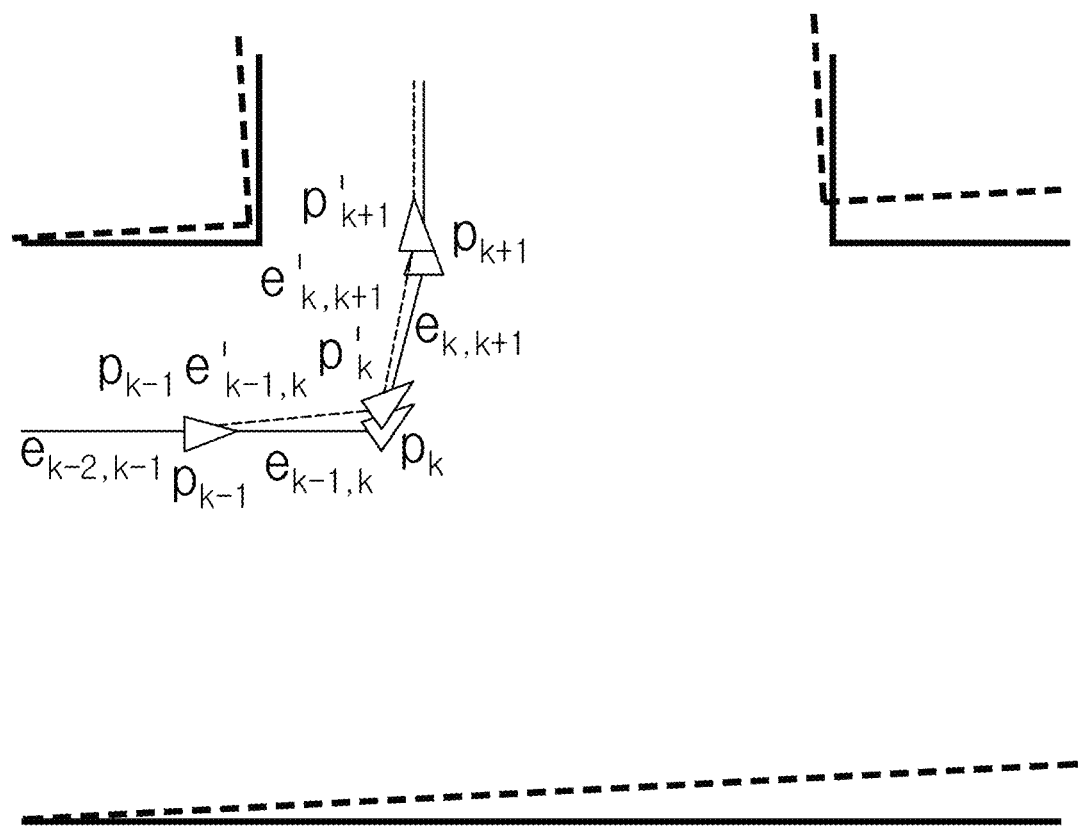

[FIG. 28]
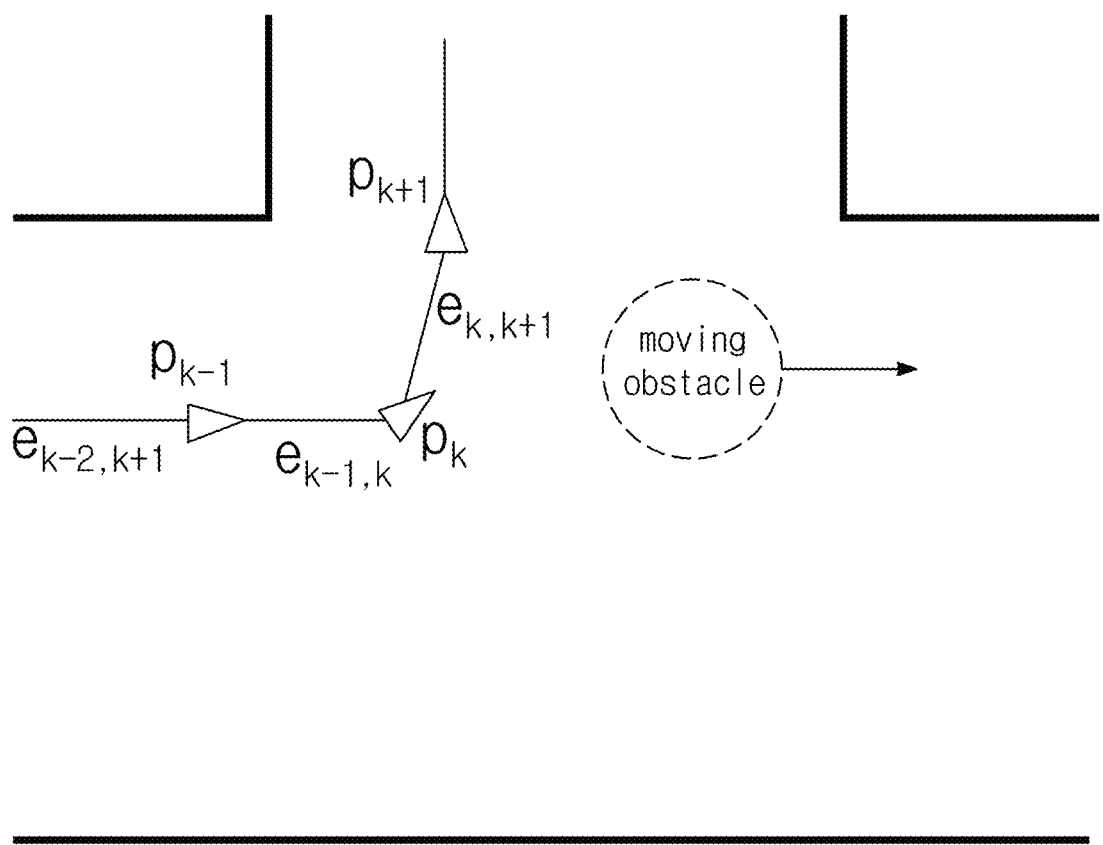

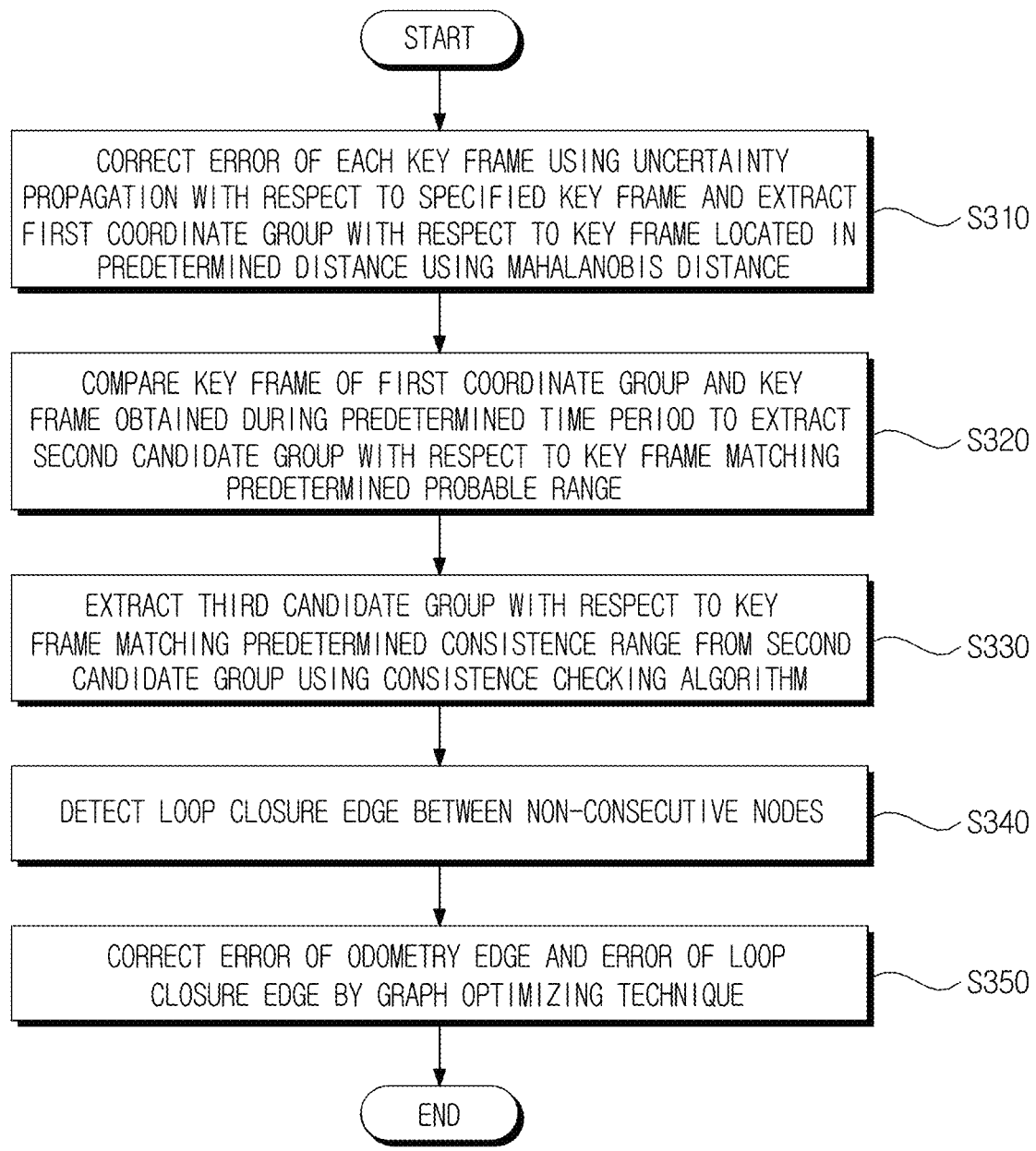
[FIG. 29]

[FIG. 30]
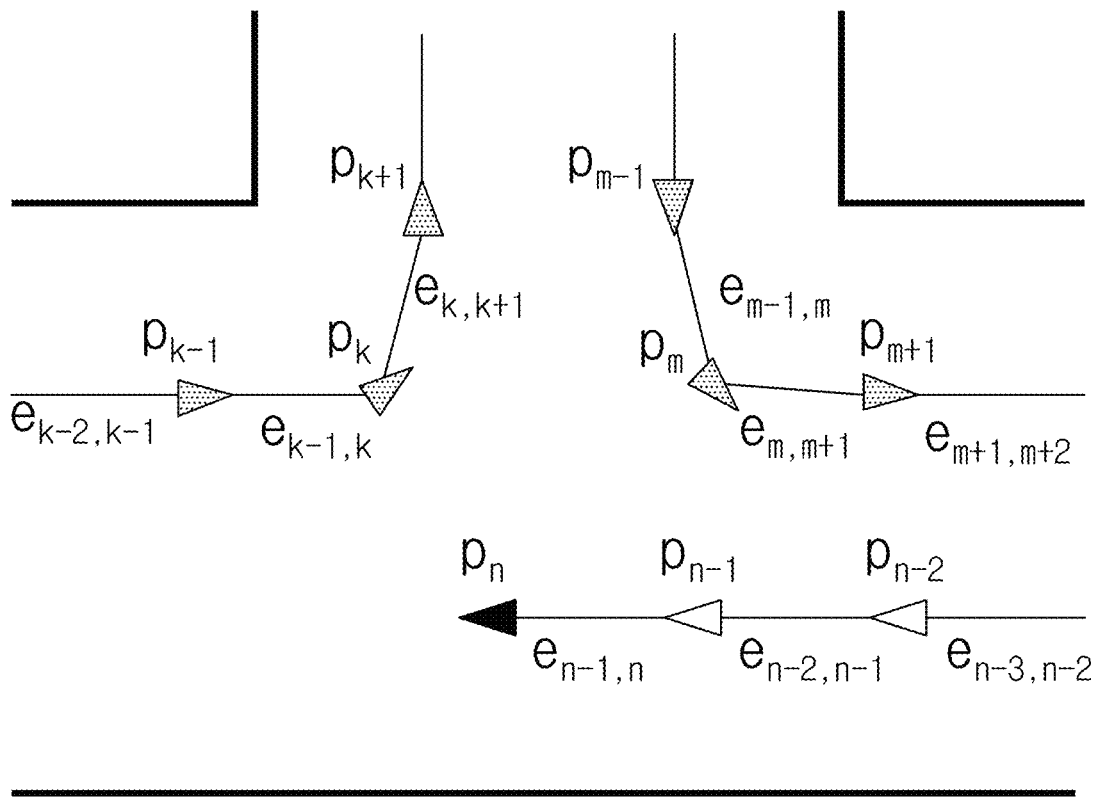

[FIG. 31]
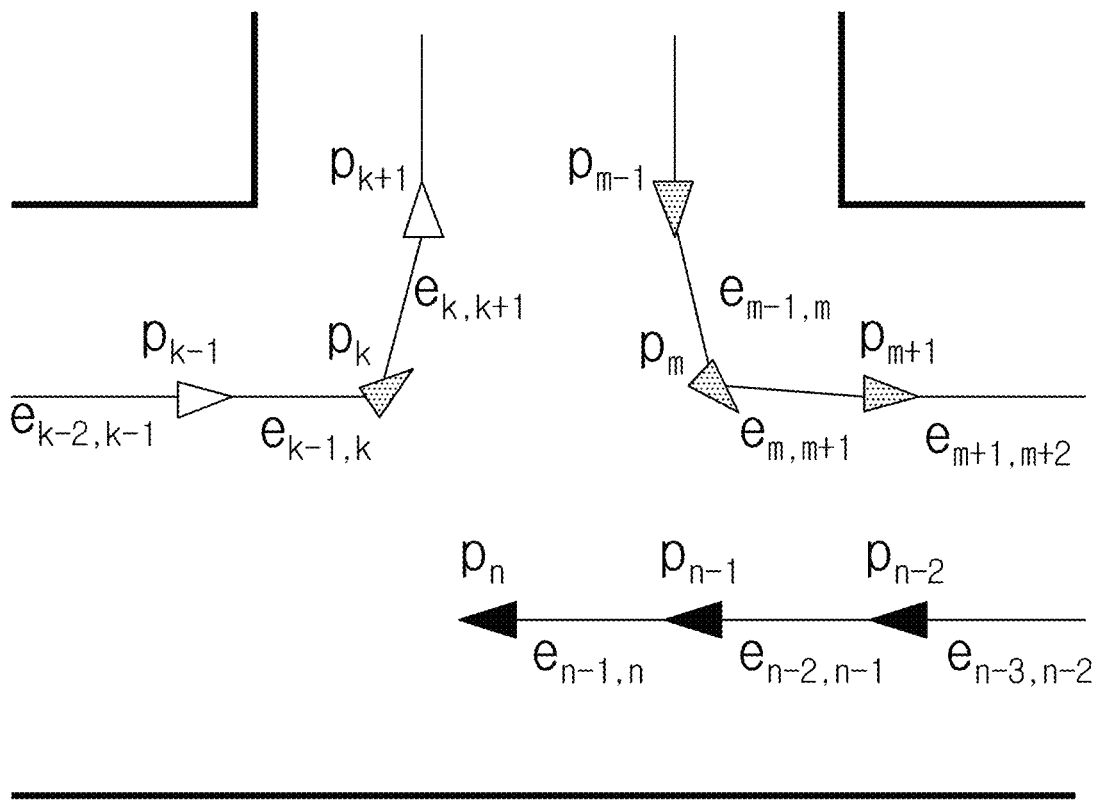

[FIG. 32]
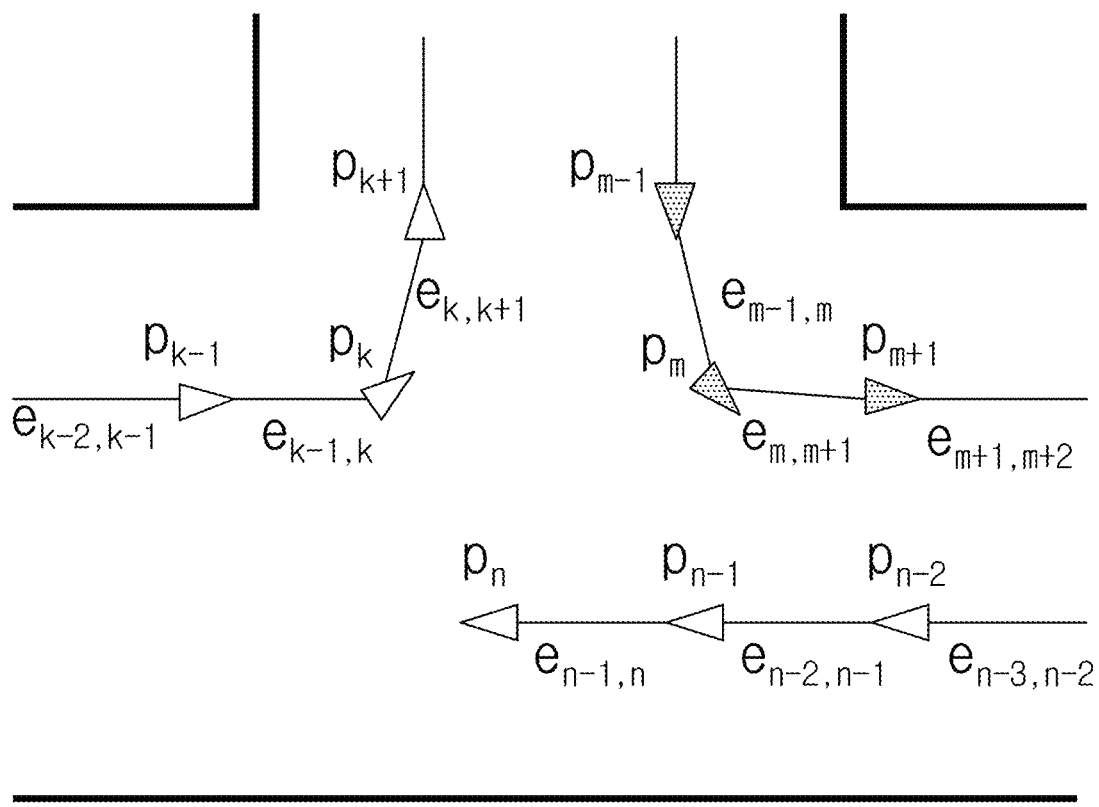

[FIG. 33]
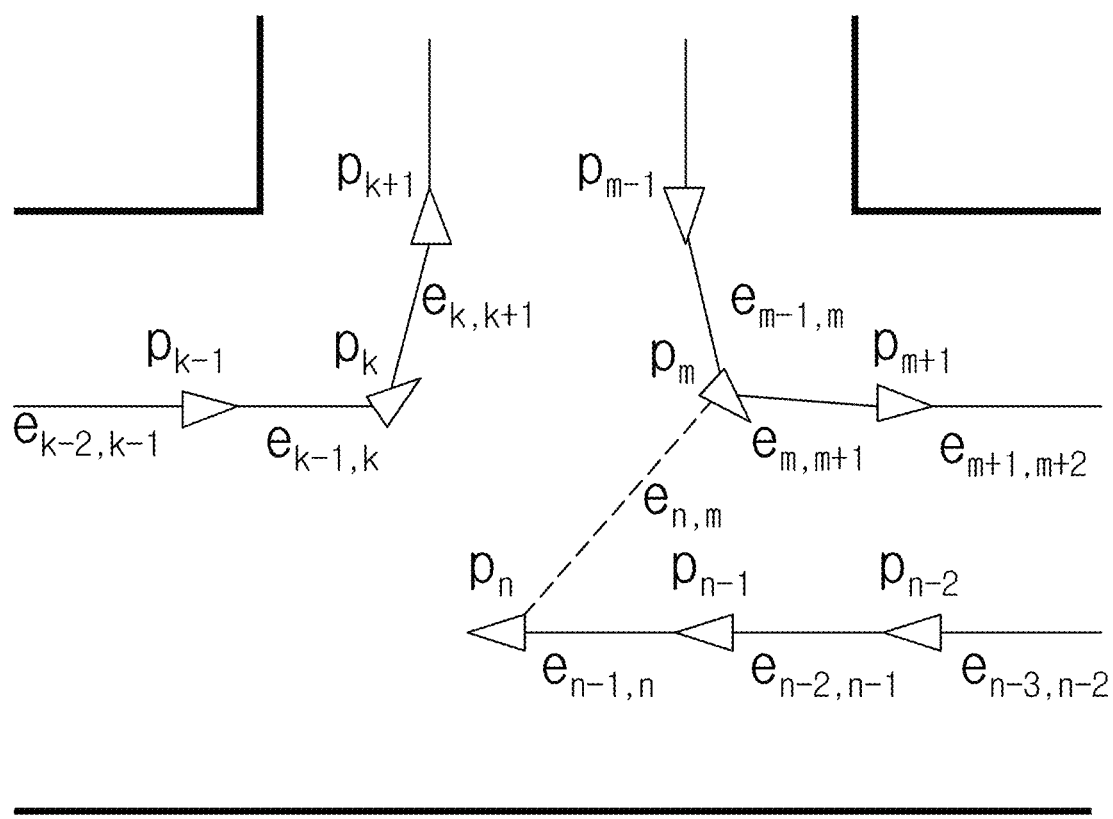

[FIG. 34]
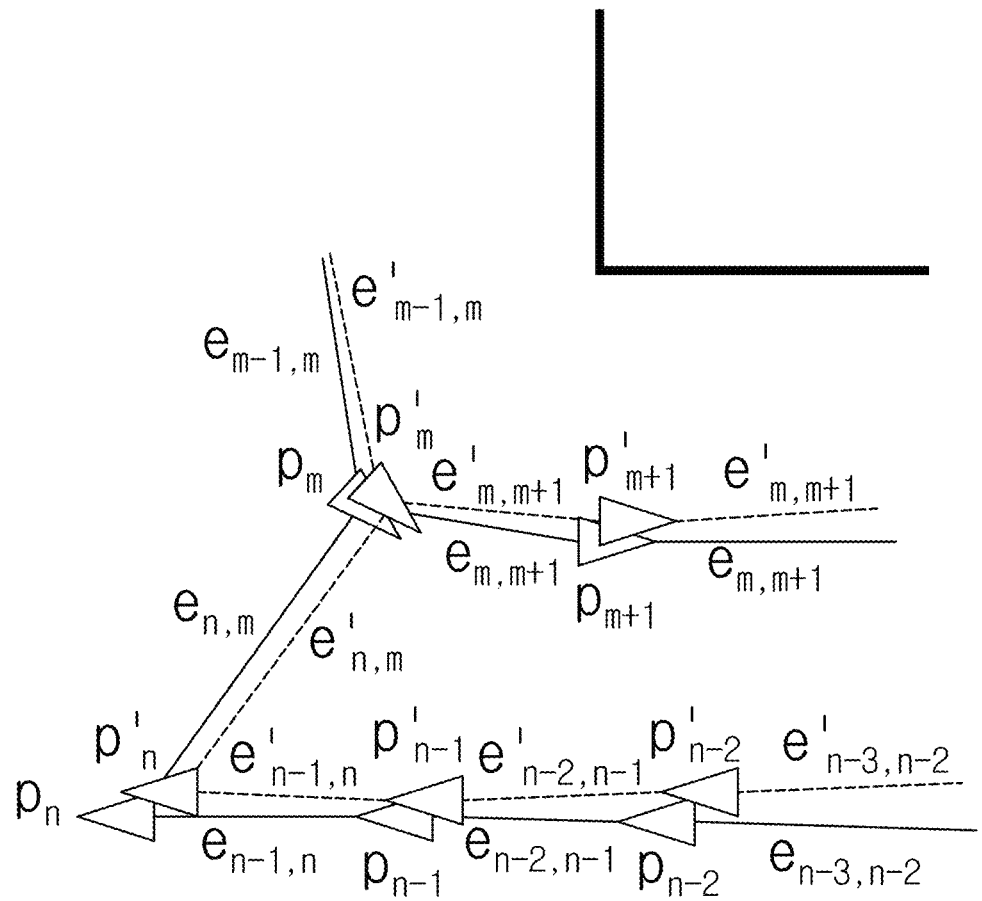

[FIG. 35]
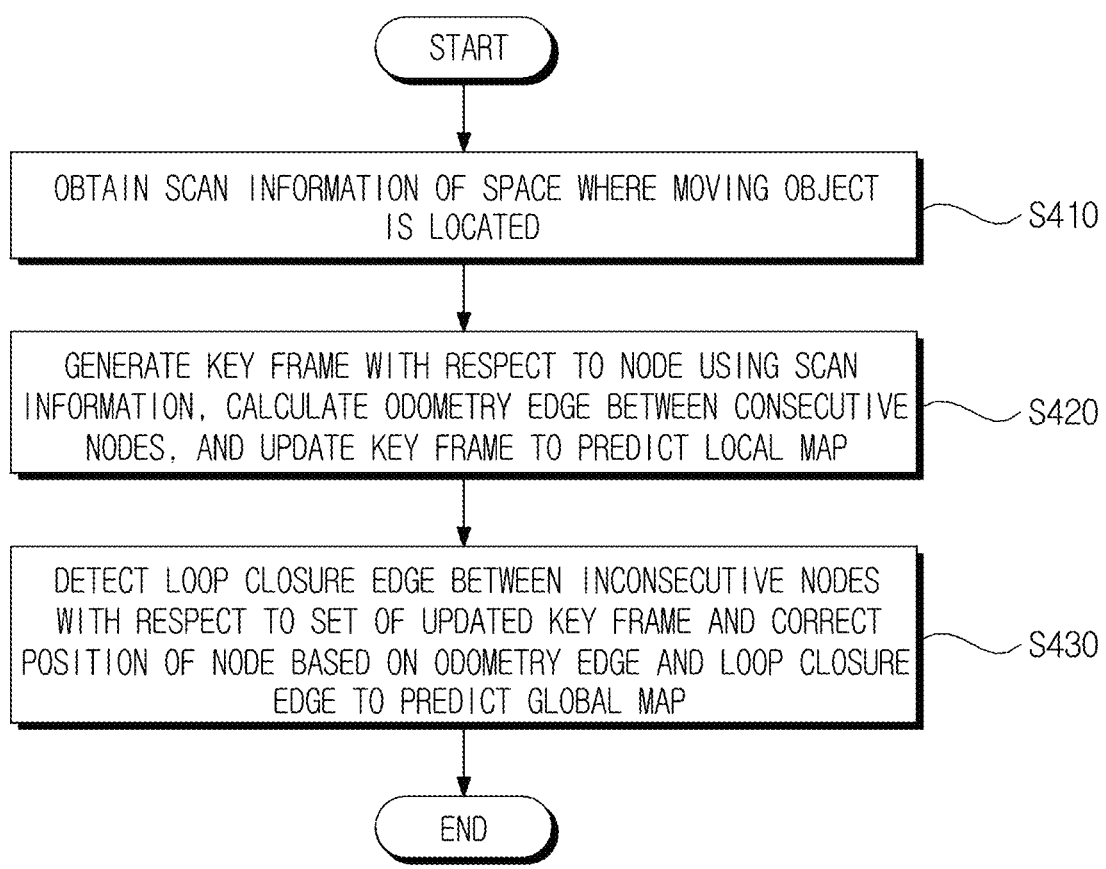

HYBRID SENSOR AND COMPACT LIDAR SENSOR

CROSS-REFERENCE TO RELATED APPLICATIONS

This application claims priority to and the benefit of Korean Patent Application No. 10-2017-0121401 filed in the Korean Intellectual Property Office on Sep. 20, 2017, Korean Patent Application No. 10-2017-0121828 filed in the Korean Intellectual Property Office on Sep. 21, 2017, Korean Patent Application No. 10-2017-0126788 filed in the Korean Intellectual Property Office on Sep. 29, 2017, Korean Patent Application No. 10-2017-0137723 filed in the Korean Intellectual Property Office on Oct. 23, 2017, Korean Patent Application No. 10-2017-0137745 filed in the Korean Intellectual Property Office on Oct. 23, 2017, Korean Patent Application No. 10-2017-0145577 filed in the Korean Intellectual Property Office on Nov. 2, 2017, Korean Patent Application No. 10-2018-0055952 filed in the Korean Intellectual Property Office on May 16, 2018, Korean Patent Application No. 10-2018-0055953 filed in the Korean Intellectual Property Office on May 16, 2018, Korean Patent Application No. 10-2018-0073235 filed in the Korean Intellectual Property Office on Jun. 26, 2018, Korean Patent Application No. 10-2018-0080377 filed in the Korean Intellectual Property Office on Jul. 11, 2018, the entire contents of which are incorporated herein by reference.

TECHNICAL FIELD

The technical field of the present disclosure relates to a moving object, a Lidar sensor, and a sensor module which combines and processes information obtained by a camera and information obtained by the Lidar sensor.

BACKGROUND ART

The contents described in this section merely provide background information on the components included in the present exemplary embodiment, but do not constitute a detailed description of the related art.

Recently, in following the development of robot technology, mobile robots which determine a route and move by themselves have also been implemented. In order to efficiently determine a position in a space and to move in such a space accordingly, the mobile robot needs to recognize its position within the space by generating a map for the space wherein the robot is moving.

The mobile robot travels by dead reckoning using a gyroscope and an encoder provided in a driving motor, and either analyzes the distance information obtained using a Lidar sensor provided at an upper portion or an image obtained using a camera to generate a map.

The mobile robot corrects errors accumulated in the driving information from the gyroscope and the encoder using point cloud information relating to the surrounding environments which is obtained by a Lidar sensor. A time of flight based Lidar measures the time it takes for a light signal which is emitted to then be reflected, and then uses the speed of light to calculate the distance from a reflector. The mobile robot may employ a camera to obtain image information on the surrounding environment.

However, since the type of data obtained from the Lidar sensor and the type of data obtained from the camera are different, it is difficult to converge the data.

A three-dimensional distance measuring system measures a distance in a space using various sensors such as a charge coupled device (CCD) image sensor, a complementary metal oxide semiconductor (CMOS) image sensor, an ultrasound sensor, and/or a laser sensor.

A general three-dimensional distance measuring system is implemented by rotating a two-dimensional distance sensor which scans a plane including the center of the sensor to scan a space. However, devices employing such a two-dimensional distance sensor have limitation to achieve certain cost, size, and sampling rate to produce such device for a commercial product rather than for research product.

A device to which a two-dimensional photo diode array is applied measures a distance using a structured light or time of flight method. When the structured light method is used, a unique pattern is projected and a corresponding point is detected to calculate the depth, while time of flight involves measurement of a time difference or a phase difference to be converted into a distance. When a device to which a two-dimensional photo diode array is applied is used, it is difficult to increase the angle of view. Further, each pixel contains so much three-dimensional information that it is difficult to measure a pin point.

A distance measuring device to which a one-dimensional photo diode array is applied includes a photo diode array and a laser diode array (or a laser diode and a diffuser). The photo diode array has a structure in which hundreds to several thousands of photo diodes are linearly disposed on a silicon crystal. However, a distance measuring device to which a one-dimensional photo diode array is applied has problems in that it is difficult to increase the angle of view, and it is expensive to produce the distance measuring device as a commercial product due to the expensive modules required for implementation, such as a high efficiency diffuser, a sensor array, or an MEMS mirror.

For easy implementation, the Lidar sensor of the related art employs a specific tube for a transmitter, or is implemented to have a structure which secures a long distance from a transmitter and a receiver to a mirror. The two-dimensional Lidar sensor of the related art has a laser light tube formed from an emitter to the mirror, while a three-dimensional Lidar sensor of the related art employs a beam adjustment method which forms a long distance using a specific tube or employs a multiple mirror configuration, generating a long distance in a restricted area.

The Lidar sensor of the related art has excellent performance, but has disadvantages in terms of cost and size. In order to form an efficient beam path, the three-dimensional Lidar sensor of the related art requires a plurality of mirrors having a high reflectance, making it expensive to implement. Further, a compact Lidar has a limited size, so that a tube or long distance method of the related art cannot be applied.

When a moving object such as a robot or a vehicle moves within an unknown environment, there is no information on the surrounding environment. Therefore, a map for the environment needs to be generated using sensor information, and the current position of the moving object needs to be predicted from the generated map. A method of recognizing the position and generating a map of the surrounding environment as described above is referred to as a simultaneous localization and mapping (SLAM) technique. There are various SLAM techniques such as filter based SLAM or graph based SLAM.

The graph based SLAM method represents the position and the motion of the robot using a node and an edge of a graph. A node is a position of a robot or an artificial landmark at a specific timing. The edge is a relationship between two nodes, and refers to a constraint on the space between two nodes. The measured edge includes errors. Therefore, when a traveling distance of the robot is increased and the number of nodes is increased, errors may be accumulated during the process of predicting the position.

SUMMARY OF THE INVENTION

A major object of the present disclosure is to generate composite data by mapping distance information on an obstacle obtained through a Lidar sensor to image information on an obstacle obtained through an image sensor, and by subsequently interpolating the distance information of the composite data based on the intensity of a pixel to converge data obtained from the Lidar sensor and the image sensor.

Another object of the present invention is to provide a map which covers a broader area within a predetermined time under predetermined conditions, by generating a key frame for a node using scan information, calculating an odometry edge between consecutive nodes, and updating the key frame to predict a local map, and by then detecting a loop closure edge between inconsecutive nodes for a set of updated key frames and correcting the position of the nodes based on the odometry edge and the loop closure edge to finally predict a global map.

Another object to be achieved by the present disclosure is to minimize the size of a Lidar sensor which is capable of scanning three dimensionally, by (i) separating a transmitter module and a receiver module, (ii) reflecting light emitted from a light source or light reflected from a transmission mirror from a first reflecting area of a moving mirror to direct it toward a target, (iii) disposing a transmitter, a mirror, and a receiver within a specific space to reflect the light reflected from the target from a second reflection area of the moving mirror to direct it toward a transmission mirror or a photo diode, and (iv) installing a blocking wall which separates the movement paths of the light to remove the scattered light.

Other and further objects of the present disclosure which are not specifically described can be further considered fall within the scope if easily deduced from the following detailed description and the effect.

According to an aspect of the present disclosure, a hybrid sensor includes: a first sensor which obtains a first set of data for a target; a second sensor which obtains a second set of data for a target; and a processing unit which generates composite data through mapping of the first and second data sets.

According to another aspect of the present disclosure, a moving object includes: a hybrid sensor which obtains a first set of data related to a target by means of a first sensor and a second set of data related to the target by means of a second sensor, and which generates composite data through mapping of the first data and second data sets; a map generator which analyzes the first data or the composite data to generate a map related to a surrounding environment; and a moving device implemented to move the moving object based on the generated map.

According to another aspect of the present disclosure, an optical transceiver includes: a first angle adjusting unit including a first reflection area and a second reflection area; an optical transmitting unit which transmits light to the first reflection area of the first angle adjusting unit; an optical receiving unit which receives light from the second reflection area of the first angle adjusting unit; and a light blocking wall which separates a movement path of the transmitted light and a movement path of the received light.

According to another aspect of the present disclosure, a distance measuring apparatus includes: a light source; an optical transceiver which emits light to a target in response to a start control signal and receives light reflected from the target in order to convert the reflected light into an electrical signal, and which may be configured as described above; a distance measuring unit which converts the electrical signal to generate a stop control signal and which calculates a time of flight based on a time difference of the start and stop control signals to measure a distance.

According to still another aspect of the present disclosure, a moving object includes: a distance measuring apparatus which calculates a flight time between a moving object and a target in order to measure a distance to the target, and which may be configured as described above; and a moving device which is implemented to move the moving object based on the distance to the target.

The first set of data may include first coordinate information, which is two-dimensionally represented, and intensity information related to the first coordinate information. The second data may include second coordinate information, which is two-dimensionally represented, and depth information related to the second coordinate information. The composite data may include space coordinate information, which is three-dimensionally represented, and the intensity information.

The processing unit may compare the first coordinate information and the second coordinate information with respect to a region of space whereat a first area of space seen from a position where the first sensor is installed and a second area of space seen from a position where the second sensor is installed overlap in order to map corresponding coordinate information.

The processing unit may generate the composite data based on (i) depth information from among the second coordinate information corresponding to the common coordinate information which corresponds to the first and second coordinate information, and (ii) intensity information from among the first coordinate information which corresponds to the common coordinate information.

The processing unit may predict first predicted depth information related to non-common information for the first coordinate information which does not correspond to the second coordinate information, using (i) depth information corresponding to common coordinate information and (ii) intensity information corresponding to the common coordinate information.

In order to preict the first predicted depth information, the processing unit may determine the similarity between (i) intensity information of the non-common coordinate information and (ii) intensity information of common coordinate information present within a predetermined range.

The predicting unit may predict second predicted depth information related to the non-common coordinate information using (i) intensity information of the non-common coordinate information, (ii) intensity information of the common coordinate information, and (iii) the first predicted depth information.

The processing unit may update the composite data based on the first predicted depth information related to the non-common coordinate information.

The hybrid sensor may operate both the first sensor and the second sensor for a target which is located closer than a predetermined distance to generate composite data, and may selectively operate the first sensor or the second sensor for a target which is disposed farther than a predetermined distance in order to obtain the data.

The map generator may analyze the first data, the second data, or the composite data to generate a key frame related to a node. It may then calculate an odometry edge between consecutive nodes, update the key frame to predict a local map, detect a loop closure edge between inconsecutive nodes with respect to a set of the updated key frames, and then correct the position of the node based on the odometry edge and the loop closure edge to finally generate a global map.

The map generator may rotate or move the first data, the second data, or the composite data to perform scan matching, or it may measure the odometry information of the moving object to calculate the odometry edge and correct an error between the odometry edge predicted based on a predicted value of the node and the odometry edge measured through the scan matching.

The map generator may filter the key frame when a predetermined condition for a movement distance of the moving object is satisfied.

The map generator may predict the global map for a set of the updated key frames when a predetermined condition relating to the movement distance of the mobile robot or a change of the surrounding environment is satisfied.

The map generator may correct an error of the key frame using uncertainty propagation with respect to the specified key frame.

The map generator may extract a first candidate for a key frame located within a predetermined distance using a Mahalanobis distance.

The map generator may compare a key frame of the first candidate group with a key frame obtained during a predetermined time period to extract a second candidate group related to a matching key frame within a predetermined probability range.

The map generator may extract a third candidate group related to a key frame matching a predetermined consistence range from the second candidate group using a consistence checking algorithm.

The map generator may correct an error of the odometry edge and an error of the loop closure edge by a graph optimizing technique.

The light blocking wall may be installed between the optical transmitting unit and the optical receiving unit, where it forms a blocking area with respect to the first angle adjusting unit such that the light which is transmitted by the optical transmitting unit is reflected or scattered from the first reflection area of the first angle adjusting unit and the reflected or scattered light does not reach the optical receiving unit, but instead, the transmitted light moves through a path to be reflected from the first reflection area and light reflected from a target moves through a path to be reflected from the second reflection area in a separate path without interference.

The first angle adjusting unit may include a first reflector containing the first reflection area and a second reflector containing the second reflection area, and the first and second reflectors may be located in a first and a second space, respectively, separated by the light blocking wall.

The light blocking wall may form the blocking area using a length relationship including a distance Hb from the first angle adjusting unit to the light blocking wall, a thickness Wb of the light blocking wall, a distance H1 from the first reflection area to the optical transmitting unit, a distance W1 from the light blocking wall to the optical transmitting unit (including the thickness of the optical transmitting unit), a distance H2 from the second reflection area to the optical receiving unit, a distance W2 from the light blocking wall to the optical receiving unit (including the thickness of the optical receiving unit), a reference angle of the first angle adjusting unit, and a movement angle of the reflector, or a combination thereof.

The first angle adjusting unit may move at a predetermined period to change the normal line of the first reflection area and the normal line of the second reflection area.

The first angle adjusting unit may synchronize the period of the first reflection area and the period of the second reflection area to make the directions of the normal lines of the first and second reflection areas parallel to each other.

The first angle adjusting unit may move by a bending motion, a resonant motion, a reciprocating motion, a seesaw motion, a rotational motion, or a combination thereof.

The first angle adjusting unit may include a reflector having the first reflection area and the second reflection area, and the reflector may be installed in the frame of the optical transceiver in such a manner as to be movable, and it may move using the electromagnetic force of a magnet attached to the reflector and a coil installed in the frame. Convresely, the magnet may be installed in the frame, and the coil may be attached to the reflector.

In the first angle adjusting unit, which may include the first and second reflectors containing the first and second reflection areas, respectively, the first and second reflectors may be configured to be a polygonal column to move while rotating.

The optical transceiver may further include all or a combination of: a first driver which moves the reflector of the first angle adjusting unit; a first frequency adjusting unit which adjusts the period when the reflector of the first angle adjusting unit moves; a reference angle adjusting unit which adjusts an angle at which the reflector of the first angle adjusting unit is installed.

The optical transmitting unit may include a light source which emits light, a transmitting reflector which reflects the light, or a combination thereof, and the optical receiving unit includes a photo diode which receives light and converts it into an electrical signal, a receiving reflector which reflects the light, a point adjusting unit which adjusts the number of group data points obtained per unit time by adjusting the light emitting speed of the light source based on a predetermined sampling period, or a combination thereof.

The optical transceiver may further include a second angle adjusting unit.

The second angle adjusting unit may include the optical transmitting unit, the optical receiving unit, a rotor which is attached to the light blocking wall to facilitate rotation, a second driver which is connected to the rotor to rotate it, and a rotor connecting unit which connects the base of the optical transceiver and the rotor.

The rotor connecting unit may include a power line in which a conductor is in physical contact with the rotor to transmit power, and a data communication unit which is wirelessly connected to the rotor to transmit data thereto.

The power line may apply pressure to a worn portion of the conductor in the direction in which the conductor is in contact.

According to the exemplary embodiments of the present disclosure, composite data is generated by mapping the distance information on an obstacle obtained by means of a Lidar sensor to the image information on an obstacle obtained by means of an image sensor, after which the distance information of the composite data is interpolated based on the intensity of a pixel to converge the data of the Lidar sensor and data of the image sensor.

According to the exemplary embodiments of the present disclosure, it is possible to minimize the size of a Lidar sensor which is capable of three-dimensional scanning, by (i) dividing the transmitter module and receiver module, (ii) reflecting light emitted from a light source or light reflected from a transmission mirror from a first reflecting area to be directed toward a target, (iii) disposing a transmitter, a mirror, and a receiver in a specific space to reflect the light reflected from the target from a second reflection area to be directed towad a transmission mirror or a photo diode, and (iv) installing a blocking wall which separates the movement paths of the light to remove the scattered light.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a block diagram of a moving object, according to an exemplary embodiment of the present disclosure;

FIG. 2 is a block diagram illustrating a hybrid sensor, according to another exemplary embodiments of the present disclosure;

FIG. 3 is a view illustrating a viewing angle of a Lidar sensor;

FIG. 4 is a view illustrating an overlapping area of a viewing angle of a camera and a viewing angle of a Lidar sensor;

FIG. 5 is a view illustrating composite data processed by a hybrid sensor, according to another exemplary embodiment of the present disclosure;

FIGS. 6A, 6B, 6C and 6D are views illustrating image information, depth information, and predicted depth information generated by a hybrid sensor, according to another exemplary embodiment of the present disclosure;

FIG. 7 is a view illustrating a hybrid sensor having a plurality of cameras, according to another exemplary embodiment of the present disclosure;

FIG. 8 is a block diagram illustrating a moving object, according to an exemplary embodiment of the present disclosure;

FIG. 9 is a view illustrating a moving object, according to an exemplary embodiment of the present disclosure;

FIG. 10 is a block diagram illustrating a distance measuring apparatus, according to another exemplary embodiment of the present disclosure;

FIG. 11 is a view illustrating an echo phenomenon, according to an arrangement of a light transmitter, a mirror, and a light receiver;

FIG. 12 is a block diagram illustrating an optical transceiver, according to another exemplary embodiment of the present disclosure;

FIG. 13 is a block diagram illustrating an optical transmitting unit of an optical transceiver, according to another exemplary embodiment of the present disclosure;

FIG. 14 is a block diagram illustrating an optical receiving unit of an optical transceiver, according to another exemplary embodiment of the present disclosure;

FIG. 15 is a block diagram illustrating a first angle adjusting unit of an optical transceiver, according to another exemplary embodiment of the present disclosure;

FIGS. 16A, 16B, 16C and 16D are views illustrating an optical transceiver, according to another exemplary embodiment of the present disclosure;

FIGS. 17A, 17B, 17C and 17D are views illustrating a blocking wall of an optical transceiver, according to another exemplary embodiment of the present disclosure;

FIGS. 18A, 18B, 18C and 18D are views illustrating a first driver of an optical transceiver, according to another exemplary embodiment of the present disclosure;

FIG. 19A is a view illustrating a transmission path of an optical transceiver, according to another exemplary embodiment of the present disclosure, and FIG. 19B is a view illustrating a reception path of an optical transceiver, according to another exemplary embodiments of the present disclosure;

FIG. 20 is a view illustrating a structure of an optical transceiver, according to another exemplary embodiment of the present disclosure, and a movement path of light;

FIG. 21 is a block diagram illustrating a second angle adjusting unit of an optical transceiver, according to another exemplary embodiment of the present disclosure;

FIG. 22 is a view illustrating a second angle adjusting unit of an optical transceiver, according to another exemplary embodiment of the present disclosure;

FIG. 23 is a view illustrating a rotor connecting unit of an optical transceiver, according to another exemplary embodiment of the present disclosure; and FIG. 24 is a view illustrating three-dimensional information obtained by a distance measuring apparatus, according to exemplary embodiments of the present disclosure.

FIG. 25 is a graph model representing information processed by a simultaneous localization and mapping (SLAM) method;

FIG. 26 is a view illustrating a map generator of a moving object, according to another exemplary embodiment of the present disclosure;

FIG. 27 is a view illustrating data scanned by a map generator of a moving object, according to another exemplary embodiment of the present disclosure;

FIG. 28 is a view illustrating data filtered by a map generator of a moving object, according to another exemplary embodiment of the present disclosure;

FIG. 29 is a flowchart illustrating a global map predicting operation of a map generator of a moving object, according to another exemplary embodiment of the present disclosure;

FIGS. 30, 31, 32, 33 and 34 are views illustrating data processed by a map generating unit of a moving object using a process of predicting a global map, according to another exemplary embodiment of the present disclosure; and FIG. 35 is a flowchart illustrating a map generating method of a moving object, according to another exemplary embodiment of the present disclosure.

DETAILED DESCRIPTION OF THE EMBODIMENT

Hereinafter, in the description of the present disclosure, a detailed description of the related known functions will be omitted if it is determined that the essence of the present disclosure may be unnecessarily blurred as it is obvious to those skilled in the art, and some exemplary embodiments of the present disclosure will be described in detail with reference to exemplary drawings.

According to an exemplary embodiment of the present invention, a hybrid sensor, in which a Lidar and a camera are integrated, may be applied to a product which requires distance measurement, including but not limited to a flying object such as a drone, a moving object such as a vehicle, or a small home appliance.

FIG. 1 is a block diagram illustrating a moving object, in which the proposed hybrid sensor is included. As illustrated in FIG. 1, the moving object 1 includes a hybrid sensor 10, a map generator 30, and a moving device 20. The moving object 1 may omit some components from among the various components which are exemplarily illustrated in FIG. 1, or may further include other components which are not illustrated. For example, the moving object may further include a cleaning unit.

The moving object 1 refers to a device designed to be movable from a specific position to another position according to a predetermined method, and which moves from the specific position to another position using a moving unit which employs a means such as wheels, rails, or walking legs. The moving object 1 may collect external information using a sensor and then move according to the collected information, or it may move according to a separate manipulating unit operated by a user.

Examples of the moving object 1 include robot cleaners, toy cars, and mobile robots for industrial or military purposes. The moving object 1 may travel using wheels or walk using one or more legs, or may be implemented by a combination thereof.

A robot cleaner is a device which sucks foreign matter such as the dust accumulated on a floor while traveling through a cleaning space to automatically clean the cleaning space. Differently from a normal cleaner which is moved by an external force applied by a user, the robot cleaner moves using external information or according to a predetermined moving pattern to clean the cleaning space.

The robot cleaner may automatically move using a predetermined pattern, or may detect external obstacles using a detection sensor and then move according to the detected data. Further, the robot cleaner may move in accordance with a signal transmitted from a remote control device which is manipulated by the user.

The moving device 20 calculates a traveling route based on a distance to the target, or detects an obstacle, to move the moving object. Odometry information such as the revolution, gradient, or amount of rotation may be obtained from an encoder connected to the moving device or by an inertial measurement unit (IMU). Such an IMU may be implemented as an acceleration sensor or a gyro sensor.

The position of the moving object 1 may be represented by a three-dimensional vector. The three-dimensional vector may be represented by an X coordinate and a Y coordinate in relation to an origin of a reference coordinate system, and an angle formed by the X axis of the robot coordinate system and the X axis of the reference coordinate system.

FIG. 2 is a block diagram illustrating a hybrid sensor. As illustrated in FIG. 2, the hybrid sensor 10 includes a first sensor 11, a second sensor 12, and a processing unit 13. The hybrid sensor 10 may omit some components from among the various components which are exemplarily illustrated in FIG. 2, or may additionally include other components.

The first sensor 11 obtains a first set of data for a target. The first sensor 11 may be an image sensor which obtains image information on an obstacle. The first data includes first coordinate information, which is represented two-dimensionally, and intensity information related to the first coordinate information. The intensity information has a predetermined range according to a bit value set for a pixel.

The camera includes an image sensor which converts light entering through a lens into an electrical image signal. The image sensor may be implemented as a charged coupled device (CCD) or a complementary metal-oxide semiconductor (CMOS).

The second sensor 12 obtains a second set of data for a target. The second sensor 12 may be a Lidar sensor which obtains distance information on an obstacle. The second data includes second coordinate information, which is represented two-dimensionally, and depth information related to the second coordinate information.

A Lidar sensor is a device which transmits a laser signal, measures the returning time of the reflected signal, and uses the speed of light to calculate the distance to a reflector. The laser signal is converted into an electrical signal by a photo diode, and it may have a predetermined wavelength band. For example, the Lidar may use a wavelength falling within the infrared ray region.

The Lidar sensor may operate using a time of flight (TOF) method. According to the time of flight method, a laser emits a pulsed or square wave signal to measure the time at which reflection pulses or square wave signals reflected from objects within a measurement range reach a receiver in order to measure the distance between the sensor and an object to be measured.

The Lidar sensor includes an optical transceiver and a distance measuring unit.

The optical transceiver transmits a laser signal and receives a reflected signal. The optical transceiver emits light toward a target in response to a start control signal and receives the light which is reflected from the target to convert the light into an electrical signal. The optical transceiver outputs the electrical signal during a predetermined detection time.

The optical transceiver may include a signal converter. The signal converter is connected to a photo diode of the optical transceiver, and a transimpedance amplifier is connected to the signal converter.

The light source emits light toward the target according to a predetermined sampling period. The sampling period may be set by the controller of a distance measuring apparatus. The sampling period is a time during which the optical transceiver emits light in response to the start control signal, receives the reflected light, and then converts the light into an electrical signal. The optical transceiver may repeatedly perform this operation in a subsequent sampling period.

The photo diode receives light reflected from the target in order to convert the light into an electrical signal.

The distance measuring unit includes one or more signal discriminators which convert the electrical signal to measure an exact timing and output a stop control signal.

The distance measuring unit uses a signal discriminator to convert the electrical signal such that a signal point having a maximum signal magnitude has a predetermined magnitude, to adjust the magnitude of the converted electrical signal, and to detect a timing having the predetermined magnitude. The signal discriminator converts the electrical signal to generate a stop control signal.

The signal discriminator receives the electrical signal from the photo diode or the transimpedance amplifier. The received electrical signal, that is, the input signal, rises or falls according to the amount of reflected light. The signal discriminator exactly measures a target timing of the input signal in order to output the electrical signal.

The distance measuring unit may include one or more time to digital converters which convert the difference of two time points into a digital value. The input signal of the time to digital converter may be a pulse shape of the same signal source or may be an edge of another signal source. For example, the distance measuring apparatus may calculate the time difference based on a rising edge or a falling edge of the start control signal and a rising or falling edge of the stop control signal.

The distance measuring unit calculates the pulse width with respect to the rising or falling edge of the stop control signal and then adds the factor value which is applied to a function of the pulse width versus walk error to a time of flight which has not been corrected. The distance measuring apparatus corrects the time of flight using the pulse width of the reflected signal to calculate the exact time of flight.

The processing unit 13 receives the first set of data from the first sensor 11 and the second set of data from the second sensor 12. The processing unit 13 then generates composite data by mapping the first and second data. The composite data includes three-dimensionally represented space coordinate information and intensity information.

FIG. 3 is a view illustrating a viewing angle of a Lidar sensor.

The Lidar sensor configured according to the present exemplary embodiment may be applied to a distance measuring apparatus or a moving object. That is, the Lidar sensor may be applied to products which require distance measurement, such as small appliances, or moving objects such as drones or vehicles. A Lidar sensor is a device which transmits a laser signal, measures the return time of the reflected signal, and uses the speed of light to calculate the distance to a reflector. The laser signal is converted into an electrical signal by a photo diode, and may have a predetermined wavelength band. The Lidar sensor may be referred to as an optical transceiver or a distance measuring apparatus.

The Lidar sensor may scan a specific plane or a specific dimension at an omnidirectional viewing angle. The Lidar sensor may scan with a viewing angle falling within an area of a specific direction and at a specific angle range. The Lidar sensor illustrated on the left side of FIG. 3 scans in all directions, while the Lidar sensors illustrated in the center and on the right side of FIG. 3 sweep in a vertical direction. A specific product may sweep between +/−45 degrees or from 0 to 90 degrees.

FIG. 4 is a view illustrating the overlapping area of the viewing angle of a camera and the viewing angle of a Lidar sensor.

In order to integrate the Lidar sensor and the camera, the Lidar sensor and the camera may be installed in such a way as to allow the viewing angle of the camera and the viewing angle of the Lidar sensor to overlap as much as possible. As illustrated in FIG. 4, the camera may be disposed above the Lidar. Since a wide angle camera has a larger viewing angle (for example, 190 degrees) than that of a normal camera, use of a wide angle camera may allow the area overlapping with the viewing angle of the Lidar sensor to be increased.

However, since the types of data obtained from the Lidar sensor and from the camera are different, the data sets need to be mapped to each other.

The hybrid sensor 10 maps the distance information on an obstacle obtained through the Lidar sensor to image information on an obstacle obtained through an image sensor to create composite data. The image information includes the intensity of the pixels.

The processing unit 13 compares the first coordinate information obtained from the first sensor 11 to the second coordinate information obtained from the second sensor, with respect to the space area where overlap occurs between the first space area captured from the position where the first sensor 11 is installed and the second space area captured from a position where the second sensor 12, in order to map corresponding coordinate information.

When the distance information of the Lidar is integrated into image information of the camera, information on the obstacle obtained through the Lidar may be mapped to the image area as represented in Equation 1.

$$m = K[R|t]X \qquad \text{Equation 1}$$

Here, m is a pixel-mapped coordinate (common coordinate information), X is information on an obstacle obtained through the Lidar, R and t are transformation attributes, and K is an image matrix (first coordinate information) obtained through a camera attached to the Lidar. The transformation attributes may be a transformation matrix for size transform, position transform, shape transform, and rotation. The transformation attributes may be a rotation matrix and a translation matrix.

The processing unit 13 creates the composite data based on (i) depth information from among the second coordinate information which corresponds to the common coordinate information for which information was collected on both the second and first coordinates, and (ii) intensity information from among the first coordinate information which corresponds to the common coordinate information. The composite data Xf has a format represented by Equation 2.

$$Xf = [x, y, z, I] \qquad \text{Equation 2}$$

Here, x, y, and z represent a three-dimensional space coordinate on an obstacle in a frame of the Lidar and I represents intensity. The three-dimensional space coordinate includes a two-dimensional coordinate and distance information.

When using Lidar, even though the density of an obstacle is maximized, the depth information in some image areas may not be sufficient. To overcome this weakness, the hybrid sensor interpolates or expands the distance information of the composite data based on the intensity of the pixel. The hybrid sensor 10 may densify the distance information of the composite data using an interpolation technique.

FIG. 5 is a view illustrating composite data processed by a hybrid sensor. The hybrid sensor generates predicted depth information. Based on the assumptions that adjacent obstacles have similar depth values, adjacent pixels have similar intensity values, and pixels having similar intensity values have similar depth values, the distance information mapped to an image area is interpolated.

The processing unit 13 may predict a first predicted depth value p1 related to non-common information from among the first coordinate information which does not correspond to second coordinate information, using (i) depth information d corresponding to the common coordinate information and (ii) intensity information corresponding to the common coordinate information.

The processing unit 13 determines the similarity between adjacent intensity values by comparing (i) intensity values from the non-common coordinate information and (ii) intensity vales from the common coordinate information present within a predetermined range from the non-common coordinate information. The processing unit 13 may predict the first predicted depth value p1 in accordance with the results of the similarity determination. The processing unit 13 may then update the composite data based on the first predicted depth value related to the non-common coordinate information.

The processing unit 13 may predict a second predicted depth value p2 related to non-common coordinate information using (i) intensity values from the non-common coordinate information present in the predetermined range, (ii) intensity values from the common coordinate information present in the predetermined range, and (iii) the first predicted depth value p1 present within the predetermined range. The processing unit 13 may update the composite data based on the second predicted depth value related to the non-common coordinate information.

FIGS. 6A to 6D are views illustrating data obtained by the Lidar sensor of a hybrid sensor, and data obtained by the image sensor. The hybrid sensor needs to interpolate distance values which are not mapped after combining an image 601, in which intensity the information of pixels is represented, with the distance information. The hybrid sensor uses the intensity information to interpolate the distance information which is not mapped. Referring to images 602 and 603, in which interpolation of the distance information which is not mapped is carried out using only the mapped distance information displayed in FIGS. 6B and 6C, and referring to image 604, in which interpolation of the unmapped distance information is carried out based on the intensity information displayed in FIG. 6D, it can clearly be understood that the precision of the distance information included in the composite data is improved by employment of the distance values interpolated using the intensity values.

FIG. 7 is a view illustrating a hybrid sensor including a plurality of cameras.

When the moving object measures a long distance, the distance measurement may be restricted in accordance with the power of the laser employed and the environment. The hybrid sensor operates both the first and second sensors for targets which are closer than a predetermined distance to create composite data.

In order to overcome the distance restrictions of the Lidar, the moving object may perform the measurement using only the camera. The hybrid sensor may selectively operate the first sensor or second sensor for targets which are disposed farther than a predetermined distance to create composite data.

The hybrid sensor may directly measure a distance using two wide angle cameras. The hybrid sensor may apply a single lens camera. In an environment where noises may easily be included in the odometry information, it is desirable to apply a stereo camera rather than a single lens camera.

FIG. 8 is a block diagram of a moving object according to an exemplary embodiment of the present disclosure.

As illustrated in FIG. 8, a moving object 1 includes a distance measuring apparatus 15 and a moving device 20. The moving object 1 may omit some components from among the various components which are exemplarily illustrated in FIG. 8, or may further include other components. For example, the moving object may further include a cleaning unit.

The detecting sensor may be implemented as a Lidar. Lidar is a device which transmits a laser signal, measures the returning time and intensity of the reflected signal, and uses the speed of light to calculate the distance to a reflector. The laser signal is converted into an electrical signal by a photo diode, and may have a predetermined wavelength band.

FIG. 9 is a view illustrating a moving object according to an exemplary embodiment of the present disclosure.

Referring to FIG. 9, even though the distance measuring apparatus 15, which calculates the time of flight between a moving object and a target to measure a distance to the target, is located at an upper edge of the main body in the diagram, this is merely illustrative and the present disclosure is not limited to such a configuration. Further, one or more distance measuring apparatuses may be implemented in appropriate locations in accordance with the design to be implemented.

The distance measuring apparatus 15 transmits and receives light using a pair of light sources and a photo diode, and scans surroundings in three dimensions using a movable mirror and a rotor.

The distance measuring apparatus 15 may operate using a time of flight (TOF) method, for which a laser emits a pulsed or square wave signal to measure a time when the pulses or square wave signals reflected from objects within a measurement range reach a receiver in order to measure the distance between the object to be measured and the distance measuring apparatus.

The moving device 20 calculates a driving path based on a distance to the target, or detects obstacles to move the moving object. The moving device 20 may move the moving object based on a relative location of an artificial landmark.

Hereinafter, a distance measuring apparatus which is implemented in a moving object or which operates independently will be described with reference to FIG. 10.

FIG. 10 is a block diagram illustrating a distance measuring apparatus. As illustrated in FIG. 10, the distance measuring apparatus 15 includes an optical transceiver 100 and a distance measuring unit 200. The distance measuring apparatus 15 may omit some components from among the various components which are exemplarily illustrated in FIG. 10, or may further include other components. For example, the distance measuring apparatus 15 may further include an interface.

The optical transceiver 100 transmits a laser signal and receives a reflected signal. The optical transceiver 100 emits light toward a target in response to a start control signal and receives light which is reflected from the target to then convert the light into an electrical signal. The optical transceiver 100 outputs the electrical signal during a predetermined detection time.

The optical transceiver 100 converts light into a current or a voltage, so that a circuit for buffering and scaling the output of the photo diode is necessary. For example, a transimpedance amplifier (TIA) may be connected to the photo diode. The transimpedance amplifier amplifies the current of the photo diode and converts it into a voltage for output. The transimpedance amplifier may be classified as a resistive feedback TIA (R-TIA) or a capacitive feedback TIA (C-TIA).

The optical transceiver 100 may include a signal converter. The signal converter is connected to the photo diode of the optical transceiver 100, and the transimpedance amplifier is connected to the signal converter.

The light source emits light toward the target based on a predetermined sampling period, which may be set by a controller of the distance measuring apparatus 15. The sampling period is the time during which the optical transceiver 100 emits light in response to a start control signal and receives the reflected light to then convert the received light into an electrical signal. The optical transceiver 100 may repeatedly perform this operation in a subsequent sampling period.

The photo diode receives light reflected from the target to convert the light into an electrical signal. The photo diode may be implemented as a PN junction photo diode, a PIN photo diode, or an avalanche photo diode (APD). The photo diode outputs the electrical signal until the photo carrier dissipates. Further, as the magnitude of the output signal is increased, it takes more time for the signal to dissipate.

The signal converter outputs the electrical signal during a detection time of the sampling period so as not to be limited to the dissipation time of the output signal. The signal converter may include a resistor, a switch, and a capacitor.

The resistor is connected to the photo diode. Specifically, one end of the resistor is connected to the photo diode and the other end of the resistor is connected to the ground. The resistor may be connected to an anode or a cathode of the photo diode.

When a resistance value is small, a waveform has a non-zero value during a time similar to the time when light passes through the photo diode, but there is a problem in that the magnitude of the output signal is small. Therefore, it is necessary to amplify the magnitude of the electrical signal using a resistor having a value which is larger than a predetermined value. In this case, a signal trailing phenomenon may be generated.

In order to solve the signal trailing phenomenon, the transmission path of the electrical signal is changed through a switch. The optical transceiver 100 may output a signal from which a part of an area where the magnitude of the electrical signal is reduced is removed. Even though a rear end of the electrical signal may be removed, the distance measuring apparatus 15 may measure a distance. This is because the signal discriminator does not detect the ending point of the electrical signal, but rather detects the start timing of the electrical signal and a timing of maximum magnitude in order to output a rising edge and a falling edge.

The switch is connected to the resistor in parallel to change the transmission path of the electrical signal. For example, the switch may be implemented as a transistor.

The switch transmits the electrical signal (i) to a first path during a detection time Td of the sampling period Ts, and (ii) to a second path during a cut-off time Tc of the sampling period Ts. The first path is a path through which the signal is transmitted through the capacitor, and the second path is a path through which the signal is transmitted to the ground through the switch.

Even though signal dissipation times T1, T2, and T3 are taken for the electrical signal output from the photo diode 122 due to the trailing phenomenon, the distance measuring apparatus 15 may process the signal in accordance with the sampling period without waiting until the signal dissipates.

The distance measuring apparatus 15 adjusts the sampling period, calculates and sets an appropriate detection time in accordance with the sampling period, and controls an on/off operation of the switch. The controller of the distance measuring apparatus 15 may control an on/off operation of the switch by referring to a sampling period, a detection time, a cut-off time, a waveform of emitted light, the on/off time interval of a light source, the pulse width of a start control signal, the pulse width of a stop control signal, the rotation speed of the optical transceiver, the signal processing and waiting time of the signal discriminator, and a time calculator.

The capacitor is connected to a point where the photo diode 122 and the resistor 151 are connected to output an electrical signal. The capacitor removes the DC component of the electrical signal. A non-inverting amplifier may be connected to a rear end of the capacitor.

The distance measuring unit 200 includes one or more signal discriminators which convert an electrical signal to measure an exact timing and output a stop control signal.

The distance measuring unit 200 uses the signal discriminator to convert the electrical signal such that a signal point having a maximum signal magnitude has a predetermined magnitude, to adjust the magnitude of the converted electrical signal, and to detect a timing having the predetermined magnitude. The signal discriminator converts the electrical signal to generate a stop control signal.

The signal discriminator receives the electrical signal from the photo diode or the transimpedance amplifier. The received electrical signal, that is, the input signal, rises or falls according to the amount of reflected light. The signal discriminator exactly measures a target timing for the input signal to output the electrical signal.

The input signal has a front end timing $T_{front}$, target timings $T_1$ and $T_2$ which meet a set threshold value, and a peak timing $T_{max}$ in accordance with the shape of the input signal. The signal discriminator performs two steps of a conversion process to detect the timings which are the closest to the front end timing $T_{front}$ and the peak timing $T_{max}$. The converted signal has a front end timing $T_{front}$, rising timings $T_{rising1}$ and $T_{rising2}$ which meet the set threshold values, falling timings $T_{falling1}$ and $T_{falling2}$ which meet the set threshold values, and a rear end timing $T_{end}$. The rear end timing $T_{end}$ is the same timing as the peak timing $T_{max}$ of the signal before the conversion process.

The signal discriminator differentiates or converts the input signal using a constant fraction discriminator (CFD). The constant fraction discriminator is a method which finds the timing at which a signal obtained by delaying an original signal is equal to the timing at which a signal adjusted by a predetermined magnitude ratio becomes a predetermined ratio of the maximum magnitude.

The signal discriminator measures an exact timing from the rising and falling electrical signals to output the signal. The signal discriminator converts the electrical signal and detects a timing having a predetermined reference magnitude to generate a stop control signal. When the slope of the input signal is converted such that a signal point having the maximum signal magnitude has a predetermined magnitude, the rising timings $T_{rising1}$ and $T_{rising2}$ are close to the front end timing $T_{front}$ and the falling timings $T_{falling1}$ and $T_{falling2}$ are close to the rear end timing $T_{end}$.

The signal discriminator adjusts the magnitude of the converted input signal by amplifying the magnitude of the converted input signal N times (with N being a natural number), and it performs a plurality of amplifying processes to convert the slope of the signal to be close to the vertical. Since the slope is large, even though the circuit is simply implemented only by the comparator, an exact timing may be obtained.

The signal discriminator converts the input signal so that the signal point having the maximum signal magnitude has a predetermined magnitude. For example, the signal discriminator may convert the signal such that the magnitude of the signal is zero. The distance measuring unit 200 may then detect a timing close to the timing having the maximum magnitude by converting the timing having the maximum magnitude into zero to compare the threshold value.

The signal discriminator detects at least one timing having a predetermined reference magnitude from the input signal for which the magnitude has been adjusted to output a signal. Here, there are two types of output signals. For example, the distance measuring unit 200 may output a rising edge and a falling edge.

The distance measuring unit 200 measures a time and a distance using the time of flight method, wherein the time of flight is determined based on a time difference between the start control signal and the stop control signal, which is used to calculate the distance using the speed of light.

The distance measuring unit 200 may include one or more time to digital converters which convert the difference of two times into a digital value. The input signal of the time to digital converter may be a pulse shape of the same signal source or may be an edge of another signal source. For example, the distance measuring apparatus 15 may calculate the time difference based on a rising or falling edge of the start control signal and a rising or falling edge of the stop control signal.

The time to digital converter may be configured as a time delay element and a flip flop. The time delay element may be implemented as a digital element using an inverter or as an analog element using a current source. Various methods such as a phase difference method, a method employing a high resolution clock, or an equivalent time sampling method may be applied to the time to digital converter.

The time to digital converter measures a time using (i) numbers N1 and N2 counted by a coarse counter and a fine counter, and (ii) a large clock signal of the coarse counter and a small clock signal of the fine counter. The time difference between the large clock signal of the coarse counter and the small clock signal of the fine counter determines the resolution of the time to digital converter.

The time to digital converter includes a slow oscillator which generates a large clock signal and a fast oscillator which generates a small clock signal. The phase detector detects a timing when the large clock and small clock signals are synchronized.

In the time to digital converter of the related art, the slow oscillator and the fast oscillator adjust the clock width by adjusting the number of buffers. The time to digital converter of the related art has a resolution of approximately 80 pico seconds (ps) due to a signal delay time of the buffer.

The slow oscillator and the fast oscillator of the time to digital converter adjust the clock width by changing the positions and signal paths of gates on the circuit. For example, the slow and fast oscillators may be combined by the same gates. The slow and fast oscillators of the time to digital converter change the positions and signal paths of gates so that the time to digital converter has a resolution of approximately 10 pico seconds (ps).

The time to digital converter processes the rising edge and the falling edge together so that the slow oscillator or the fast oscillator may be designed to be shared.

An interface is a communication path which transmits and receives information to and from other devices (or a host). Other devices may access the distance measuring apparatus 15 through an interface to set a parameter. The distance measuring apparatus 15 may transmit the time and the distance measured through the interface to other devices.

When a differentiation method in which the distance measuring apparatus 15 is implemented by an RC circuit during a process of converting the slope of the signal is applied, a frequency characteristic of the signal related to the distance change is altered, thereby causing a time error. When a constant fraction discriminator is applied during the process of converting the slope of the signal, the charging times of the capacitors of the comparator may vary due to differences in the slopes of the signal, thereby causing a time error to be incurred due to the different response times of the comparator. Therefore, the distance measuring apparatus 15 performs a process of correcting the time error.

The distance measuring unit 200 corrects the time of flight using the pulse width of the stop control signal. Generally, since the change in the pulse width of the output signal of a photo diode is severe, it is difficult to use the output signal if the pulse width versus walk error is not close at the time of one to N matching. According to the exemplary embodiment, a process of converting the signal is performed in a way which allows the relationship between the pulse width and the walk error to be simply modeled.

The distance measuring unit 200 models a function between the walk error and the pulse width and measures a correction factor in advance. The distance measuring unit 200 applies a correction factor which is inversely proportional to the pulse width to correct the time of flight. When the pulse width is narrowed due to weakening of the reflected signal, the walk error is increased, causing the distance measuring unit 200 to set the correction factor to be large. When the pulse width is widened due to strengthening of the reflected signal, the walk error is reduced, causing the distance measuring unit 200 to set the correction factor to be small.

The distance measuring unit 200 calculates the pulse width with respect to the rising edge or the falling edge of the stop control signal and adds the factor value, which is applied as a function based on the pulse width versus walk error, to a time of flight which has not been corrected. The distance measuring apparatus 15 corrects the time of flight using the pulse width of the reflected signal to calculate the exact time of flight.

In order to reduce the size of the Lidar sensor, all components, for example, a transmitter, a mirror, and a receiver, need to be deployed in close proxmity. In order to reduce the size of the optical transceiver, the distances from a transmitter (emitter) and from a receiver to the mirror needs to be minimized.

FIG. 11 is a view illustrating an echo phenomenon according to an arrangement of the optical transmitter, mirror, and optical receiver. Referring to FIG. 11, both the optical transmitter and the optical receiver are located at a lower portion and the mirror is located at an upper portion, and echo problems are incurred during the process of downsizing the components due to the positioning of the components and the optical path. The echo is generated from diffusion or scattering of the optical signal by the mirror. When the laser signal meets the mirror, a signal which is weakly diffused or reflected is input to the photo diode. The rising edge is delayed due to the weakness of the signal and the falling edge is changed in accordance with the distance to an actual target.

In order to downsize the Lidar sensor, the distance between the transceiver and the mirror needs to be minimized. In order to ensure a vertical field of view, the mirror also needs to be moved. However, in this case, a space for moving the mirror needs to be secured and the echo signal needs to be blocked. To this end, according to the exemplary embodiment, a blocking wall is installed.

Hereinafter, a structure of an optical transceiver which is capable of performing three-dimensional scanning will be described with reference to FIGS. 12 to 18D.

Referring to FIG. 12, the optical transceiver 100 includes an optical transmitting unit 110, an optical receiving unit 120, a light blocking wall 130, a first angle adjusting unit 140, and a second angle adjusting unit 150. The light transceiver 100 may omit some components from among the various components which are exemplarily illustrated in FIG. 12, or may further include other components. Referring to FIG. 13, the optical transmitting unit 110 may include a light source 112, a transmission reflector 114, and a point adjusting unit 116. Referring to FIG. 14, the optical receiving unit 120 may include a photo diode 122 and a reception reflector 124. Referring to FIG. 15, the first angle adjusting unit 140 may include a reflector 142, a first driver 144, a first frequency adjusting unit 146, and a reference angle adjusting unit 148.

The optical transmitting unit 110 transmits light to a first reflection area 143a of the first angle adjusting unit 140, while the optical receiving unit 120 receives light from a second reflection area 143b of the first angle adjusting unit 140. The light blocking wall 130 separates the movement path of the light to be transmitted from the movement path of the light to be received. The first angle adjusting unit 140 contains the first reflection area 143a and the second reflection area 143b, reflects the light, and is installed in such a way as to be fixed or moveable.

The light source 112 is a device which emits and transmits light to the first reflection area 143a or to a transmission reflector 114. The light source 112 may be implemented as a laser diode LD. The light source 112 may generate a laser pulse signal in nanoseconds, and the laser signal may have a predetermined wavelength band. The light source 112 may be connected to the point adjusting unit 116, which adjusts the speed of the light source to emit light based on a predetermined sampling period in order to adjust the number of group data points obtained per unit time. For example, the point adjusting unit 116 may set the emitting speed of the light source 112 to obtain 10 K to 20 K points per second.

The photo diode 122 is a device which receives light reflected from the second reflection area mirror 143b or from a reception reflector 124 and converts the light into an electrical signal. The principle in which light having photon energy strikes a diode and causes the generation of moving electrons and positive charge holes to stimulate the movement of electrons may be applied by the photo diode 122. The photo diode 122 may be implemented as a PN junction photo diode, PIN photo diode, or an avalanche photo diode (APD).

The transmission reflector 114, the reception reflector 124, and the reflector 142 may be implemented as mirrors. Lense 113 may be located between the movement paths of the light. The optical transceiver 100 may split or condense light or form parallel light using the lenses. The optical transceiver 100 may include a transmission optical unit and a reception optical unit. The transmission optical unit and the reception optical unit are for the paths of the laser signal and may be formed to have a body tube structure.

The reflector 142 includes the first reflection area 143a and the second reflection area 143b. The first reflection area 143a reflects light transmitted by the optical transmitting unit 110 onto a target. The second reflection area 143b reflects light reflected from the target to the optical receiving unit 120. Even though a part of the light transmitted by the optical transmitting unit 110 may be diffused, scattered, or reflected in the first reflection area 143a, the light blocking wall 130 blocks a path through which the diffused, scattered, or reflected light could move to the optical receiver 143b.

The first angle adjusting unit 140 may include a first driver 144 which moves a reflector 142 of the first angle adjusting unit 140, a first frequency adjusting unit 146 which adjusts the period in which the reflector 142 of the first angle adjusting unit 140 moves, and a reference angle adjusting unit 148 which adjusts the angle at which the reflector 142 of the first angle adjusting unit 140 is installed, or a combination thereof.

The first driver 144 changes the slope of a normal line of the reflector 142 by adjusting the reflector 142 at a predetermined period. The reflector 142 is a movable mirror and may move in a bending motion, a resonant motion, a reciprocating motion, a seesaw motion, a rotational motion, or a combination thereof. For example, the reflector may be implemented as a swing mirror.

The first frequency adjusting unit 146 may change the period when the reflector 142 moves vertically. The vertical frequency adjusting unit 146 may set the reflector 142 to oscillate or rotate at 200 to 300 Hz.

The reference angle adjusting unit 148 sets the normal line of the reflector 142 to be −55 degrees with respect to a horizontal plane so that the reflector 142 is inclined at an inclination of 45 degrees. An end or an upper end of the light blocking wall 130 may be obliquely formed. The reference angle adjusting unit 148 may set a reference angle to install the reflector 142 in the frame in consideration of the maximum movement angle and the position whereat the reflector 142 abuts against the end of the light blocking wall 130.

The optical transceiver 100 adjusts the movement path and angle of the light using the reflector 142, which is moving, to secure the vertical field of view. Such a configuration therefore enables a pin point to be measured, which is different from devices of the related art which are implemented by a single lens and a photodiode array.

Referring to FIGS. 16A to 16D, the optical transceiver 100 may be implemented to have one reflector 142 or two reflectors 142a and 142b. In the case of one reflector 142, it is divided into the first reflection area 143a and the second reflection area 143b. Implementations using two reflectors 142a and 142b include the first reflection area 143a and the second reflection area 143b, respectively. The reflector 142 is designed to move at a predetermined angle and in a predetermined direction. The reflector 142 may move by sweeping vertically.

The optical transmitting unit 110 and the optical receiving unit 120 include lenses 113 and 123. When a short focus lens is used as the lens of the transmitter and receiver, it may be difficult to adjust an exact focal point. Desirably, a lens having a normal focal length and a lens tube ray may be mounted on an interface board.

The optical transceiver 100 changes the electromagnetic force of a coil 144a to adjust the magnitude and direction of the force of a magnet attached to the reflector 142. The shape, size, and height of the light blocking wall 130 are determined in consideration of the reference and movement angles of the reflector 142. For example, the light blocking wall 130 may be formed to be bent or partially protrude.

Referring to FIG. 16C, in the exemplary embodiment, the transmission and reception paths of light are completely separated from each other by the light blocking wall 130. That is, the transmitter module and the receiver module are located in specific spaces separated by the light blocking wall 130. The transmitter and receiver modules may include sweeping mirrors, respectively. The first angle adjusting unit includes a first reflector, having a first reflection area, and a second reflector, having a second reflection area. The first and second reflectors may be located in spaces (a first space and a second space) separated by the light blocking wall.

Even though in a rectangular mirror is illustrated in FIG. 16C, various shapes of mirrors of appropriate size and shape may be employed in accordance with a design. The transmitter and receiver modules may include fixed mirrors 114 and 124, respectively.

Referring to FIG. 16D, the optical transceiver 100 moves the switching mirror 142a using a motor 144b. The beam output from the transmitter is directed to the switching mirror. The sweeping mirror rotates to redirect the direction of a beam, and may be employed as a polygonal mirror.

The three-dimensional Lidar sensor, that is, the optical transceiver, includes a transmitter module, a receiver module, a rotor, and a second driver. Both the transmitter module and the receiver module are connected to the rotor. The second driver transmits power to the rotor through a cable or a chain and may be implemented by a motor. The second driver rotates the rotor in a specific direction to rotate the transmitter module and the receiver module.

The optical transceiver may set the rotation period of the first driver based on a sampling period, a movement period, and a time, according to the movement path of light. The shapes, rotating directions, and rotation periods of the reflector of the transmitter module and the reflector of the receiver module may be set to be the same or different depending on the design to be implemented. Further, the reflector of the transmitter module and the reflector of the receiver module may operate by sharing the first driver, or operate by employing separate powers.

The first angle adjusting unit moves at a predetermined period to change the normal line of the first reflection area and the normal line of the second reflection area. The first angle adjusting unit synchronizes the period of the first reflection area and the period of the second reflection area and matches the normal direction of the first and second reflection areas.

The exemplary embodiment may be easily transformed to a frame not only for a three-dimensional scanning Lidar, but also for a two-dimensional scanning Lidar. The polygonal mirror is replaced with a normal lens tube to be used as a two-dimensional scanning Lidar.

The optical transceiver 100 may be implemented with a plurality of scan lines. The angles of the plurality of reflectors are set to be different from each other to enable simultaneous detection of obstacles in a vertical direction and a ground direction. For example, the scan lines may be set to be at 45 degrees and 60 degrees, and two or more scan lines may be configured.

The three-dimensional Lidar sensor may include a first angle sensor and a second angle sensor.

When the first driver rotates the reflector at a first angle, the first angle sensor measures the rotation angle of the reflector. The first angle sensor calculates an angle at which the center axis of the reflector rotates or an angle formed from a reference whereat a reflection surface is set.

When the second driver rotates the rotor at a second angle, the second angle sensor measures the rotation angle of the rotor. The second angle sensor may be implemented as an encoder or a hall sensor. An incremental encoder or a one-shot hall sensor may be applied.

In FIGS. 17A to 17D, a blocking wall, a reflector, an optical transmitting unit, and an optical receiving unit of an optical transceiver are illustrated.

The optical transmitting unit 110 and the optical receiving unit 120 are located to be opposite to the reflector of the first angle adjusting unit. The optical transmitting unit 110 and the optical receiving unit 120 may be located in one or two directions with reference to the reflector. The reflector is divided into the first reflection area 143a and the second reflection area 143b, and may also include a light absorption area 143c.

The light blocking wall 130 is disposed between the optical transmitting unit 110 and the optical receiving unit 120 and forms a blocking area with respect to the first angle adjusting unit so that when light transmitted from the optical transmitting unit 110 is reflected or scattered from the first reflection area 143a of the first angle adjusting unit the reflected or scattered light does not reach the optical receiving unit 120.

The light blocking wall 130 may form the blocking area using a length relationship including a distance Hb from the first angle adjusting unit to the light blocking wall, a thickness Wb of the light blocking wall 130, a distance H1 from the first reflection area 143a to the optical transmitting unit 110, a distance W1 from the light blocking wall 130 to the optical transmitting unit 110, a distance H2 from the second reflection area 143b to the optical receiving unit 120, a distance W2 from the light blocking wall 130 to the optical receiving unit 120, a reference angle of the first angle adjusting unit, and a movement angle of the reflector, or a combination thereof. W1 includes the thickness of the optical transmitting unit 110, and W2 includes the thickness of the optical receiving unit 120. Wb blocks the movement path of the scattered or reflected light. H2 may be set to be longer than H1. Hb and H2 may be set to have appropriate lengths so that light which passes through Wb does not reach the optical receiving unit. The height of the blocking wall may be set to be higher than the first reflection area 143a or the second reflection area 143b.

FIGS. 18A to 18D illustrate a first driver of an optical transceiver.

The reflector which is implemented as a movable mirror may move using an electromagnetic force generated by a magnet and a coil. The first angle adjusting unit 190 includes a reflector having a first reflection area and the second reflection area, and the reflector is installed in a frame of the optical transceiver in such a way as to be movable. The reflector may move using the electromagnetic force of the magnet attached to the reflector and the coil installed in the frame.

Referring to FIG. 18A, a smooth hinge or a center axis is provided at the center of the reflector and permanent magnets are located on both ends (or at points close to the ends). The coil is located on an end (or at a point close to the end) of a rear surface of the reflection surface. When a current is applied to the coil with periodical change of the direction, the reflector is made to shake. Here, since the force caused by the magnet and the coil is small, in order to move the reflector or the normal line 145 of the reflector at a high frequency, the hinge needs to be formed of a material which facilitates smooth movement. As the tension of the hinge is strong, the reflector may be moved by a small force, but it is difficult to make a motion of high frequency. The reflector may move along the center axis.

The movable mirror may use an MEMS technique or a piezo motor, or may rotate a polyhedron.

The first angle adjusting unit 190 includes a first reflector having a first reflection area and a second reflector having a second reflection area, and the first and second reflectors are configured as a polygonal column to move while rotating. The first reflector having the first reflection area is located in a transmission path of the light, and the second reflector having the second reflection area is located in a reception path of the light. The structure in which the reflectors are separated is illustrated in FIGS. 17C and 17D.

The structure illustrated in FIG. 18A has a low vertical scanning speed so that a configuration in which a polygon is connected to the motor to be rotated may be applied. In FIG. 18B, the reflector, which is a movable mirror, is formed to be a polygonal column to move through rotation of the center axis. The optical transceiver adjusts the relationship between the rotational speed of the reflector and the emission speed of the light source to adjust the slope of the normal line of the reflected surface at every periodical timing.

The first angle adjusting unit illustrated in FIG. 18C operates by a principle which is opposite to the principle described in FIG. 18A. The first angle adjusting unit includes a reflector having a first reflection area and a second reflection area, and the reflector is installed in the frame of the optical transceiver in such a way as to be movable. The reflector may move using the electromagnetic force of the magnet installed in the frame and the coil attached to the reflector. A yoke connected to the magnet forms a magnetic flux path. Referring to FIG. 18D, the force which is applied to the reflector may be adjusted by changing the intensity and direction of the current flowing through the coil.

In the exemplary embodiments, the optical transmitting unit and the optical receiving unit are located in the same direction with respect to the reflected surface, the transmission and reception paths of the light are separated by the light blocking wall, and the movement path of the light is shortened so that the Lidar sensor may measure the pin point while minimizing error incurred due to the echo phenomenon, thus enabing the volume of the Lidar sensor to be minimized.

In the Lidar sensor, the transmission path of the light is formed by the first reflection area in the optical transmitting unit, and the reception path of the light is formed by the optical receiving unit in the second reflection area. When the first and second reflection areas are directed in the same direction, the Lidar sensor moves at a predetermined angle. In FIG. 19A, the transmission path of the light is formed to pass in the order of a light source 112, a transmitting lens 113, a transmitting reflector 114, a first reflector 142a, and a target. As needed, the transmission path of the light may be formed to pass in the order of the light source 112 and the first reflector 142a. In FIG. 19B, the reception path of the light is formed to pass in the order of the target, a second reflector 142b, a receiving reflector 124, a receiving lens 123, and a photo diode 122. As needed, the reception path of the light may be formed in the order of the second reflector 142a and the photo diode 122. The first reflector and the second reflector may be connected by passing through or over the light blocking wall, or may be integrally implemented.

FIG. 20 illustrates a structure of an optical transceiver according to another exemplary embodiment of the present disclosure, and a moving path of light. Referring to FIG. 20, light emitted from the light source 112 may form a movement path from (i) to (vi).

(i) Light emitted from the light source 112 passes through a hole of the first mirror 123 to move to the second mirror 140 along a straight path. The light emitted from the light source 112 may be collimated through a collimator. The collimator makes the incident light parallel.

(ii) The light reflected from the moving second mirror 140 moves to the target 2 according to the angle of the second mirror 140.

(iii) The light reflected from the target 2 moves back to the second mirror 140 along a straight path.

(iv) The light reflected from the moving second mirror 140 moves back to the first mirror 123. The first mirror 123 is formed to have a curved surface possessing a focal point at which the light reflected from the reflected surface of the first mirror 123 is gathered. The size of the reflected surface of the first mirror 123 is appropriately determined based on the distribution of the light reflected according to the angle of the moving second mirror 140. The first mirror 123 performs condensing and reflecting functions using a parabolic reflection mirror (in which a lens and a mirror are implemented together). That is, the reflected light is gathered from the second mirror 140 to be sent to the reflector 124.

(v) The light gathered at the first mirror 123 moves to the reflector 124. The reflector 124 is located at the focal point of the curved surface of the first mirror 123. The reflector 124 receives the light reflected from the first mirror 123 and then reflects the light to the photo diode 122.

(vi) The light reflected from the reflector 124 moves to the photo diode 122 along a straight path. The reflected light rays may form parallel straight paths or one straight path before being incident to the photo diode 122. The photo diode 122 is located on a virtual straight path which passes through the focal point of the first mirror 123.

As illustrated in FIG. 20, the hole of the first mirror, the second mirror, the reflector, and the photo diode are disposed in such a fashion as to adjust the movement path of the light. Therefore, the light source and the photo diode are disposed to be adjacent to each other to minimize the size of the photo transceiver 100 and the rotor 152, and to minimize the rotation radius of the rotor 152.

FIGS. 21 and 22 illustrate a second angle adjusting unit of an optical transceiver.

The second angle adjusting unit 150 includes a rotor 152, a second driver 154, a second frequency adjusting unit 156, and a rotor connecting unit 160. In the rotor 152, the optical transmitting unit, the optical receiving unit, and the light blocking wall are attached in a fashion to allos rotation. The second driver 154 is connected to the rotor 152 to drive rotation of the rotor 152, and the second frequency adjusting unit 156 adjusts the rotating speed of the rotor 152. The second frequency adjusting unit 156 may adjust the rotor 152 to rotate at 5 to 10 Hz. The rotor connecting unit 160 connects the base of the optical transceiver to the rotor 152. The rotor connecting unit transmits power into the rotor and performs data communication.

The rotor connecting unit 160 includes a power line for which a conductor is in physical contact with the rotor 152 to transmit power, and a data communication unit which is wirelessly connected to the rotor 152 to transmit data thereto.

The power is transmitted from the base to come into contact with an upper portion of the conductor through the conductor. The contact portion is implemented to consistently be pushed through a spring in order to ensure sufficient durability. The power line applies pressure to a worn portion of the conductor in the direction in which the conductor is in contact. Even though the conductor may become worn out due to consistent friction, in order to avoid a power transfer problem, the portion which transmits the power from a lower portion to an upper portion may be formed of a relatively softer material than that of the conductor. The thickness of the portion which transmits power is sufficiently secured, and the spring pushes from a lower end to an upper end.

Communication lines which transmit data are vulnerable to electrical noise emitted from the product, as well as to emission noise generated from a serge or diode switching, so that the communication line is wirelessly connected. In order to completely remove lines, the communication part may employ an infrared communication method. Referring to FIG. 23, an infrared transmitter and an infrared receiver are provided at the center of the upper rotor and the lower base so that the data may be transmitted and received in both directions. In order to minimize the interference between the laser and the light, a shielding film is installed so that the laser and the infrared ray do not incur interference from each other.

The distance measuring apparatus may adjust the vertical scanning motion of the reflector of the first angle adjusting unit through a controller implemented as an FPGA. The controller periodically transmits +/- signals to cause swinging of the reflector. The reflector swings from −10 degrees to +10 degrees. When the signal has a periodic waveform, the angle of the mirror is constant in accordance with a periodical timing. If necessary, a position sensitive diode (PSD) sensor is mounted on a rear surface of the mirror to measure the angle. The distance measuring apparatus may adjust the horizontal rotating motion of the rotor through a controller implemented as an FPGA. The controller controls the rotation speed of the rotor and measures the angle of rotation through an encoder which is provided inside or outside the rotor.

The controller which adjusts the vertical scanning motion of the reflector and that which adjusts the horizontal rotating motion of the rotor may be implemented as independent modules.

The distance measuring unit receives the vertical angle from the controller which adjusts the vertical scanning motion of the reflector, and receives a horizontal angle from the controller which adjusts the horizontal rotating motion, and then stores the data on the vertical and horizontal angles.

The distance measuring apparatus receives light emitted from the light source using the photo diode and then calculates a time of flight. The distance measuring apparatus transmits the vertical angle, the horizontal angle, and the time of flight to the host through the interface. The time of flight may be corrected or calibrated. The distance measuring apparatus may perform filtering to remove noise from at least one of the vertical angle, the horizontal angle, and the time of flight before transmitting the data to the host.

FIG. 24 is a view illustrating three-dimensional information (point group data) obtained by a distance measuring apparatus using an optical transceiver. The position unit of the three-dimensional point group data is meters. The distance measuring apparatus may obtain point group data for a floor and a wall.

Numerical values at which to set the point adjusting unit 116, the reference angle adjusting unit 148, the first driver 144, the first frequency adjusting unit 146, the second driver 154, and the second frequency adjusting unit 156 may be determined appropriately depending on a design to be implemented.

FIGS. 25 to 35 are views for explaining an operation of recognizing a position and generating a map for a moving object according to exemplary embodiments of the present disclosure.

When a moving object such as a robot or a vehicle moves within an unknown environment, there is no information on the surrounding environment. Therefore, a map for each environment needs to be generated using sensor information, and the current position of the moving object needs to be predicted from the generated map. A method for recognizing the position and creating a map of the surrounding environment as described above is referred to as a simultaneous localization and mapping (SLAM) technique.

FIG. 25 is a graph model representing information processed by a simultaneous localization and mapping (SLAM) method. Referring to FIG. 25, x denotes the position of a robot, u denotes odometry information, z denotes an observed value, and m denotes a predicted map. There are various SLAM techniques, such as filter-based SLAM or graph-based SLAM.

The graph-based SLAM technique represents the position and the motion of the robot using a node and an edge of a graph. A node is the position of a robot or of an artificial landmark at a specific timing. The edge is a relationship between two nodes, and refers to a constraint on the space between two nodes. The measured edge includes errors. Therefore, when the traveling distance of a robot is increased and the number of nodes is increased, errors may be accumulated during a process of predicting the position.

FIG. 26 is a view illustrating a map generator. As illustrated in FIG. 26, the map generator 200 includes a local map predicting unit 210 and a global map predicting unit 220. The local map predicting unit 210 and the global map predicting unit 220 may be implemented by the same or different processors.

The map generator 200 represents a position which is scanned as nodes and calculates the relative positions between the nodes. The map generator 200 optimizes the position of the nodes depending on the relative positions between nodes to update the map. The map generator 200 finds a node value which satisfies constraints as much as possible, or a node value which minimally deviates from the constraints, and then optimizes the position of the node by performing a process of correcting the errors in the positions of the nodes. That is, the nodes are converged to an optimal node value based on the constraints.

The map generator 200 predicts the current position using sensor data obtained from a close region when the current position is being predicted. A scanning period and a key frame generation period are set to appropriate values depending on the design to be implemented, and may be set to differ from each other as needed.

The hybrid sensor 10 obtains scan information of a space where the mobile robot is located. The hybrid sensor 10 may obtain omnidirectional distance information or distance information of a partial region using a Lidar sensor. The map generator 200 may additionally obtain odometry information of a mobile robot together with the distance information. The map generator may obtain odometry information such as the revolution, gradient, or rotational amount, which may be obtained from an encoder connected to the moving device or from an inertial measurement unit. Such an IMU may be implemented as an acceleration sensor or a gyro sensor.

The position of a mobile robot may be represented by a three-dimensional vector. The three-dimensional vector may be represented as an X coordinate and a Y coordinate from the origin of a reference coordinate system, and an angle formed by the X axis of a robot coordinate system and the X axis of the reference coordinate system.

The local map predicting unit 210 generates a key frame regarding a node using scan information, and calculates an odometry edge between consecutive nodes. The observed values between nodes contain uncertainty. The uncertainty of the odometry edge may be represented by a covariance matrix.

The local map predicting unit 210 stores a key frame among a plurality of scan information obtained at every scanning period. The scan information may be represented by a point cloud or composite data. The key frame includes distance information and time information. When there is no registered key frame, the local map predicting unit 210 generates a key frame using distance information which is currently input, and then predicts the local map by updating the key frame. The local map predicting unit 210 may perform scan matching based on the local map, during which a plurality of scan information is added to improve precision.

The local map predicting unit 210 rotates or moves the scan information to match the scan, or measures the odometry information of the mobile robot to calculate the odometry edge. The local map predicting unit 210 corrects the error between the odometry edge predicted based on the predicted values of the nodes and that measured through the scan matching.

The global map predicting unit 220 detects a loop closure edge between inconsecutive nodes with respect to a set of the updated key frames. When the mobile robot revisits a region which it has previously visited, the errors of the nodes may be more precisely corrected. Differently from the odometry edge formed between nodes which are temporally consecutive, the loop closure edge forms a spatial relationship between nodes which are not temporally consecutive. However, since it is inefficient to generate a loop closure edge between all edges, it is necessary to detect the appropriate loop closure edge in consideration of constraints.

The global map predicting unit 220 predicts a global map by correcting the positions of the nodes based on the odometry edge and the loop closure edge. The global map predicting unit 220 combines local maps to extend and update the global map.

An interface is a communication path through which information is transmitted to and received from other devices. Other devices may access the map generating unit 20 through an interface to set a parameter. The map generator 200 may transmit the measured position and the map to another device through the interface.

Hereinafter, an operation in which the map generator matches the scan will be described with reference to FIG. 27. FIG. 27 is a view illustrating data which is scan-matched by the map generator.

p denotes a position of a node in accordance with time and position changes, and e denotes a spatial relationship between nodes. The scan information obtained by the map generator includes information on the distance from a fixed structure.

When scan information obtained before and after the movement of the robot is compared, odometry errors are accumulated, thereby causing common portions not to overlap. Such odometry errors are corrected by scan matching, during which the scan information is rotated and moved, and the probability of the observed value is calculated to allow the precise position of the robot to be predicted.

Hereinafter, a filtering operation of the map generator will be described with reference to FIG. 28. FIG. 28 is a view illustrating data which is filtered by the map generator.

The scan information obtained at a specific time or in a specific position may include noise such as the presence of a moving obstacle, which is different from a fixed structure. Further, a local map which is progressively updated while the mobile robot moves may be changed to have a configuration which is different from an actual configuration. That is, due to moving obstacles, when the scan information obtained at different time periods in the same position is scan-matched, an error may be generated in the predicted map.

The local map predicting unit discriminates between moving obstacles and fixed obstacles from a plurality of scan information obtained during a predetermined time period using a probability technique and compares newly obtained scan information to remove moving obstacles from the key frame, thereby updating the local map. The local map is updated by removing the noise using information collected from the recent N scans. The noise may be point cloud data or composite data which is modified by moving a predetermined movement distance or by rotating at a predetermined rotation angle.

In order to reduce the calculating load and to obtain significant information, when a first condition for the movement distance of a mobile robot is satisfied, the local map predicting unit may filter the key frame. The first condition is set based on the movement distance. For example, when the moving object moves by a value equal to or greater than a predetermined distance from the reference point, the local map predicting unit performs filtering to remove the noise for the moving obstacle.

Hereinafter, an operation of a map generator for predicting a global map will be described. FIG. 29 is a flowchart illustrating an operation through which a map generator predicts a global map, and FIGS. 30 to 34 are views illustrating the data processed by the map generator.

When a second condition relating to the movement distance of a mobile robot or a change of the surrounding environment is satisfied, the global map predicting unit predicts a global map for a set of the updated key frames. The second condition is set based on the movement distance or the amount of change of the surrounding environment. For example, the second condition is set to be satisfied when the mobile robot travels a predetermined distance or deviates from a predetermined distance range, or when the matching rate of the surrounding structures deviates from a predetermined range.

All the information from the recent N scans is filtered data, and has data on fixed structures. The global map predicting unit stores the filtered key frames.

In step S310, the global map predicting unit corrects the error of each key frame using uncertainty propagation with respect to a specified key frame. Variables related to key frames are transmitted to a combination of other variables in the functional relationship with uncertainty.

A first candidate group related to a key frame located within a predetermined distance is extracted using Mahalanobis distance. The Mahalanobis distance is a value indicating how many times the distance from the mean value is the standard deviation, and it represents which value would be hard to generate, or how strange a value is. FIG. 30 illustrates nodes $p_{k-1}$, $p_k$, $p_{k+1}$, $p_{m-1}$, $p_m$, $p_{m+1}$ of the first candidate group, which are extracted with respect to a node $p_n$ related to a recently inserted key frame.

In step S320, the global map predicting unit compares a key frame of the first candidate group with a key frame obtained during a predetermined time period to extract a second candidate group related to a matching key frame in a predetermined probability range. In FIG. 31, an illustration is provided of nodes $p_k$, $p_{m-1}$, $p_m$, $p_{m+1}$ of the second candidate group, which are extracted with respect to nodes $p_n$, $p_{n-1}$, $p_{n-2}$ related to the recent N key frames.

In step S330, the global map predicting unit extracts a third candidate group related to a key frame matching a predetermined consistence range from the second candidate group using a consistence checking algorithm. The global map predicting unit rechecks erroneously matched candidates. For example, as the consistency checking algorithm, a maximum clique or single cluster graph partitioning technique may be applied. FIG. 32 illustrates the extracted nodes $p_{m-1}$, $p_m$, $p_{m+1}$ of the third candidate group.

In step S340, the global map predicting unit detects a loop closure edge between inconsecutive nodes with respect to the key frame belonging to the third candidate group. The global map predicting unit forms a spatial relationship between the recent node and the significant node. FIG. 33 illustrates a loop closure edge $e_{n,m}$ between inconsecutive nodes $p_n$, $p_m$.

In step S350, the global map predicting unit corrects the error of the odometry edge and the error of the loop closure edge using a graph optimization technique. The global map predicting unit finds a node value which satisfies constraints as much as possible, or a node value which minimally deviates from the constraints, and optimizes the position of the node by performing a process of correcting errors in the positions of the nodes. That is, the nodes are converged to an optimal node value based on the constraints. For example, the error may be corrected by calculating the minimum value of a weighted sum of square for an error vector using the plurality of odometry edges and the plurality of loop closure edges. FIG. 34 illustrates nodes and edges for correcting an error.

The global map predicting unit may output a global map obtained by integrating the plurality of local maps.

FIG. 35 is a flowchart illustrating a map creating method of a moving object according to another exemplary embodiment of the present disclosure. A map creating method of a moving object may be implement by a map generator of a moving object (a mobile robot).

In step S410, the map generator obtains scan information on a space wherein the mobile robot is located. In step S410 of obtaining the scan information, omnidirectional distance information or distance information of partial regions may be obtained using a Lidar sensor. In step S410 of obtaining the scan information, odometry information on a mobile robot may be obtained in addition to the distance information.

In step S420, the map generator generates a key frame for a node using scan information, calculates an odometry edge between consecutive nodes, and updates the key frame to predict a local map.

In step S420 of predicting a local map, the odometry edge is calculated by rotating or moving the scan information to match the scan, or by measuring the odometry information of the mobile robot. Error occurring between the predicted odometry edge and the measured odometry edge is corrected based on the predicted value of the node determined by scan matching.

In step S420 of predicting a local map, when a first condition for the movement distance of a mobile robot is satisfied, the key frame is filtered. In step S420 of predicting a local map, moving obstacles and fixed obstacles are discriminated from a plurality of scan information obtained during a predetermined time period by a probability technique, and newly obtained scan information is compared to remove the moving obstacles from the key frame, thereby updating the local map.

In step S430, the map generator detects a loop closure edge between inconsecutive nodes for a set of the updated key frames and corrects the position of the node based on the odometry edge and the loop closure edge to predict a global map.

In step S430 of predicting a global map, when a second condition relating to the movement distance of a mobile robot or a change of the surrounding environment is satisfied, a global map for a set of the updated key frames is predicted.

In step S430 of predicting a global map, the error of each key frame is corrected using uncertainty propagation with respect to a specified key frame, and a first candidate group for a key frame located within a predetermined distance is extracted using Mahalanobis distance.

In step S430 of predicting a global map, a key frame of the first candidate group is compared with a key frame obtained during a predetermined time period to extract a second candidate group related to a matching key frame within a predetermined probability range.

In step S430 of predicting a global map, a third candidate group related to a key frame matching a predetermined consistence range is extracted from the second candidate group using a consistence checking algorithm. The map generator generates a loop closure edge for at least one node among the nodes belonging to the first candidate group to the third candidate group.

In step S430 of predicting a global map, the error of the odometry edge and the error of the loop closure edge are corrected by a graph optimization technique.

A plurality of components included in the Lidar sensor (optical transceiver), the distance measuring apparatus, the hybrid sensor, and the moving object are combined with each other to be implemented as at least one module. The components are connected to a communication path which connects to a software or hardware module in the apparatus to facilitate organic operation between the components. The components communicate with each other using one or more communication buses or signal lines.

The distance measuring apparatus, the distance measuring unit, the hybrid sensor, and the moving object may be implemented in a logic circuit by hardware, firmware, software, or a combination thereof, or may be implemented using a general purpose or special purpose computer. The apparatus may be implemented using a hardwired device, field programmable gate ware (FPGA), or application specific integrated circuit (ASIC). Further, the apparatus may be implemented by a system on chip (SoC) including one or more processors and a controller.

The distance measuring apparatus, the distance measuring unit, the hybrid sensor, and the moving object may be mounted in a computing device provided with a hardware element as a software, a hardware, or a combination thereof. The computing device may refer to various devices including all or some of a communication device for communicating with various devices and wired/wireless communication networks such as a communication modem, a memory which stores data for executing programs, and a microprocessor which executes programs to perform operations and commands.

The operation according to the exemplary embodiment of the present disclosure may be implemented as a program command which may be executed by various computers to be recorded in a computer readable medium. The computer readable medium indicates an arbitrary medium which participates to provide a command to a processor for execution. The computer readable medium may include solely a program command, a data file, and a data structure, or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The present embodiments are provided to explain the technical spirit of the present embodiment, and the scope of the technical spirit of the present embodiment is not limited by these illustrative embodiments. The protection scope of the present embodiments should be interpreted based on the following appended claims and it should be appreciated that all technical spirits included within a range equivalent thereto are included in the protection scope of the present embodiments.

What is claimed is:

1. A hybrid sensor, comprising:
a first sensor which obtains first data for a target;
a second sensor which obtains second data for the target; and
a processing unit which generates composite data obtained by mapping the first data and the second data,
wherein the second sensor comprises a first angle adjusting unit including a first reflection area and a second reflection area; an optical transmitting unit which transmits light to the first reflection area of the first angle adjusting unit; an optical receiving unit which receives light from the second reflection area of the first angle adjusting unit; and a light blocking wall which separates a movement path of the transmitted light and a movement path of the received light, and
wherein the first angle adjusting unit includes a reflector having the first reflection area and the second reflection area and the reflector is installed in a frame of an optical transceiver to be movable and moves using an electromagnetic force of a magnet attached to the reflector and a coil installed in the frame or,
the first angle adjusting unit includes a reflector having the first reflection area and the second reflection area and the reflector is installed in a frame of the optical transceiver to be movable and moves using an electromagnetic force of a magnet installed in the frame and a coil attached to the reflector.

2. The hybrid sensor according to claim 1, wherein the first data includes first coordinate information which is two-dimensionally represented and intensity information related to the first coordinate information, the second data includes second coordinate information which is two-dimensionally represented and depth information related to the second coordinate information, and the composite data includes space coordinate information which is three-dimensionally represented and the intensity information.

3. The hybrid sensor according to claim 2, wherein the processing unit compares the first coordinate information and the second coordinate information with respect to a space region where a first space area seen from a position where the first sensor is installed and a second space area seen from a position where the second sensor is installed overlap to map corresponding coordinate information.

4. The hybrid sensor according to claim 1, wherein the light blocking wall is installed between the optical transmitting unit and the optical receiving unit and forms a blocking area with respect to the first angle adjusting unit such that the light which is transmitted by the optical transmitting unit is reflected or scattered from the first reflection area of the first angle adjusting unit and the reflected or scattered light does not reach the optical receiving unit so that the transmitted light moves through a path to be reflected from the first reflection area and light reflected from a target moves through a path to be reflected from the second reflection area.

5. The hybrid sensor according to claim 1, wherein the first angle adjusting unit includes a first reflector having the first reflection area and a second reflector having the second reflection area and the first reflector and the second reflector are located in a first space and a second space separated by the light blocking wall, respectively.

6. The hybrid sensor according to claim 1, wherein the light blocking wall forms the blocking area using a length relationship including a distance Hb from the first angle adjusting unit to the light blocking wall, a thickness Wb of the light blocking wall, a distance H1 from the first reflection area to the optical transmitting unit, a distance W1 from the light blocking wall including the thickness of the optical transmitting unit to the optical transmitting unit, a distance H2 from the second reflection area to the optical receiving unit, a distance W2 from the light blocking wall including the thickness of the optical receiving unit to the optical receiving unit, a reference angle of the first angle adjusting unit, and a movement angle of the reflector, or a combination hereof.

7. The hybrid sensor according to claim 1, wherein the first angle adjusting unit moves at a predetermined period to change the normal line of the first reflection area and the normal line of the second reflection area and the first angle adjusting unit synchronizes a period of the first reflection area and a period of the second reflection area and makes a normal line direction of the first reflection area and a normal line direction of the second reflection area parallel to each other.

8. The hybrid sensor according to claim 1, wherein the first angle adjusting unit includes a first reflector having the first reflection area and a second reflector having the second reflection area and the first reflector and the second reflector are formed to be a polygonal column to move while rotating.

9. The hybrid sensor according to claim 1, wherein the first angle adjusting unit further comprises a first driver which moves a reflector of the first angle adjusting unit; a first frequency adjusting unit which adjusts a period when the reflector of the first angle adjusting unit moves; a reference angle adjusting unit which adjusts an angle at which the reflector of the first angle adjusting unit is installed, or a combination thereof and,
the optical transmitting unit includes a light source which emits light, a transmitting reflector which reflects the light or a combination thereof and the optical receiving unit includes a photo diode which receives light to convert the light into an electrical signal, a receiving reflector which reflects the light, a point adjusting unit which adjusts the number of point group data obtained per unit time by adjusting a light emitting speed of the light source based on a predetermined sampling period, or a combination thereof.

10. The hybrid sensor according to claim 1, further comprising:
a second angle adjusting unit,
wherein the second angle adjusting unit includes the optical transmitting unit, the optical receiving unit, a rotor which is attached to the light blocking wall to rotate, a second driver which is connected to the rotor to rotate the rotor, and a rotor connecting unit which connects a base of the optical transceiver and the rotor, the rotor connecting unit includes a power line to which a conductor is in physical contact with the rotor to transmit power and a data communication unit which is wirelessly connected to the rotor in the rotor to transmit data thereto and the power line applies a pressure to a worn portion of the conductor in a direction in which the conductor is in contact.

11. The hybrid sensor according to claim 1, wherein the hybrid sensor operates both the first sensor and the second sensor for a target which is closer than a predetermined distance to generate composite data and selectively operates the first sensor or the second sensor for a target which is disposed farther than a predetermined distance to obtain data.

12. The hybrid sensor according to claim 1, wherein the processing unit generates the composite data based on (i) depth information corresponding to common coordinate information corresponding to the second coordinate information, among the first coordinate information and (ii) intensity information corresponding to the common coordinate information.

13. The hybrid sensor according to claim 12, wherein the processing unit predicts first predicted depth information related to non-common information which does not correspond to second coordinate information, among first coordinate information, using (i) depth information corresponding to common coordinate information and (ii) intensity information corresponding to the common coordinate information.

14. The hybrid sensor according to claim 13, wherein the processing unit determines similarity between (i) intensity information of the non-common coordinate information and (ii) intensity information of common coordinate information present within a predetermined range to predict the first predicted depth information.

15. The hybrid sensor according to claim 14, wherein the predicting unit predicts second predicted depth information related to the non-common coordinate information using (i) intensity information of the non-common coordinate information, (ii) intensity information of the common coordinate information, and (iii) the first predicted depth information.

16. The hybrid sensor according to claim 13, wherein the processing unit updates the composite data based on the first predicted depth information related to the non-common coordinate information.

17. A sensor, comprising:
a first angle adjusting unit including a first reflection area and a second reflection area;
an optical transmitting unit which transmits light to the first reflection area of the first angle adjusting unit;
an optical receiving unit which receives light from the second reflection area of the first angle adjusting unit; and
a light blocking wall which separates a movement path of the transmitted light and a movement path of the received light,
wherein the first angle adjusting unit includes a reflector having the first reflection area and the second reflection area and the reflector is installed in a frame of an optical transceiver to be movable and moves using an electromagnetic force of a magnet attached to the reflector and a coil installed in the frame or, the first angle adjusting unit includes a reflector having the first reflection area and the second reflection area and the reflector is installed in a frame of the optical transceiver to be movable and moves using an electromagnetic force of a magnet installed in the frame and a coil attached to the reflector.

18. A moving object, comprising:

a hybrid sensor which obtains first data related to a target by means of a first sensor, obtains second data related to the target by means of a second sensor, and generates composite data obtained by mapping the first data and the second data;

a map generator which analyzes the first data or the composite data to generate a map related to a surrounding environment; and a moving device implemented to move the moving object based on the map, wherein the second sensor comprises a first angle adjusting unit including a first reflection area and a second reflection area; an optical transmitting unit which transmits light to the first reflection area of the first angle adjusting unit; an optical receiving unit which receives light from the second reflection area of the first angle adjusting unit; and a light blocking wall which separates a movement path of the transmitted light and a movement path of the received light, and wherein the first angle adjusting unit includes a reflector having the first reflection area and the second reflection area and the reflector is installed in a frame of an optical transceiver to be movable and moves using an electromagnetic force of a magnet attached to the reflector and a coil installed in the frame or, the first angle adjusting unit includes a reflector having the first reflection area and the second reflection area and the reflector is installed in a frame of the optical transceiver to be movable and moves using an electromagnetic force of a magnet installed in the frame and a coil attached to the reflector.

* * * * *